Dec. 2, 1947.  A. ARNASON  2,431,906
CALCULATING MACHINE
Filed Nov. 4, 1944  20 Sheets-Sheet 2
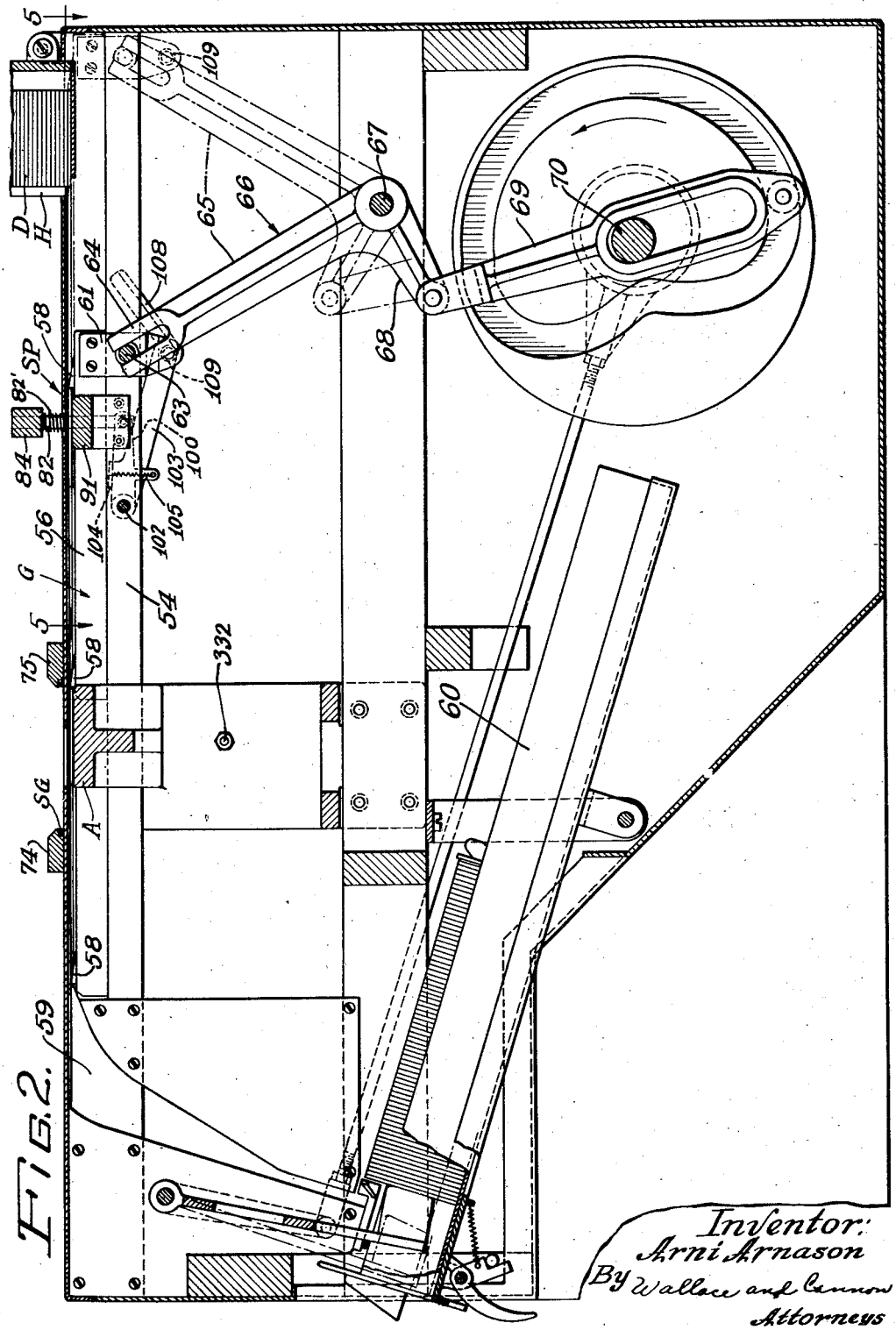
Inventor:
Arni Arnason
By Wallace and Cannon
Attorneys Dec. 2, 1947.   A. ARNASON   2,431,906
CALCULATING MACHINE
Filed Nov. 4, 1944   20 Sheets-Sheet 3
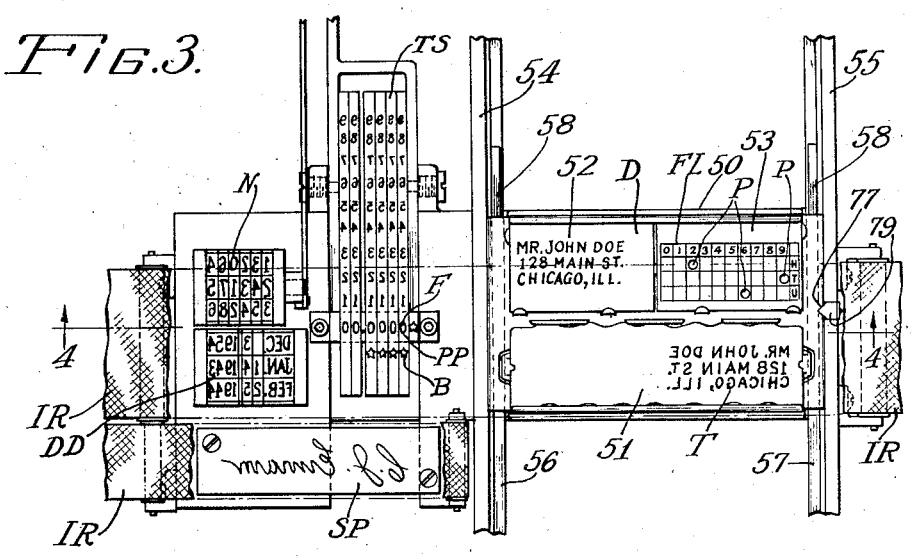
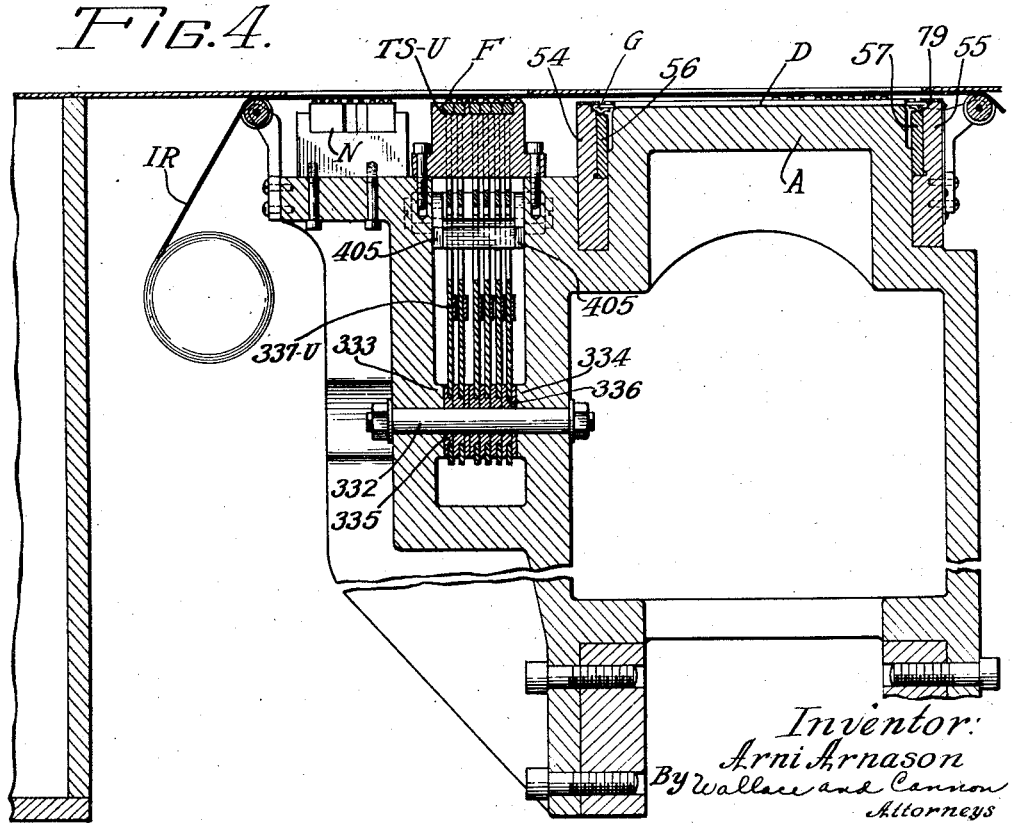

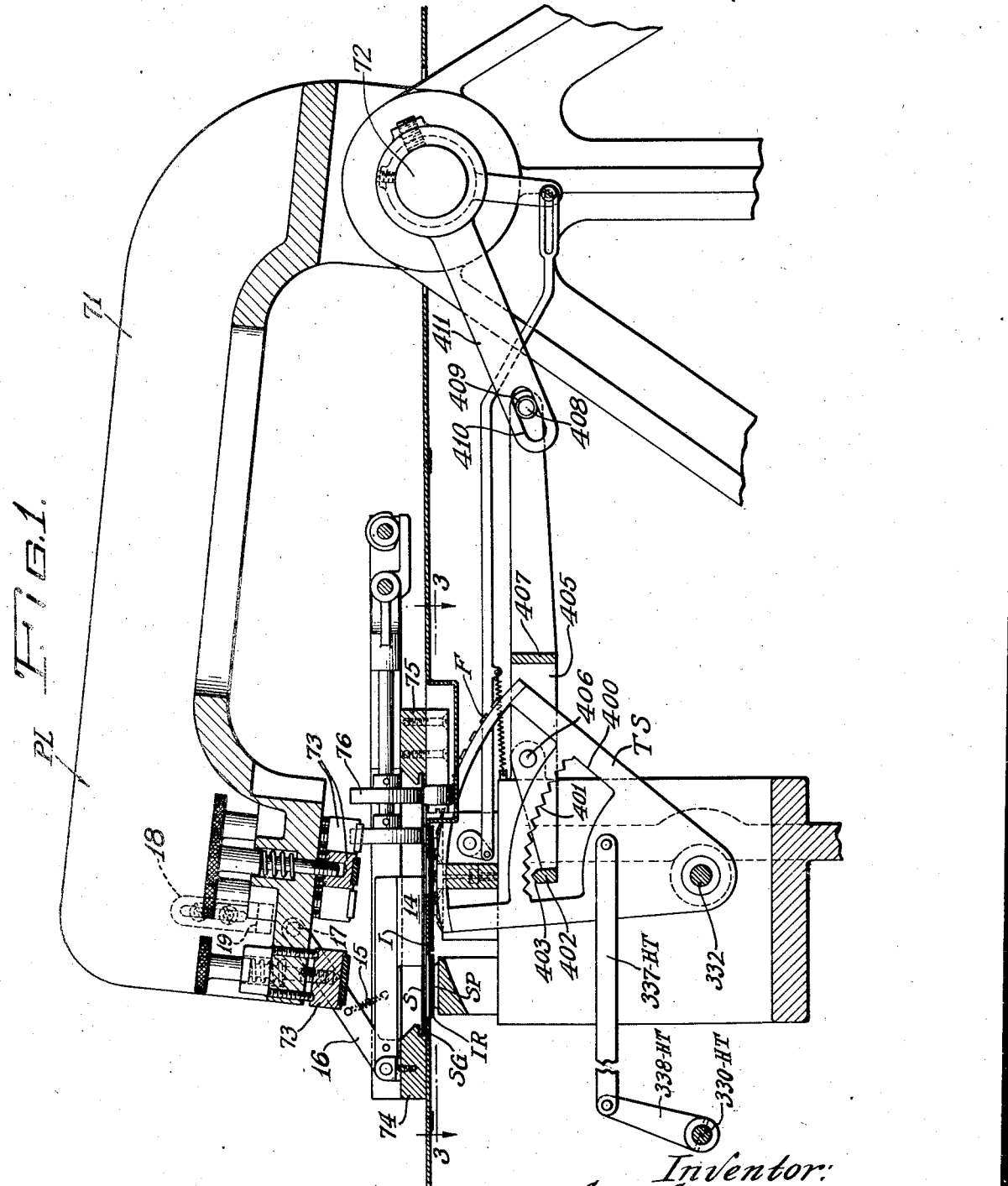

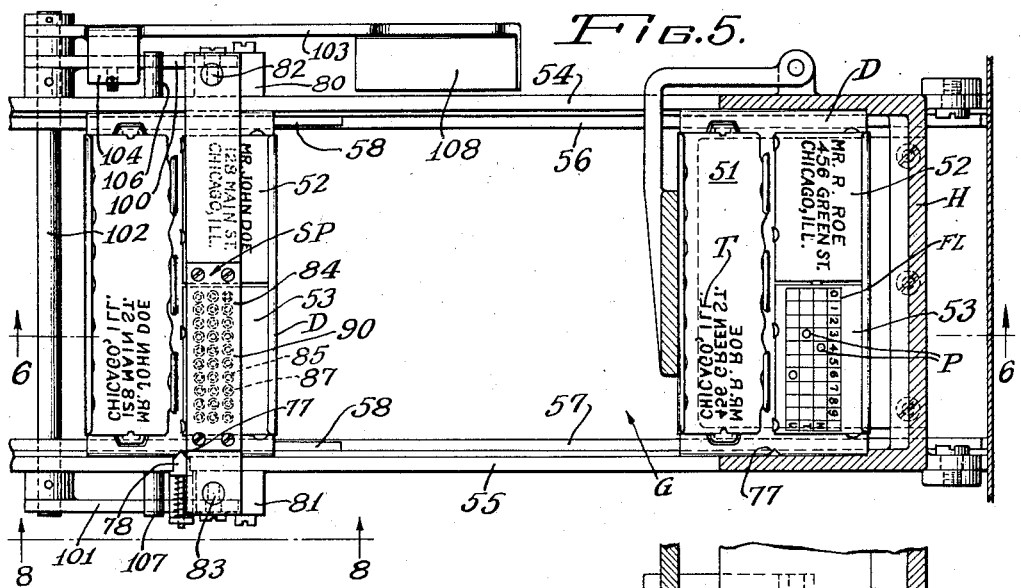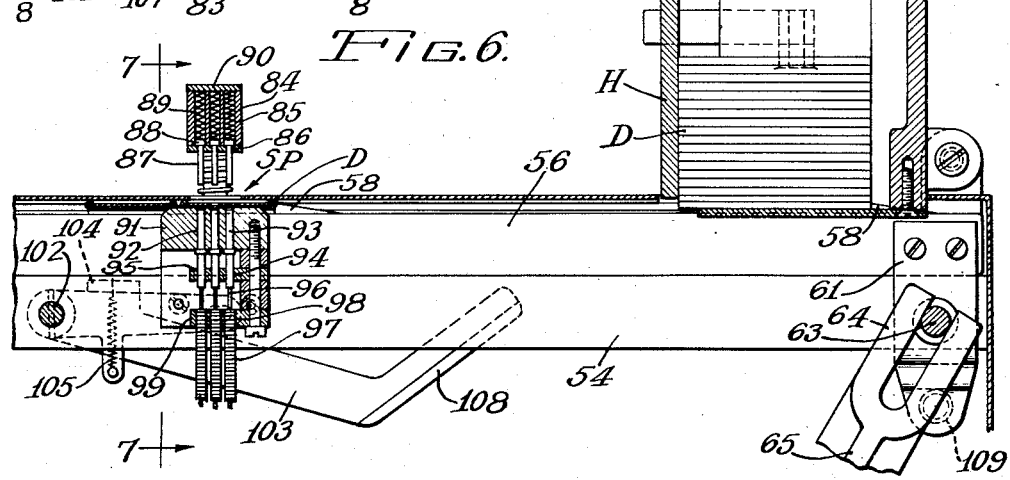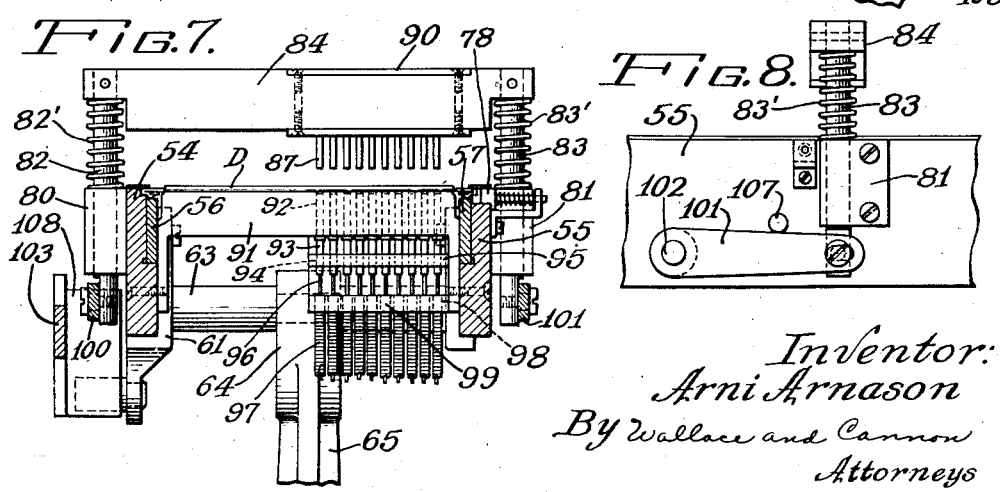

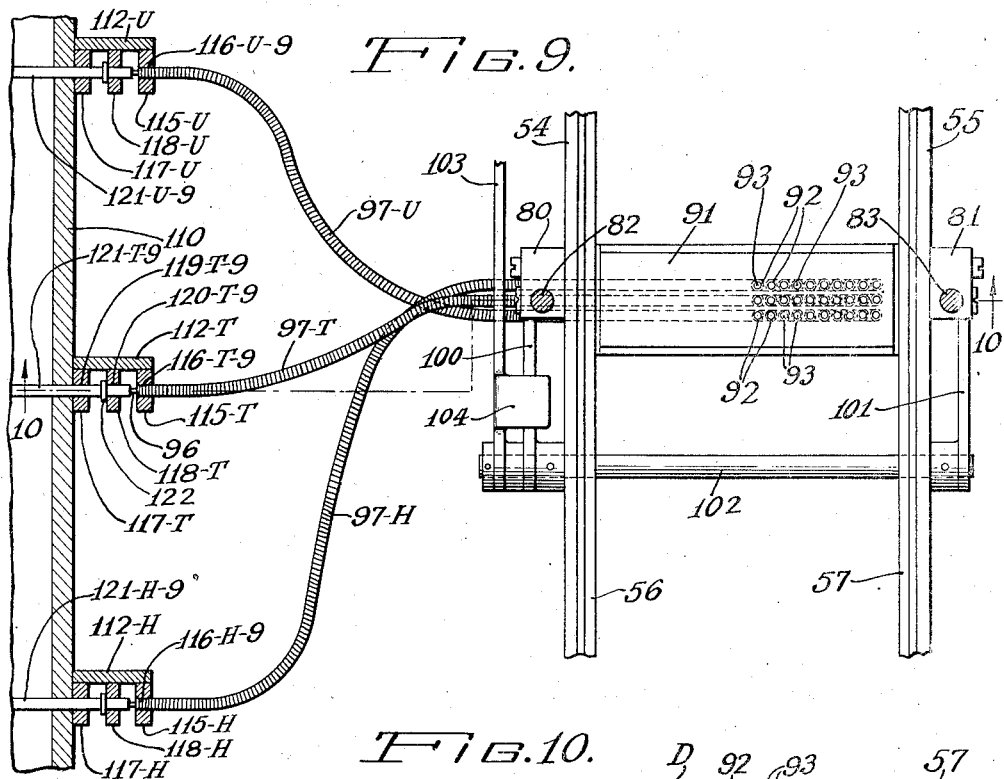
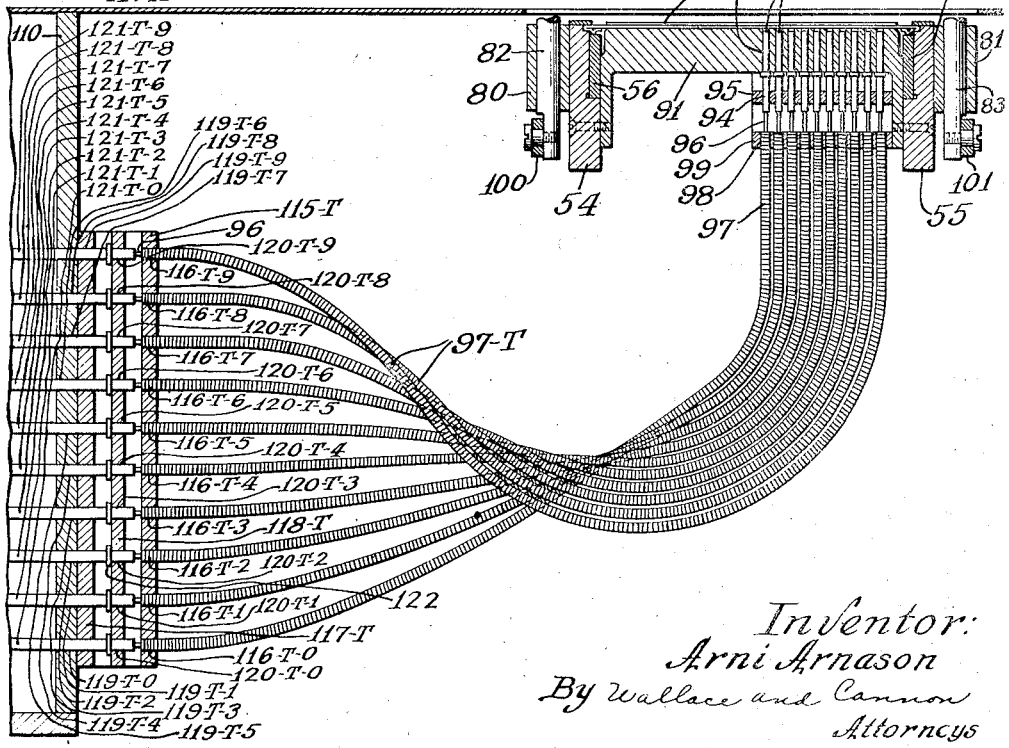

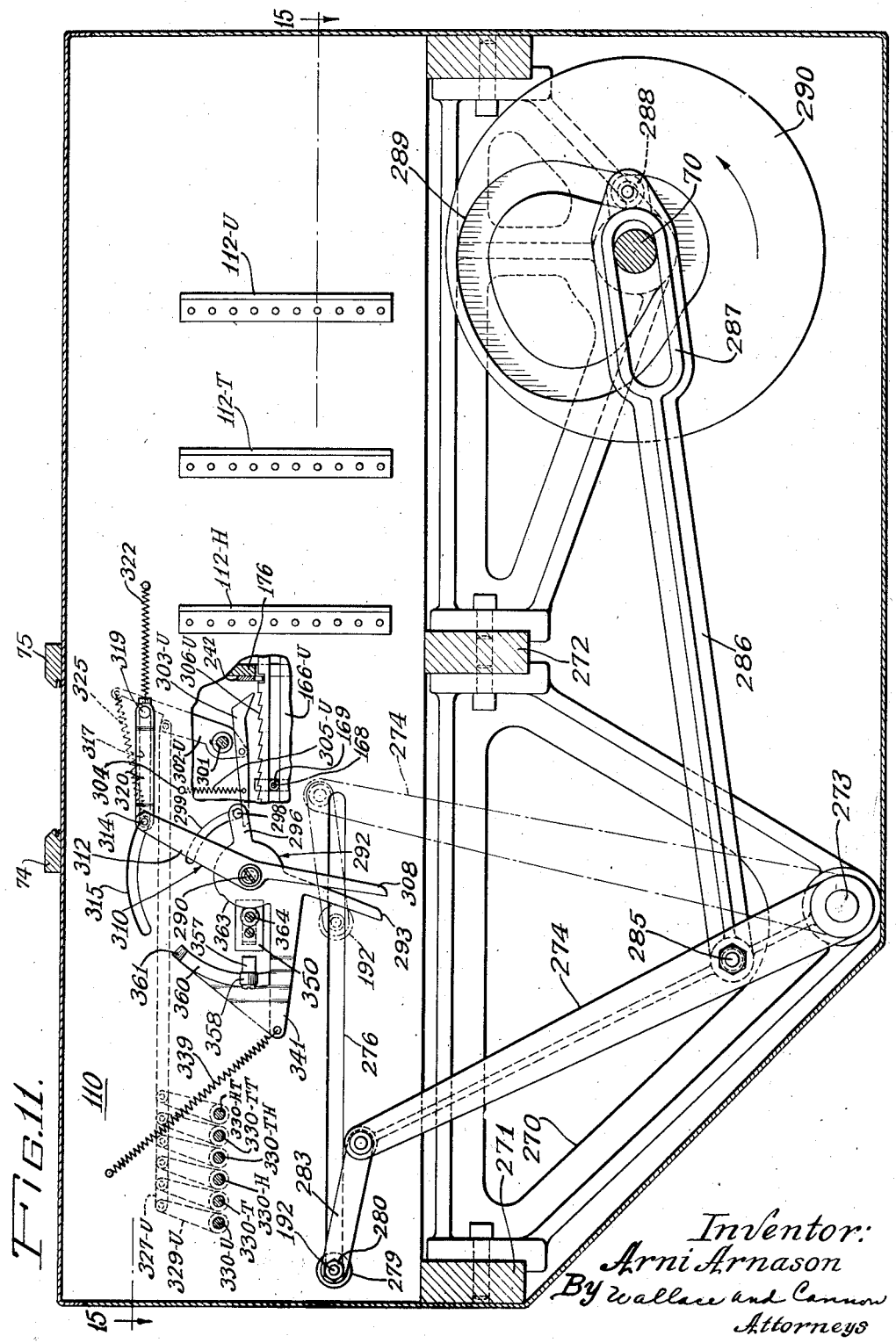

Dec. 2, 1947.                A. ARNASON                2,431,906
                        CALCULATING MACHINE
                    Filed Nov. 4, 1944        20 Sheets-Sheet 7

Inventor:
Arni Arnason
By Wallace and Cannon
Attorneys

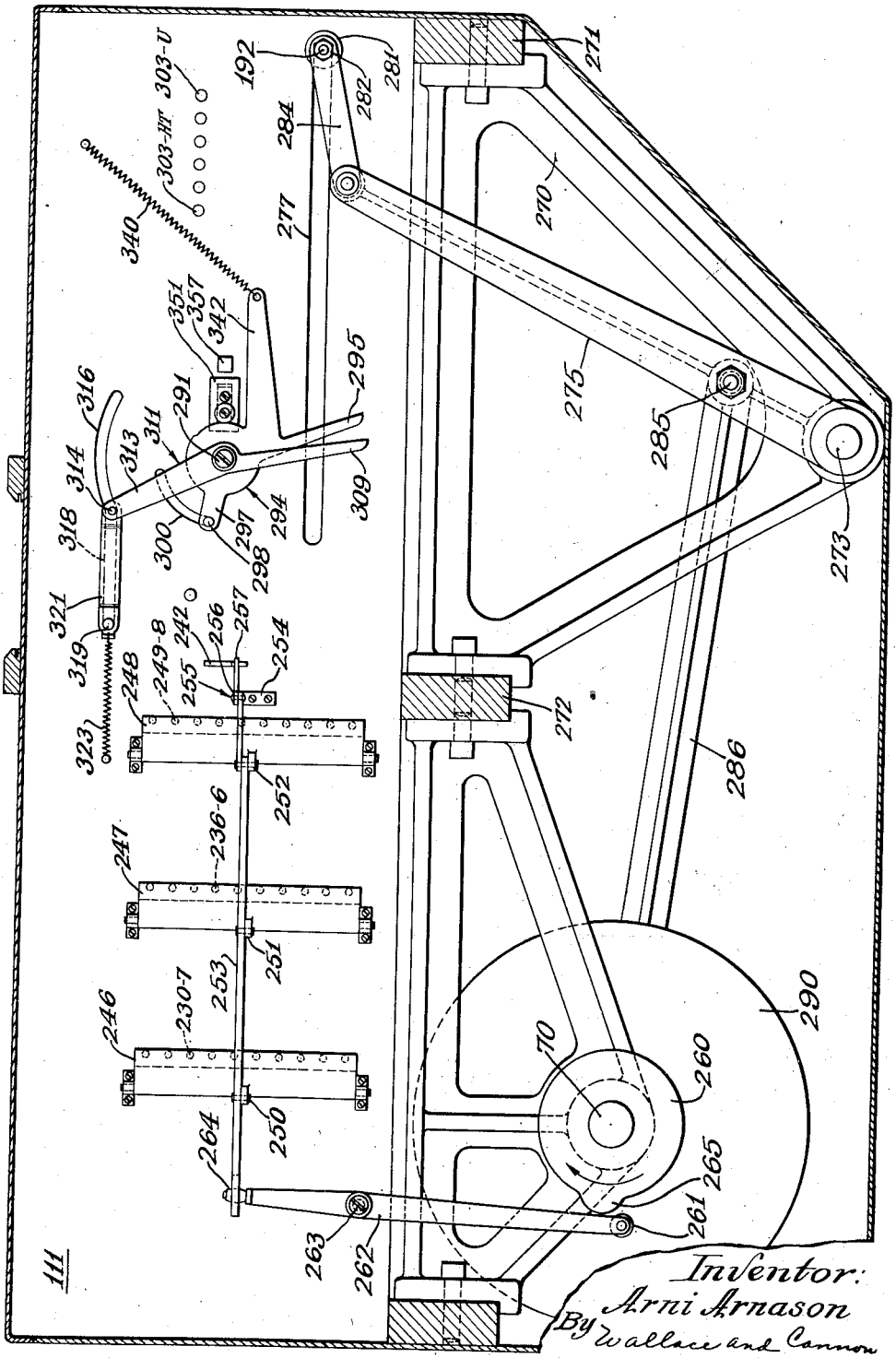

Dec. 2, 1947.       A. ARNASON       2,431,906
CALCULATING MACHINE
Filed Nov. 4, 1944       20 Sheets-Sheet 9
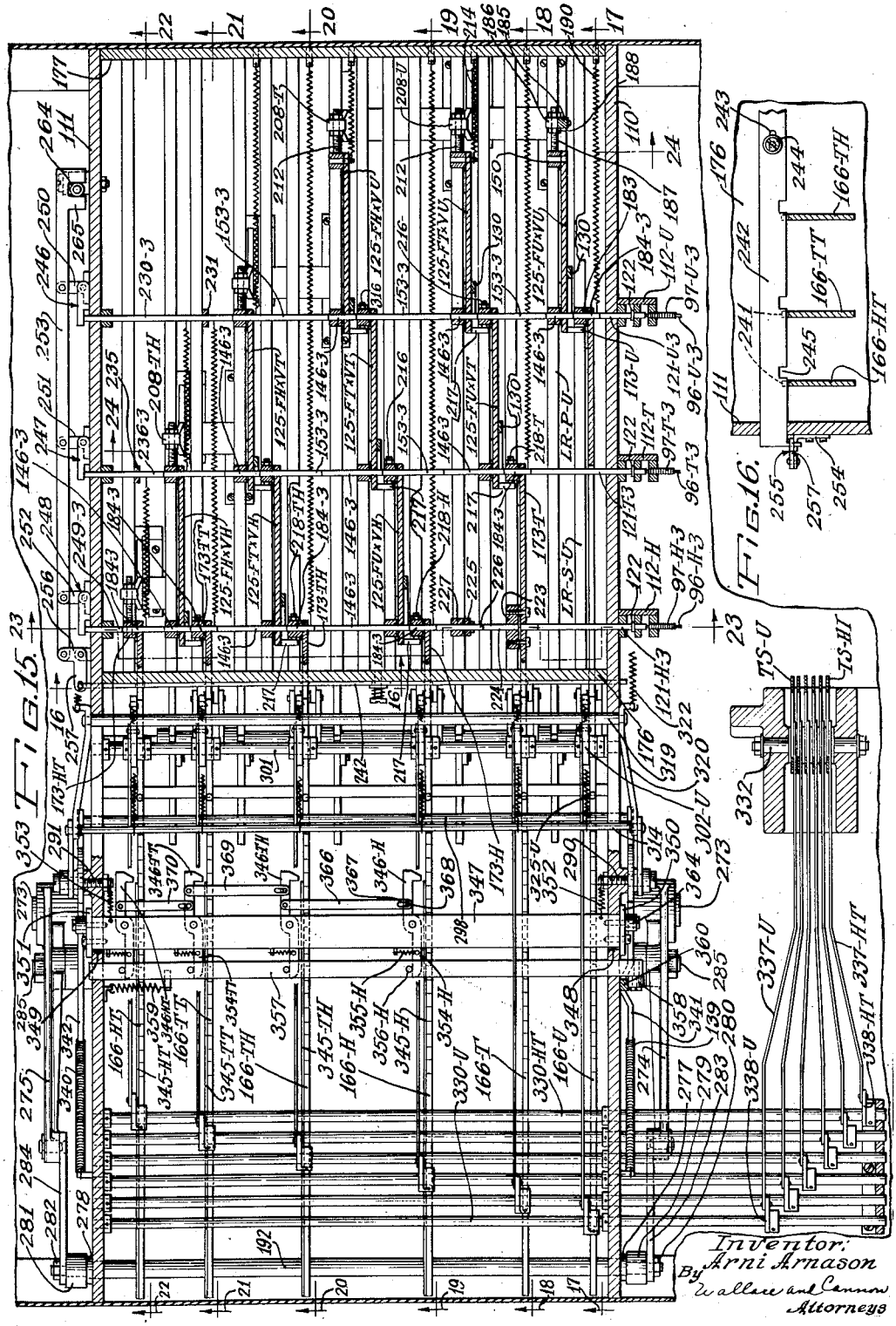

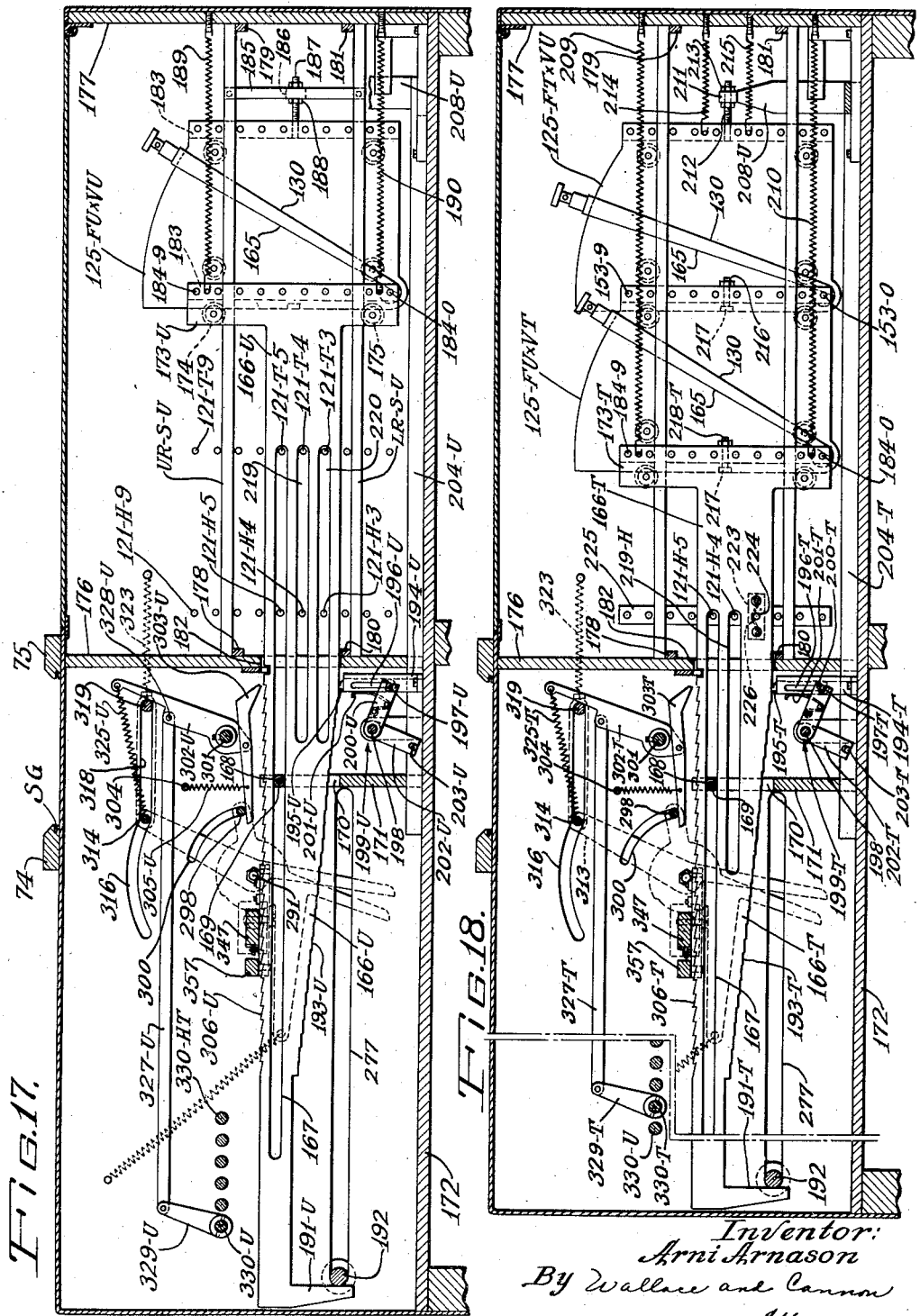

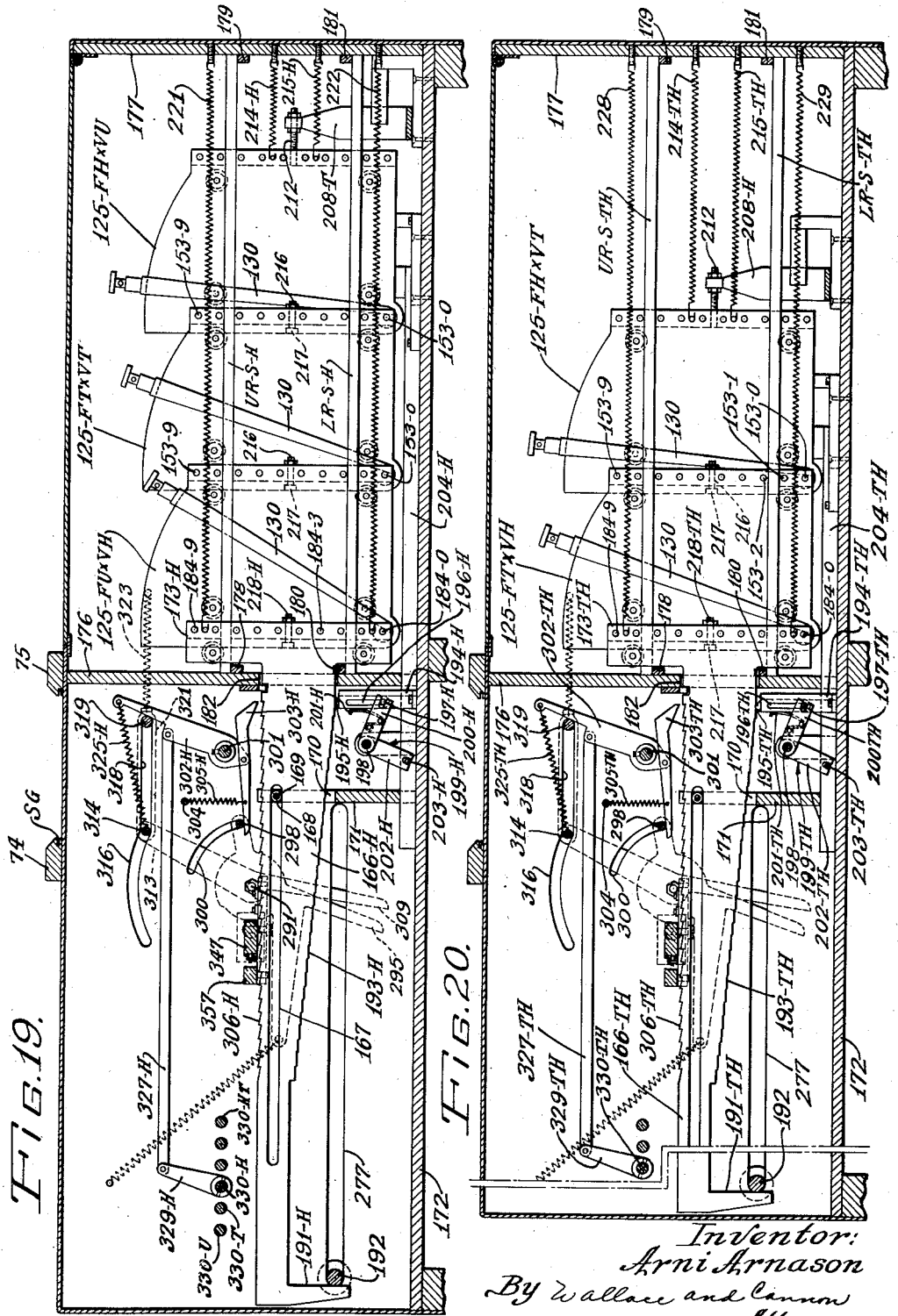

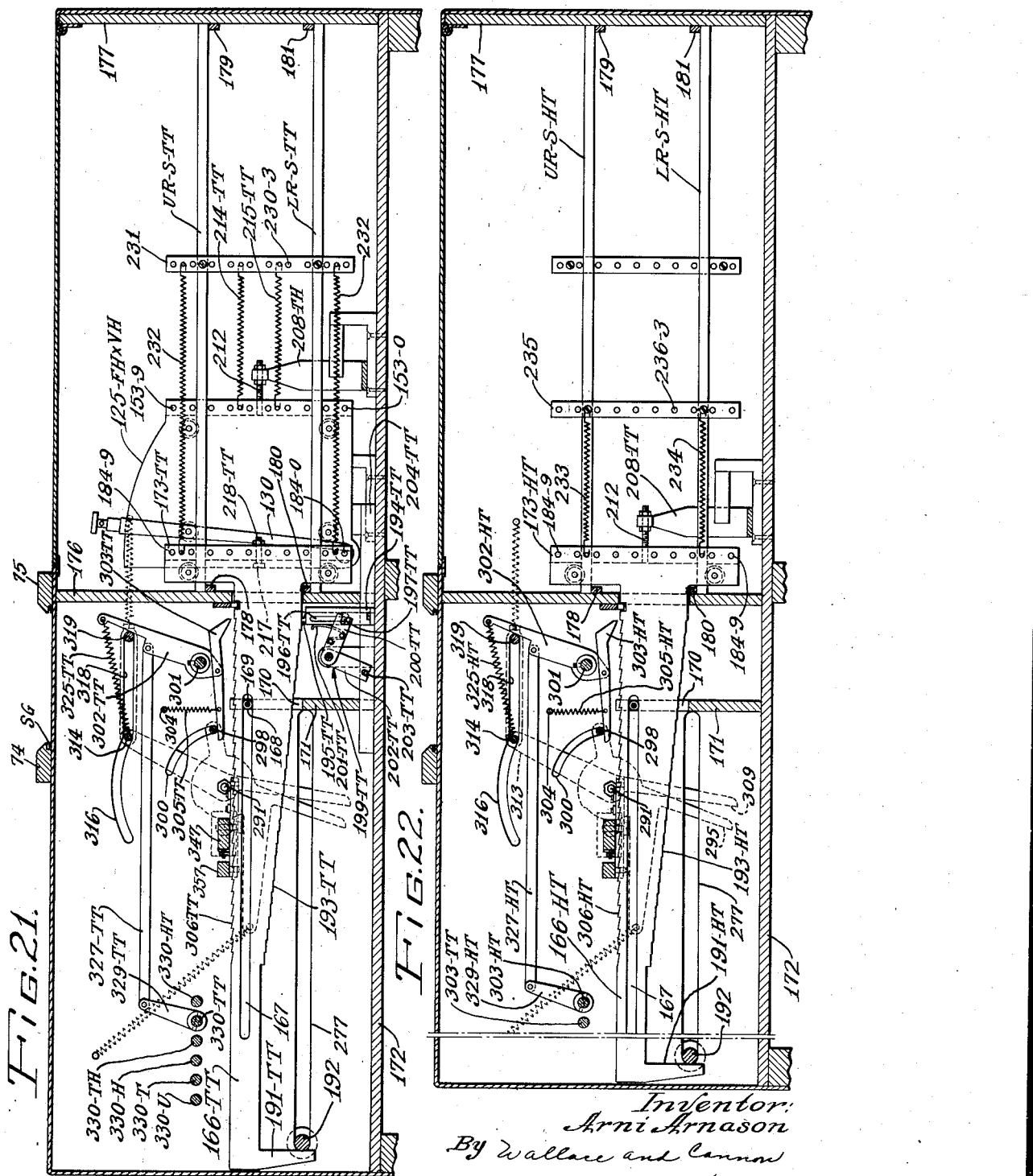

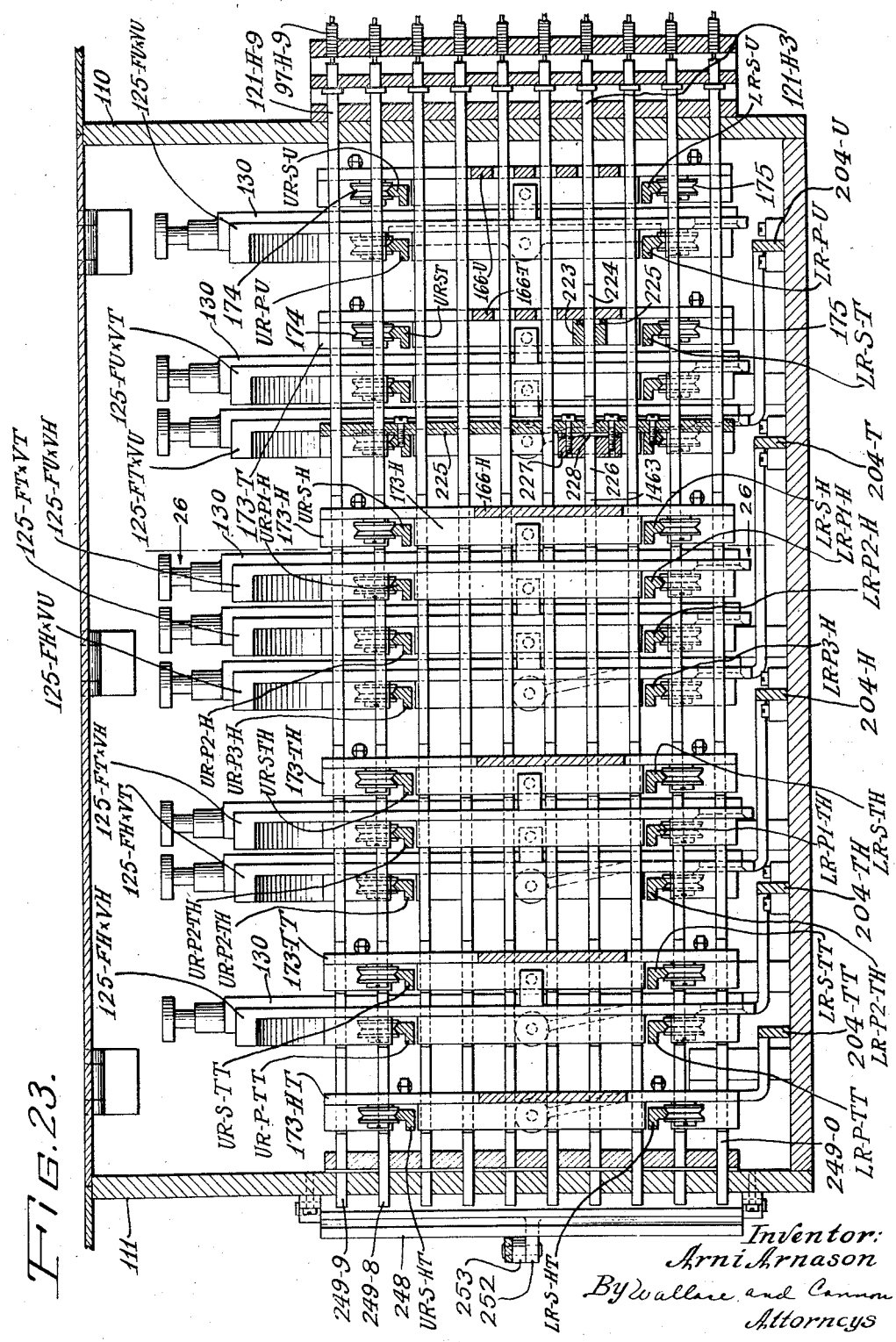

Dec. 2, 1947.    A. ARNASON    2,431,906
CALCULATING MACHINE
Filed Nov. 4, 1944    20 Sheets-Sheet 14

Inventor:
Arni Arnason
By Wallace and Cannon
Attorneys

Dec. 2, 1947.  A. ARNASON  2,431,906
CALCULATING MACHINE
Filed Nov. 4, 1944  20 Sheets-Sheet 15
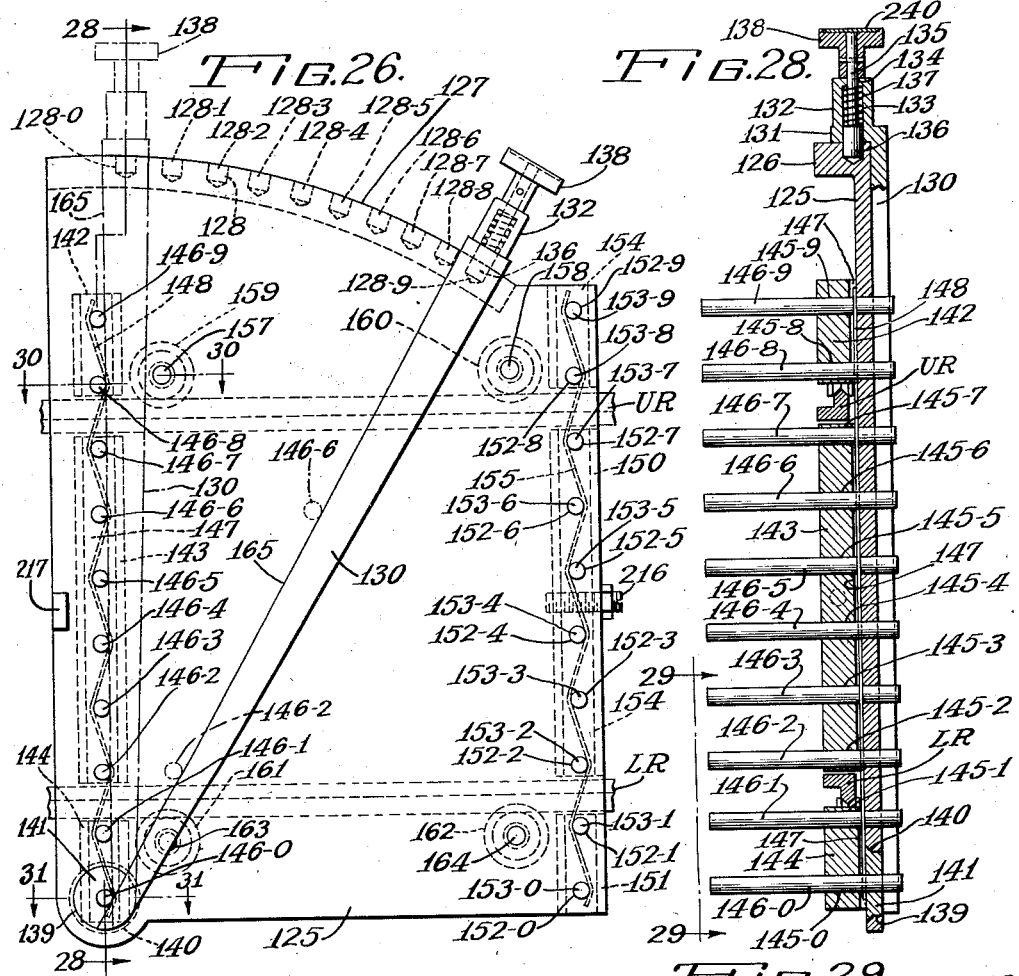
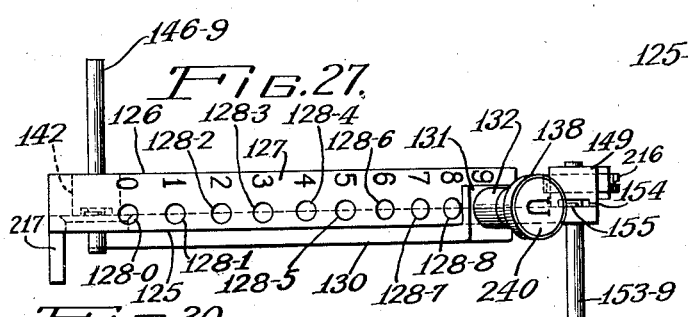
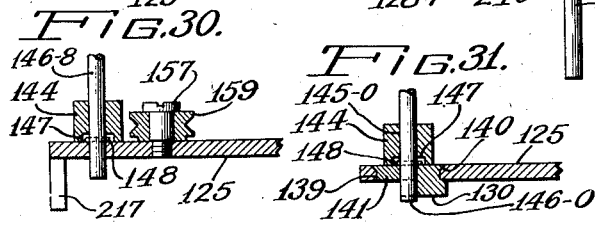
Inventor:
Arni Arnason
By Wallace and Cannon
Attorneys Dec. 2, 1947.  A. ARNASON  2,431,906
CALCULATING MACHINE
Filed Nov. 4, 1944   20 Sheets-Sheet 16
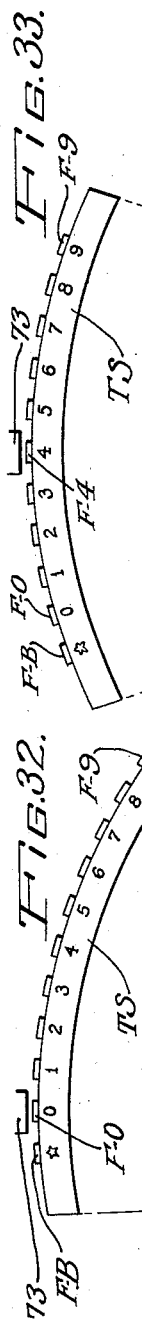
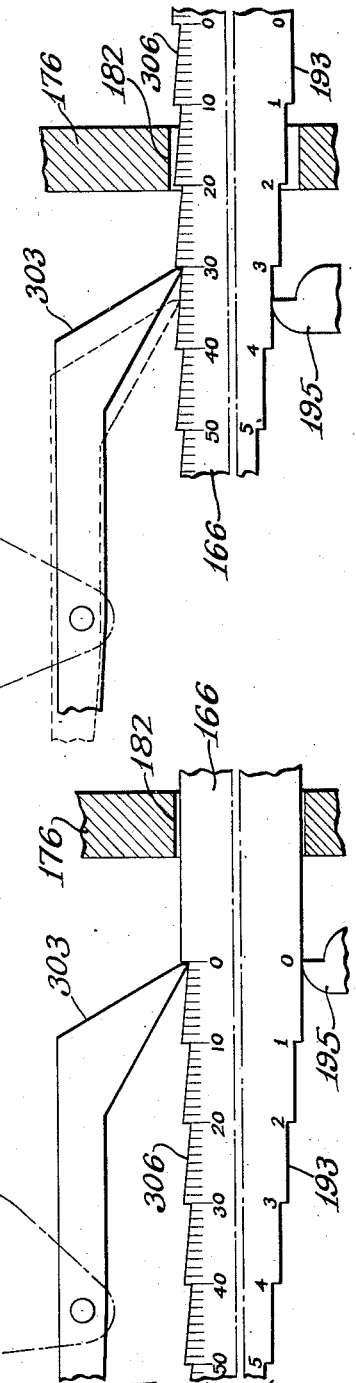
Inventor:
Arni Arnason
By Wallace and Cannon
Attorneys

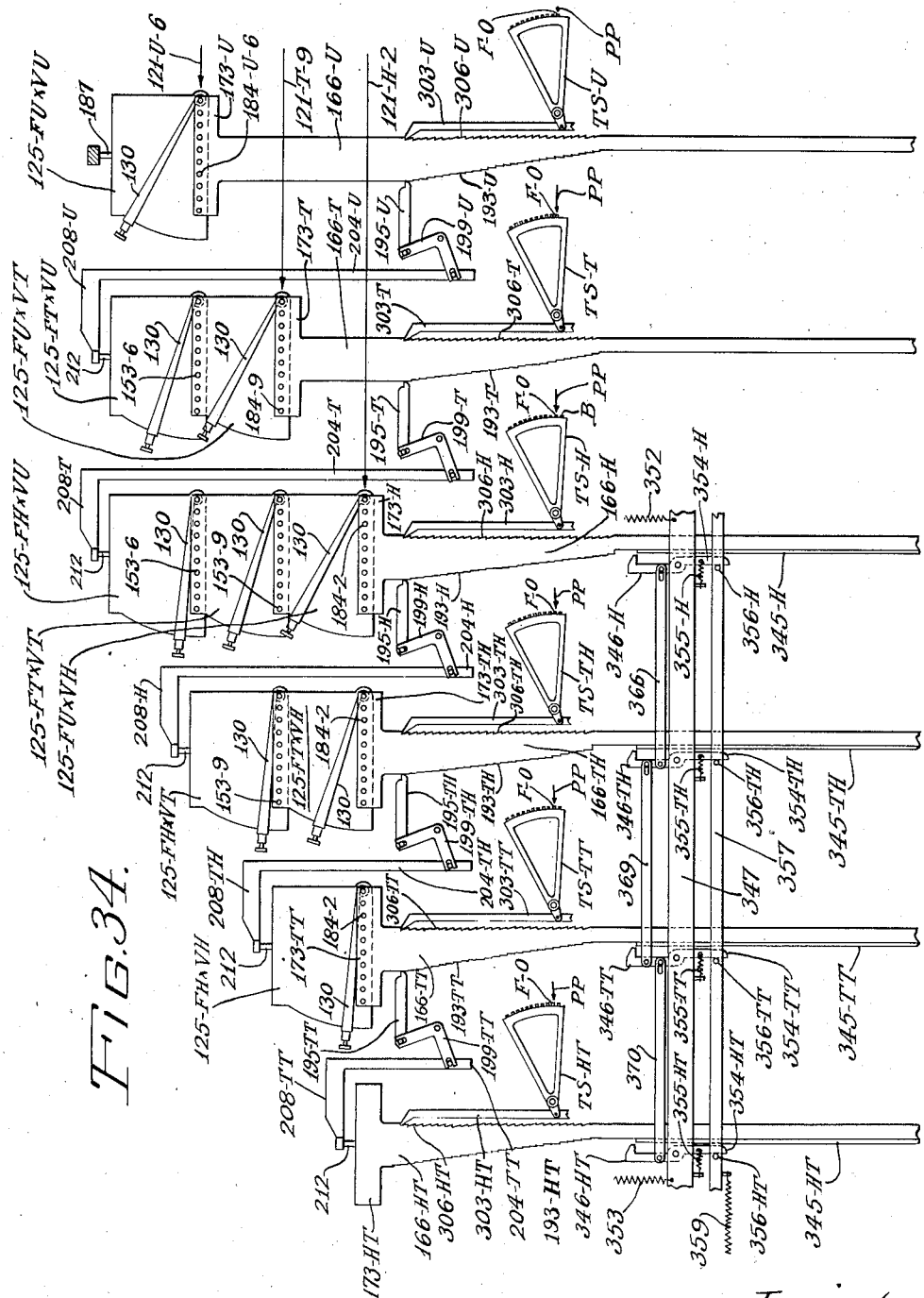

Dec. 2, 1947.   A. ARNASON   2,431,906
CALCULATING MACHINE
Filed Nov. 4, 1944   20 Sheets-Sheet 18

FIG. 35.

Inventor
Arni Arnason
By Wallace and Cannon
Attorneys

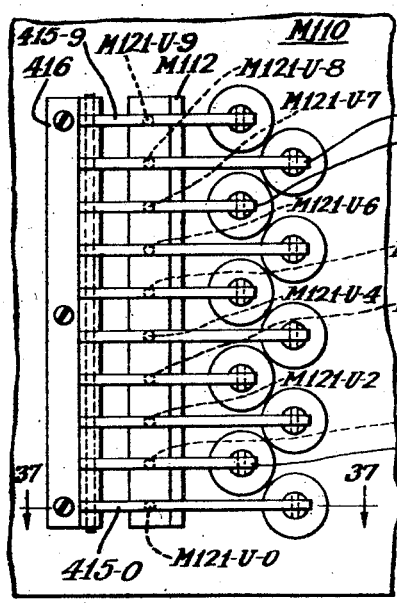
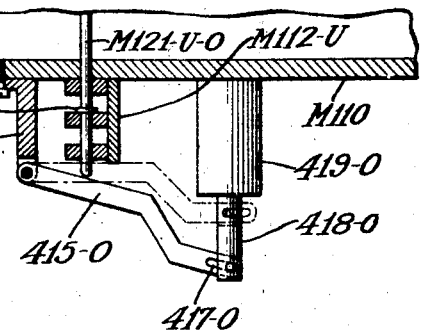
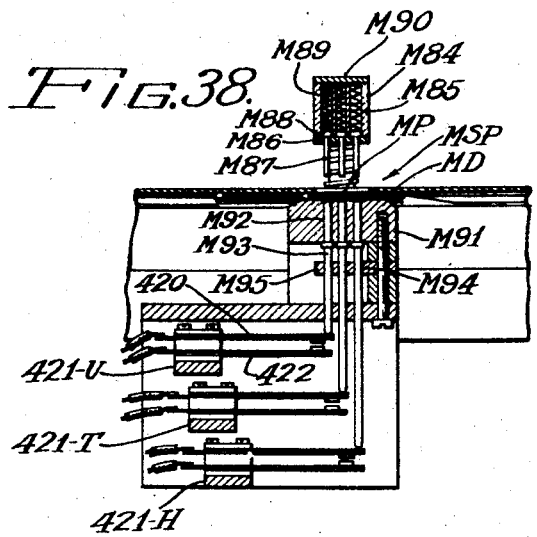

Dec. 2, 1947.  A. ARNASON  2,431,906
CALCULATING MACHINE
Filed Nov. 4, 1944   20 Sheets-Sheet 20
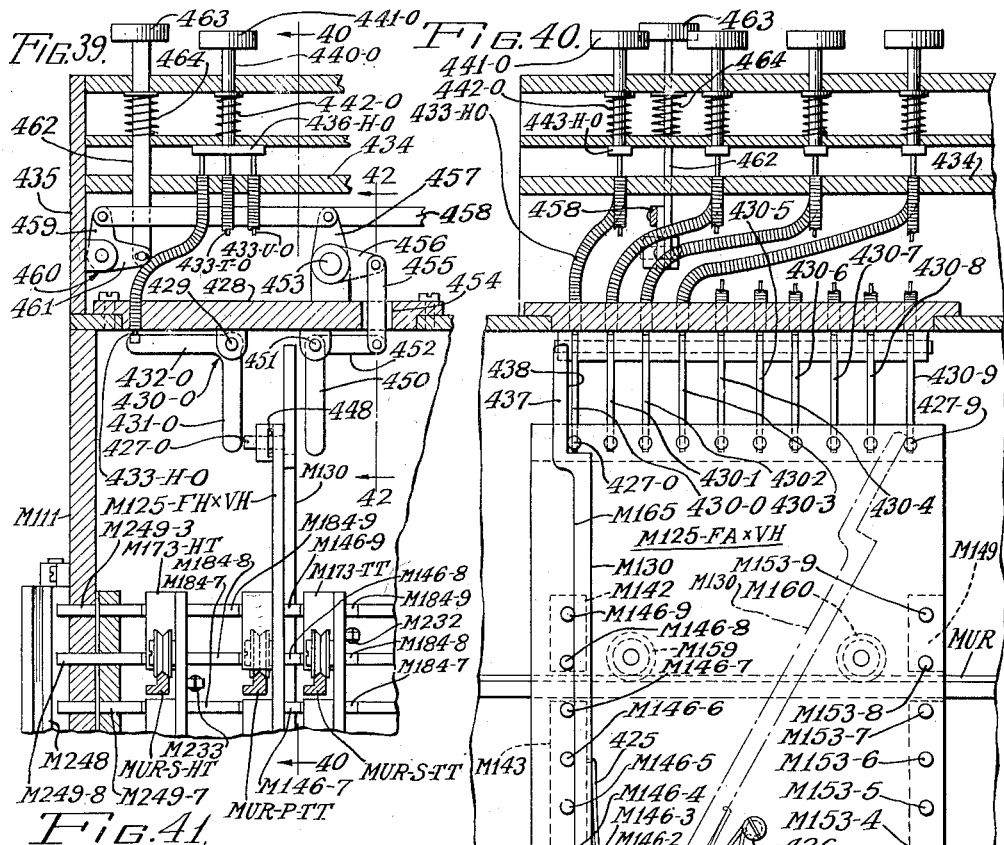
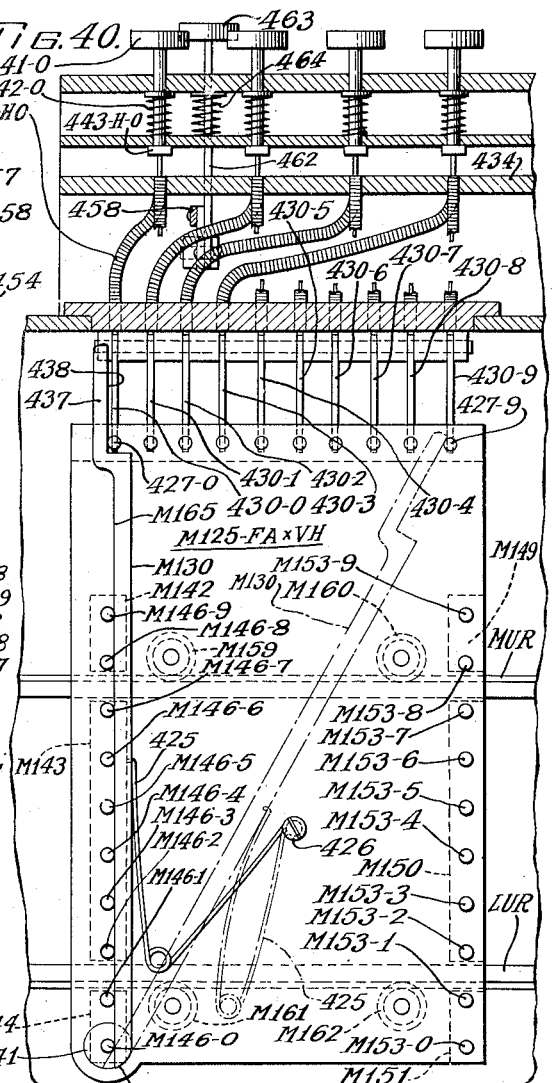
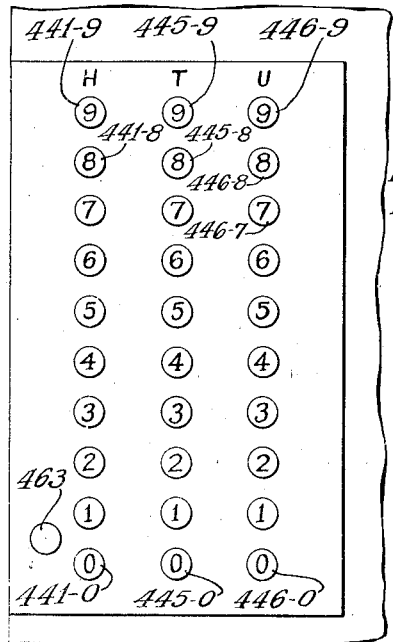
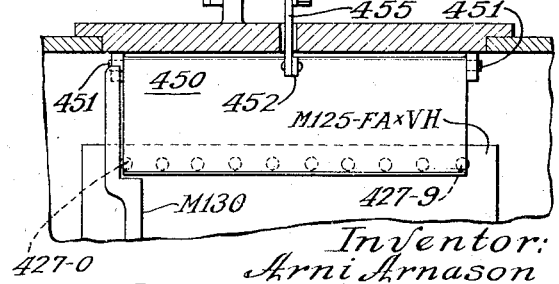
Inventor:
Arni Arnason
By Wallace and Cannon
Attorneys Patented Dec. 2, 1947

2,431,906

UNITED STATES PATENT OFFICE 2,431,906

CALCULATING MACHINE

Arni Arnason, Park Ridge, Ill., assignor to Addressograph-Multigraph Corporation, Wilmington, Del., a corporation of Delaware Application November 4, 1944, Serial No. 561,884

17 Claims. (Cl. 235—61)

This invention relates to calculating machines and particularly to mechanical means for effecting multiplications.

In mechanical means as heretofore arranged to effect multiplications resort has been had to apparatus responsive to representations of the right and left hand components of products resulting from multiplications of digits appearing in the order of the multiplicand and by digits appearing in an order of the multiplier, the apparatus responsive to representations of the right hand components of such products being related to a particular order of the final product and the apparatus responsive to the representations of the left hand components of such products being related to the next higher order of the final product. So to do entails employment of at least two devices to respectively represent the right and left hand components of the products and this not only requires that a relatively large number of such devices be employed but this also requires what amounts to a duplication insofar as apparatus responsive to such devices may be concerned.

Hence, among the objects of this invention are to represent the products that result from multiplication of the digits that may appear in an order of the multiplicand by digits that appear in the order of the multiplier on a single device and without resorting to separate representation of the right and left hand components of such products; to represent the products resulting from multiplication of digits that may appear in an order of the multiplicand by digits that may appear in the order of the multiplier on a single device and in such manner that all of the products resulting from such multiplications may be represented thereon irrespective of the particular orders of the multiplicand and multiplier in which the digits may appear, whereby a plurality of identical devices may be utilized to respectively represent the products resulting from multiplications of digits appearing in each order of the multiplicand for which accommodation is to be afforded in the mechanism by the digits appearing in the respective orders of the multiplier for which accommodation is afforded in the mechanism; and to so relate such product representing devices to each other in the mechanism that the products represented thereon may be entered into apparatus pertaining to the orders of the final product to which the right and left hand components of the products represented on the particular devices relate as determined by the orders of the multiplicand and the multiplier in which the digits determining representations appear.

In many of the commercial utilizations of multiplying mechanisms the same factor may enter into a relatively large number of successively effected multiplications, such a factor being known as a fixed factor and among other objects of my invention are to afford a multiplying mechanism in which the digits appearing in such a fixed factor may be expeditiously represented in such a way as to enable utilization thereof in successively effected multiplications in the mechanism; to enable any of the digits that may appear in any order of such a fixed factor within the capacity of my mechanism to be represented in the mechanism; to enable manual manipulation of the devices in the mechanism that may be set to represent the digits appearing in the various orders of the fixed factor so as to thereby enable expeditious changing of the representation from the digits of one fixed factor to the digits of another; to enable a plurality of representations of the digits appearing in any particular order of the fixed factor to be set up in such a way that such representations will cooperate with devices pertaining to digits appearing in the orders of the other factor of the to be performed multiplications so that representations will be afforded of the products resulting from multiplications entailing digits appearing in a particular order of the fixed factor and digits appearing in an order of the other factor; and to so arrange the devices on which such products are represented as to enable representation on each such device of all of the products that may result from multiplication of all of the digits appearing in a particular order of a fixed factor by all of the digits appearing in an order of the other factor.

In multiplying mechanisms wherein a fixed factor is utilized it is usually desirable that the mechanism be so arranged that such a fixed factor may be multiplied by a relatively large number of other factors so that where one of the two factors is a fixed factor the other will be what is known as a variable factor and yet other objects of my invention are to provide a multiplying mechanism wherein representations of various variable factors may be set up with respect to representations of a fixed factor so as to thereby enable representations of a relatively large number of products entailing multiplications of the digits that appear in an order of the fixed factor and digits that appear in an order of the variable factor; to enable representations of the digits appearing in the various orders of the variable factor to be set up from and under control of representations of such digits afforded on devices that may be moved into association with my multiplying mechanism in a successive manner so that as each such device moves into association with my mechanism representations of the digits appearing in the various orders of the variable factor may be expeditiously set up for each particular multiplication; to so arrange the apparatus that each device bearing representations of the digits appearing in various orders of the variable factor will control a particular multiplying operation in my mechanism; and to enable such representation bearing devices to be sequentially moved into association with my mechanism so as to thereby enable multiplying operations of my mechanism to be effected in a successive manner.

My multiplying mechanism is, as stated hereinabove, so arranged that one particular product representing device will pertain to a particular order of the fixed factor and also to a particular order of the variable factor. Hence, in an instance where digits appearing in, for example, the units, tens and hundreds orders of the fixed factor are to be multiplied by digits appearing in the units, tens and hundreds order of the variable factor, one device will be afforded to represent the products resulting from multiplications of digits appearing in the units order of the fixed factor by digits appearing in the units order of the variable factor; yet another device will be afforded to represent the products resulting from the multiplication of digits appearing in the tens order of the fixed factor by digits appearing in the units order of the variable factor; and still another device will be afforded to represent products resulting from multiplications of digits appearing in the hundreds order of the fixed factor by digits appearing in the units order of the variable factor. This likewise applies with respect to digits appearing in the units, tens and hundreds order of the fixed factor and digits appearing in the tens order of the variable factor, three product representing devices being required to represent the products resulting from such multiplications and this also applies insofar as multiplications may be concerned which entail digits appearing in the units, tens and hundreds order of the fixed factor and digits appearing in the hundreds order of the variable factor. In view of this it is still another object of this invention to so relate the product representing devices one to the other in the mechanism that representations of the digits appearing, for example, in the units order of the variable factor may be simultaneously rendered effective with respect to representations of digits appearing in, for example, the units, tens and hundreds orders of the fixed factor and also to so relate the product representing devices in my mechanism one to the other that representations of digits respectively appearing in, for example, the tens and hundreds orders of the variable factor may be respectively and simultaneously set up with respect to digits respectively appearing in, for example, the units, tens and hundreds orders of the fixed factor.

Therefore, and more specifically, other objects of this invention are to provide on each product representing device of the aforesaid character a movable member which may be disposed in any one of a plurality of positions to thereby represent a particular digit in the order of the fixed factor to which the product representing device pertains; to so arrange each such device that representations of the various digits appearing in the order of the variable factor to which the particular product representing device also pertains may be selectively set up with respect to the member on such device representing a digit in the order of the fixed factor to which the product representing device pertains; and more specifically, it is a still further object of my invention to utilize a movable member to represent the digits in an order of the fixed factor and a plurality of members in the form of pins to respectively represent the digits in the related order of the variable factor so as to thereby enable one of such pins to be rendered effective with respect to the movable member so as to thereby render effective a representation of the product resulting from multiplication of the digit the movable member is set to represent by the digit the pin is set to represent.

Inasmuch as the various product representing devices that are employed in my multiplying mechanism are arranged to represent the product resulting from multiplication of any digit appearing in the order of the fixed factor to which the particular device relates by any digit appearing in the order of the variable factor to which the particular device relates, many of the represented products will comprise both right and left hand components as where, for example, the digit 7 in one of the factors is multiplied by the digit 9 in the other of the factors to result in the product of 63. Hence, still other objects of my invention are to not only relate the product representing devices one to the other in such a manner that representations of the digit appearing in a particular order of the variable factor may be simultaneously and respectively set up with respect to representations of the digits appearing in the respective orders of the fixed factor, but also to so relate the product representing devices one to the other in such a manner as to enable cooperation among the devices representing products that pertain to the same order of the final product. Thus, for example, where one product representing device is allocated to multiplications entailing digits appearing in the units order of the fixed factor and the tens order of the variable factor and another such device is allocated to multiplications entailing digits appearing in the tens order of the fixed factor and digits appearing in the units order of the variable factor, the right hand components of the products represented on such devices are added to ascertain the product that is to appear in the tens order of the final product (disregarding carry-overs from the units order of the final product) so that therefore such product representing devices pertain to the tens order of the final product. Hence, yet another object of this invention is to enable the various product representing devices pertaining to a particular order of the final product to be operatively related to devices pertaining to this particular order of the final product so as to thereby enable the devices pertaining to the particular order of the final product to be disposed in a position to represent the sum of the right hand components of the products represented on the product representing devices operatively related to the devices pertaining to the particular order of the final product (again disregarding carry-overs from the next lower order).

Because the right hand components of products represented on the various product representing devices pertain to a particular order of the final product, the left hand components of such products pertain to the next higher order of the final product and, therefore, yet another object of my invention is to so arrange the devices pertaining to the respective orders of the final product and which respectively cooperate with product representing devices pertaining to such order in such a manner that the left hand components of the products represented on products representing devices pertaining to a particular order of the final product may be transferred or carried over into devices pertaining to the next higher order of the final product so that such carry-overs will be added to the products represented on the product representing devices operatively associated with devices pertaining to such next higher order of the final product, wherefore, in the course of a multiplying operation of my mechanism the devices pertaining to a particular order of the final product will not only come to rest in a position to represent the sum of the right hand components of the represented products operatively related to, but also such sum plus the carry-over from devices pertaining to the next lower order of the final product. Further objects of this invention are to enable carry-overs from one order of the final product to be entered in devices pertaining to the next order of the final product simultaneously with the operation of the devices pertaining to the orders of the final product to determine the values of the represented products respectively operatively related to the devices pertaining to the orders of the final product; and to enable such carry-overs to be made into devices pertaining to such next higher order of the final product in such a way that the carry-overs are entered in the devices pertaining to such next higher order in a manner equivalent to the representation of the products on the product representing devices operatively related to the devices pertaining to such next higher order of the final product.

Yet further objects of this invention are to enable the final products ascertained in operations of my multiplying mechanism to be printed; to enable the apparatus effective to print such products to be set up under control of devices operative to read out the digital values which the devices pertaining to the respective orders of the final product are set to represent in the course of an operation of my multiplying mechanism; and to associate with such apparatus and read-out devices a zero suppressing mechanism so as to enable blanking characters to be moved into printing position insofar as apparatus pertaining to selected orders of the final product may be concerned.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a transverse sectional view through a machine of the character in which my invention may be embodied, said view being taken at one side of the guideway for the printing and control devices that are sequentially fed through such a machine;

Fig. 2 is another transverse sectional view through a machine of the aforesaid character and taken through the guideway for printing and control devices;

Fig. 3 is a plan sectional view taken substantially on the line 3—3 on Fig. 1;

Fig. 4 is a sectional view taken substantially on the line 4—4 on Fig. 3;

Fig. 5 is a plan view taken substantially on the line 5—5 on Fig. 2;

Fig. 6 is a sectional view taken substantially on the line 6—6 on Fig. 5;

Fig. 7 is a vertical sectional view taken substantially on the line 7—7 on Fig. 6;

Fig. 8 is a detail view taken substantially on the line 8—8 on Fig. 5;

Fig. 9 is a plan sectional view showing the connection of the printing and control device sensing mechanism to the multiplying mechanism of this invention;

Fig. 10 is a vertical sectional view taken substantially on the line 10—10 on Fig. 9;

Fig. 11 is a transverse sectional view across the machine and showing my multiplying mechanism in side elevation;

Fig. 14 is a transverse sectional view through the machine and showing in elevation the side of my multiplying mechanism opposite that illustrated in Fig. 11;

Fig. 15 is a plan sectional view taken substantially on the line 15—15 on Fig. 11;

Fig. 16 is a sectional detail view taken on the line 16—16 on Fig. 15;

Figure 24:
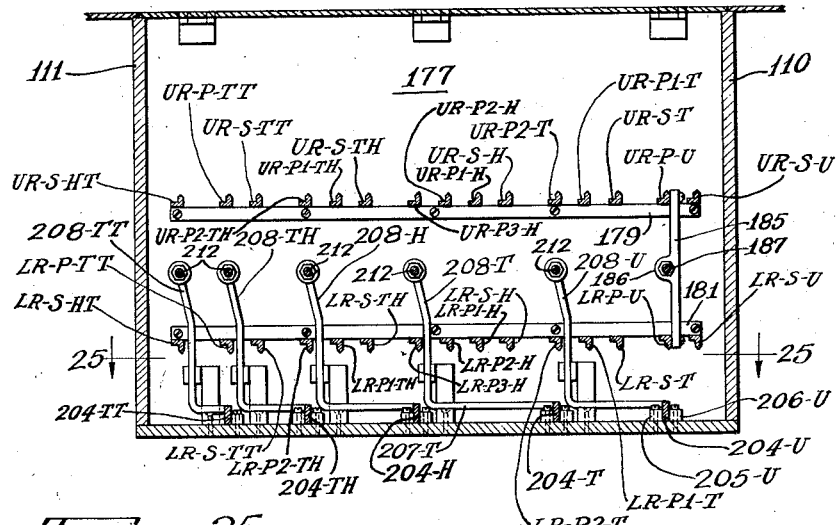
Figure 25:
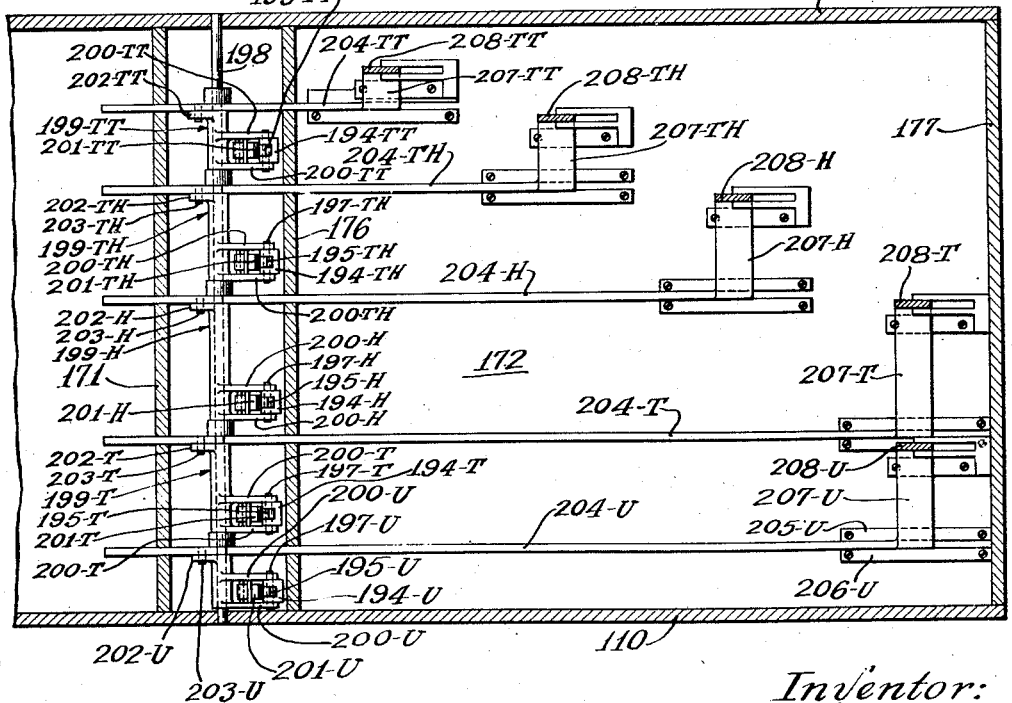

Figs. 17, 18, 19, 20, 21, 22, 23, and 24 are sectional views taken substantially and respectively on the lines 17—17, 18—18, 19—19, 20—20, 21—21, 22—22, 23—23, and 24—24 on Fig. 15;

Fig. 25 is a sectional view taken substantially on the line 25—25 on Fig. 24;

Fig. 26 is a view taken substantially on the line 26—26 on Fig. 23;

Fig. 27 is a plan view of the element shown in Fig. 26;

Fig. 28 is a sectional view taken substantially on the line 28—28 on Fig. 26;

Fig. 29 is a detail view taken on the line 29—29 on Fig. 28;

Figs. 30 and 31 are detail views taken substantially and respectively on the lines 30—30 and 31—31 on Fig. 26;

Figs. 32 and 33 are schematic views illustrating the set-up of the type segments under control of the read out portions of my multiplying mechanism;

Fig. 34 is a schematic view illustrating the initial positions of certain of the operative portions of my mechanism at the initiation of the multiplication;

Fig. 35 is a view similar to Fig. 34 showing the parts in positions assumed thereby at the completion of a particular multiplication;

Fig. 36 is an elevational view of a modified form of a portion of my multiplying mechanism;

Fig. 37 is a sectional view taken substantially on the line 37—37 on Fig. 36;

Fig. 38 is a fragmentary detail view corresponding to the left-hand portion of Fig. 6 and showing the parts as arranged for cooperation with the modified form of my invention illustrated in Figs. 36 and 37;

Fig. 39 is a vertical sectional view of a modified form of a set-up mechanism that may be employed in connection with my multiplying mechanism;

Fig. 40 is a sectional view taken substantially on the line 40—40 on Fig. 39;

Fig. 41 is a plan view of the devices illustrated in Figs. 39 and 40; and

Fig. 42 is a detail view taken substantially on the line 42—42 on Fig. 39.

The multiplying mechanism of the present invention as shown in the accompanying drawings is adapted for use in a machine of the character disclosed in Gollwitzer Patent No. 2,296,277 patented September 22, 1942, but it will be understood that such illustration of my mechanism is for the purpose of this disclosure since my mechanism may be employed either alone or in association with machines other than that disclosed in the aforesaid patent.

As shown in the drawings, my mechanism is effective to set up type segments TS, Fig. 1, which are disposed adjacent to an anvil A, Figs. 2 and 4, on which printing and control or like devices D are adapted to come to rest to have impressions made therefrom upon operation of the platen mechanism PL, Fig. 1, which is also operative to make impressions from the type faces F on the type segments TS. Also in the present instance and as best shown in Fig. 3, a printing numbering mechanism N, a printing dating device DD and a printing plate SP from which a signature or the like may be printed are also associated with the anvil A in such positions that printing faces of the platen mechanism PL cooperate therewith to make impressions therefrom when impressions are made from a printing device D disposed on the anvil A and type faces F on the type segments TS.

The illustrated form of my multiplying mechanism is of such nature that one of the two factors of the to be performed multiplications may be set up manually to be used in a plurality of successive to be performed multiplications, and in the present instance the other factor of each to be performed multiplication is derived from a representation of such factor afforded on a printing and control device D. The printing and control devices illustrated in the accompanying drawings are of the nature to which Gollwitzer Patent No. 2,132,412, patented October 11, 1938, pertains, but it will be understood that resort might be had to other devices to bear representations of the other factor of each to be performed multiplication without departing from the purview of my invention.

As best shown in Fig. 3, the printing and control devices that are sequentially passed through the present machine each embodies a frame 50 on one face of which an embossed printing plate 51 is releasably retained. An index card 52 is also releasably retained on the same face of the frame 50 as that on which the printing plate 51 is retained and desirably an impression is made on the exposed face of the index card 52 from at least selected of type characters T that are embossed on the plate 51 to appear in relief on the exposed face of this plate. A control card 53 is also secured on the face of the frame or carrier 50 and this card bears on the exposed face thereof a printed field F which delineates index point positions at which perforations may be selectively formed in the card and in the underlying portion of the carrier 50 to thereby afford representation of the digits appearing in various orders of the factor of each to be performed multiplication that is to be derived from the particular printing and control device D. In this instance the field F is arranged to delineate index point positions for the digits of a three-order number, wherefore three rows of such positions are afforded. The uppermost row of index point positions in the field F pertains to the hundreds order of the factor to be represented, the middle row of index point position pertains to the tens order of such a factor and the lowermost row of index point positions pertains to the units order of such a factor. In the present instance the row of index positions in the field F includes ten such positions and is in alignment with the respective index point positions in each of such rows, a numerical designation of the digital value to be represented by a perforation P at the aligned index point position is afforded. Thus, the arrangement provides for actual representation of each of the digits in a notation including zero. The field F of the printing and control device shown in Fig. 3 is perforated to represent the factor "296."

Printing and control devices as D are introduced into a magazine H, Fig. 2, which extends upwardly above the bed of the machine desirably along the rear edge thereof as is well understood in the art. Rails as 54 and 55 are supported by the bed of the machine and extend forwardly from the magazine H to afford a guideway G through which the printing and control devices withdrawn from the magazine may be advanced to printing position above the anvil A which extends across the guideway G as illustrated in Figs. 2 and 4. What are known in the art as carrier bars 56 and 57 are reciprocally mounted in rabbets formed in the inner faces and downwardly from the upper edges of the rails 54 and 55 to respectively receive the carrier bars 56 and 57. Depressible pawls as 58 are mounted in the upper surfaces of these carrier bars at spaced positions therealong, the pawls as 58 being arranged in pairs and the pawls of the respective pairs being respectively mounted in carrier bars 56 and 57 in alignment with each other. The rearwardmost pair of pawls in the carrier bars are effective to withdraw the lowermost printing and control device D from the magazine H and to thereafter advance this printing and control device into sensing position SP, Fig. 2. The pawls of the pair immediately forward of the rearwardmost pair of pawls are effective to withdraw a printing and control device from the sensing position SP and to advance this printing and control device to printing position above the anvil A. The pawls of the forwardmost pair are effective to withdraw a printing and control device from printing position to advance the same to the discharge chute 59, Fig. 2, through which printing and control devices pass to be collected in a drawer 60 suitably and removably supported in the machine in a manner well understood in the art.

In order that the pawls as 58 will be effective to withdraw and advance the printing and control devices from one station to another in the manner explained above a reciprocatory movement is imparted to the carrier bars 56 and 57. To this end brackets as 61, Fig. 2, are secured to the inner faces of the carrier bars and a rod 63 is extended between these brackets. The rod 63 is embraced by the arms of a yoke 64 provided at the free end of the arm 65, Fig. 2, of a bell crank 66 which is pivotally mounted on a shaft 67 carried with a frame of the machine. The arm 68 of the bell crank 66 is pivotally connected to a crank arm 69 to which a reciprocatory movement is imparted upon rotation of the main drive shaft 70 of the machine, the drive shaft 70 being set in operation when the machine is to be operated and this shaft is driven from a suitable source of power such as an electric motor (not shown). In the course of operation of the main drive shaft 70, the arms 65 and 68 of the bell crank 66 reciprocate between the full and broken line positions thereof shown in Fig. 2 to thereby reciprocate the carrier bars 56 and 57 so as to bring about advancing of the printing and control devices D in the manner explained hereinabove.

The platen PL includes an arm 71, Fig. 1, that is secured to a rockable shaft 72 carried by the frame of the machine and to which a reciprocatory movement is imparted from suitable devices associated with the main drive shaft 70 in the manner well understood in the art. Upon rocking of the shaft 72 the platen arm 71 is moved from the retracted position thereof shown in Fig. 1 to bring the printing faces 73 thereon into cooperation with the printing means aligned therewith. Thus a platen face 73 is aligned with the printing plate 51 on a printing and control device D disposed at printing position above the anvil A. Another face as 73 is aligned with the type faces on the type segments TS that are disposed at printing position thereof PP, Fig. 3. Yet other printing faces as 73 are respectively aligned with type characters disposed in printing position in the numbering device N, dating device DD and signature plate SP.

As best shown in Figs. 3 and 4 inked ribbons IR are directed across the printing means with which the printing faces 73 are adapted to cooperate, and in the course of operation of the machine, sheets as S to be printed are advanced through the sheet guideway SG afforded by slots formed in the rails 74 and 75, Fig. 1, secured to the table top of the machine. In the manner well understood in the art the sheets are successively fed through the sheet guideway SG under the influence of rollers as 76, Fig. 1, which are set in rotation when the machine is in operation and each sheet is brought to rest as it moves into alignment with the printing means shown in Fig. 3 by having the leading edge thereof move into engagement with a stop finger that is depressed into the path of movement of the sheet at a proper time in the course of operation of the machine, such stop finger being retracted from engagement with the sheet after impressions have been made thereon whereupon the sheet moves from printing position to be collected with other such printed sheets in a suitable sheet collector.

In order to insure accurate positioning of the printing and control devices D at sensing position SP and printing position above the anvil A, each printing and control device D desirably has a notch as 77, Fig. 5, formed therein. A spring pressed pawl 78 is supported from the rail 55 at sensing position SP and as a printing and control device D moves into sensing position SP this pawl seats in the notch as 77 in such printing and control device D so as to thereby accurately position the printing and control device D in the position SP. In this regard the perforations as P formed in the respective printing and control devices are accurately oriented relative to the notch as 77 formed in the particular printing and control device. The spring pressed pawl as 78 is accurately positioned relative to the parts in the machine that are adapted to cooperate with the perforations as P and it is this interrelation that insures proper and accurate positioning of printing and control devices D and the perforations P at sensing position SP. A similar spring pressed pawl 79, Fig. 3, is provided at printing position above the anvil A so as to thereby insure accurate positioning of the respective printing and control devices that come to rest on the anvil.

The devices that are adapted to cooperate with perforations P in each printing and control device that comes to rest at sensing position SP are best shown in Figs. 5 to 8 inclusive. By referring to Fig. 7 it will be seen that a guide bearing 80 is secured to the outer face of the rail 54 and a similar guide bearing 81 is secured to the outer face of the rail 55 in transverse alignment with the guide bearing 80. A plunger 82 is passed through the guide bearing 80 and a similar plunger 83 is passed through the guide bearing 81. A sensing block 84 is secured to the upper ends of plungers 82 and 83 to be supported thereby. Springs as 82' and 83' are respectively disposed about the plungers 82 and 83 and these springs are effective to urge the sensing block 84 into the upper retracted position thereof shown in Figs. 6 and 7.

Openings 85 are formed in the block 84 in alignment with the positions that will be occupied by the index point positions defined by the field F on a printing and control device D accurately positioned at sensing position SP in the manner described hereinabove. Thus in the present instance where three rows of index point positions are defined by each field as F and where there are to be ten index point positions in each row, three rows of ten openings each are formed in the block 84. Each opening 85 in the block 84 terminates inwardly of the lower wall thereof and a restricted opening as 86 is formed in the lower wall of the block 84 in alignment with each opening 85. Sensing pins as 87 are extended through each opening as 86 with the heads as 88 thereof disposed in the openings 85. Springs as 89 in each of the openings 85 are effective on the heads as 88 to dispose the sensing pins as 87 in the outwardly projected positions thereof shown in Fig. 6. A plate 90 is secured to the upper face of the block 84 to serve as reaction member for the springs as 89.

A block 91 is extended between and secured to the rails 54 and 55 in alignment with the sensing block 84 and this block has a plurality of openings 92 formed therein, the openings as 92 are respectively aligned with the sensing pins as 87. A push pin as 93 is mounted in each opening as 92 and is guided for accurate movement by passage through an opening 94 formed in a guide plate 95 supported beneath the block 91. Each push pin 93 is connected to the cable as 96 of a Bowden cable, the casing 97 of each such cable being secured in an opening as 98 in a block 99 supported beneath the guide plate 95.

When a printing and control device as D has been accurately positioned in the sensing position as SP, the sensing block 84 is moved downwardly to advance the sensing pins as 87 toward the index point positions of the field F on the printing and control device at sensing position. Those sensing pins 87 which are aligned with perforations as P in such field pass through these perforations and into engagement with the aligned pins 93 and continued downward movement of the sensing block 84 is effective to force each so engaged push pin 93 and the Bowden cable 96 attached thereto away from the block 91. However, those sensing pins as 87 which engage index point positions in the field as F whereat a perforation as P has not been formed, merely rest on the face of the control card 53 and in the course of continued downward movement of the sensing block 84 compress the springs as 89 aligned therewith.

In order to move the sensing block 84 downwardly in the manner just described, links 100 and 101 are pivotally and respectively connected to the lower ends of the plungers 82 and 83 as best shown in Fig. 7. The links 100 and 101 are fast on a shaft 102 that is journaled in and extends beyond the rails 54 and 55, these links being disposed outwardly of these rails as best shown in Fig. 5. An arm 103 is supported for rocking movement on the shaft 102 outwardly of the link 100 and the arm 103 includes a lug 104 that extends over the link 100 and which is urged into engagement with this link by a spring 105 Fig. 6 that extends between the lug 104 and a spring anchor on the rail 54. The springs 84 and 85 are effective through the plungers 82 and 83 to normally urge the links 100 and 101 upwardly into engagement with stops 106 and 107 Fig. 5 respectively extended outwardly from the rails 54 and 55.

An inclined pad 108 is provided at the free end of the arm 103 and the lower end thereof lies in the path of movement of a roller 109 rotatably mounted on a lug depending from the bracket 61 fast to the carrier bar 56. During the course of movement of the roller 109 from the broken line position thereof shown in Fig. 2 to the full line position thereof shown in this view, which is to say, during the time an advancing movement is being imparted to the printing and control devices by the pawls as 58, the roller 109 strikes the underside of the pad 108 and pivots the arm 103 so as to permit the roller to move beyond the lower end of the pad 108. As soon as the roller 109 moves beyond the pad 108, the arm 103 pivots to dispose the upper surface of the pad 108 in the path of the roller 109, as shown in the full line position of the roller 109 in Fig. 2. Hence, immediately after initiation of movement of the arm 65 from the full line position thereof shown in Fig. 2 to the broken line position thereof shown in this view, the roller 109 rides over the upper surface of the pad 108 and in so doing pivots the arm 103 clockwise as viewed in Fig. 6. Such movement of the arm 103 is effective through the pad 104 to move the link 100 downwardly, and since this link is fast to the shaft 102 as is the link 101, the link 101 also moves downwardly whereupon the plungers 82 and 83 are moved downwardly through the guide bearings 80 and 81 so as to move the sensing pins 87 downwardly with the effect hereinabove described and hereinafter referred to, namely, of pushing those push pins 93, and the Bowden cables 96 that are attached thereto, which are engaged by sensing pins as 87 that pass through perforations P in the field F on the printing and control device D disposed at sensing position SP.

In the present instance where there is a direct digital representation of one factor of each of the to be performed multiplications on each printing and control device as D, the sensing pins 87, the push pins 93 and the Bowden cables 96 are arranged in rows, there being one row for each digital order of the factor and ten sensing pins 87, push pins 93 and Bowden cables 96 are provided in each such row so that there is a Bowden cable 96 and cooperating pins for zero and each significant digit of a notation in each order of the factor. Thus as shown in Figs. 9 and 10, three rows of openings 92 are provided in the block 91 and there are ten openings 92 in each such row, each having a push pin 93 therein to which ten Bowden cables as 96 are respectively connected. The sheaths 97 of the Bowden cables 96 are secured in openings as 98 in the plate 99 which openings 98 are likewise arranged in three rows with ten openings in each row. The ten sheaths 97 housing the Bowden cables 96 that cooperate with the pins 93 in the lowermost row of openings 92, Fig. 9, are devoted to the units order and are designated as the sheaths 97—U. The sheaths which house the Bowden cables 96 cooperating with the push pins 93 in the middle row of openings 92, Fig. 9, are devoted to the tens order of the factor and are designated 97—T. The sheaths housing the Bowden cables 96 that cooperate with the pins 93 in the uppermost row of openings 92, Fig. 9, are devoted to the hundreds order of the factor and are designated 97—H.

As best shown in Figs. 9 and 10 the sets of sheaths 97—U, 97—T and 97—H are respectively directed to the portions of the multiplying mechanism of this invention which respectively have to do with the units, tens and hundreds orders of the factor of the to be performed multiplications that is represented by perforations as P, as aforesaid, as will be explained presently. This multiplying mechanism is mounted between side plates 110 and 111, Fig. 15, thereof and as best shown in Fig. 9, supporting plates 112—U, 112—T and 112—H are secured to and project outwardly from the side plate 110 adjacent the aforesaid portions of the multiplying mechanism. As best shown in Figs. 9 and 10, a plate as 115—T is secured to the supporting plate 112—T adjacent the free edge thereof and this plate 115—T extends in parallel relation with the adjacent side wall 110 of the multiplying mechanism. Ten openings respectively designated 116—T—0 to 116—T—9, Fig. 10, are provided in the plate 115—T, and the sheaths of the set of sheaths 97—T are respectively secured in these openings 116.

Another plate 117—T is secured to the plate 112—T and the side wall 110, and yet another plate 118—T is secured to the plate 112—T intermediate the plates 115—T and 117—T. Ten openings 119—T—0 to 119—T—9 are provided in the plate 117—T and ten openings 120—T—0 to 120—T—9 are provided in the plate 118—T, the openings 119 being respectively aligned with the openings 120, which in turn are respectively aligned with the openings 116. Pins 121—T—0 to 121—T—9 are mounted in the aligned openings 119 and 120 and have collars as 122 thereon which normally engage the inwardly disposed face of the plate 118—T to thereby orient the pins 121 in the at rest positions thereof. The Bowden cables 96 in the sheaths 97 secured in the plate 116 are respectively secured to the adjacent ends of the pins 121.

An arrangement such as that shown in Fig. 10 and described hereinabove with reference to the various pins 121—T and the sheaths of the set 97—T, which has to do with the tens order of the factor of the to be performed multiplications that is derived from fields as F on printing and control devices as D (which factor will be referred to hereinafter as the variable factor of the to be performed multiplications) is provided for the units and hundreds orders of such factor so that the sheaths of the sets 97—U and 97—H are secured in openings as 116—U—9 and 116—H—9 in plates 115—U and 115—H. Thus where parts for the units and hundreds orders of the variable factor correspond to parts hereinabove described and designated by reference characters including the letter T correspond to parts designated by such reference characters, similar numerical designation is applied to such parts in the units and hundreds orders but the letter U, in case of parts for the units order, and the letter H, in case of parts for the hundreds order, is included in such reference characters.

It will be understood that the various pins 121 respectively pertain to a particular digit in the order in which the particular pin is included as do the sensing pins 87, push pins 93 and Bowden cables 96. Therefore, when a particular Bowden cable is pushed under the effect of a sensing pin as 87, by the reason of the passage of such pin through a perforation P in the field F on the printing and control device D disposed at sensing position SP, a particular pin 121 will likewise be pushed so as to move the shoulder as 122 on the particular pin away from the adjacent face of the adjacent plate 118. The pins 121 which are thus pushed inwardly away from the side plate 110 are effective to set up in the multiplying mechanism representations of the digits in the variable factor of the to be performed multiplications in a manner explained presently.

In a manner now to be described, the other factor of each of the to be performed multiplications (hereinafter referred to as the fixed factor) is, in the present instance, manually set up, and to this end means are afforded in the multiplying mechanism of this invention whereby each digit of such a fixed factor may be represented in the multiplying mechanism. The manner in which such factors are set up can best be ascertained by reference to Figs. 26 to 29, inclusive.

Thus as best shown in Fig. 26, a plate 125 is provided which has a flange 126 at the upper edge thereof which with the adjacent portion of the plate affords an arcuate upper surface 127. Ten openings as 128 are provided in the arcuate surface 127, these openings being spaced one from the other along the surface 127 in a manner explained hereinafter. The openings 128 respectively pertain to the digits of a notation. Thus, as viewed in Figs. 26 and 27, the opening at the left-hand end of the series of openings in the surface 127, designated 128—0, pertains to zero while the opening at the opposite end of the series, designated as 128—9, pertains to the digit 9, the other openings in the series respectively pertaining to the digits 1 to 8 in ascending order, the digit to which each opening pertains being associated with the reference character 128 on the drawings.

A bar 130 extends across one face of the plate 125 and has a flange 131 at the upper end thereof that is supported to be movable over the arcuate surface 127, as will be explained presently. A unitary bushing 132 extends upwardly from the flange 132 and has an opening 133 therein which opens through the lower face of the flange 131 and which terminates inwardly of the upper end of the bushing 132. A restricted opening 134 leads into the opening 133 from the upper end of the bushing 132 and a pin 135 is passed through the restricted opening 134 and extends into the opening 133 and is connected at the lower end thereof to a plunger 136 that is movable in the opening 133 and which is forced beyond the lower face of the flange 131 under the influence of a spring 137 confined in the opening 133. Movement of the plunger 136 and pin 135 under the influence of the spring 137 is limited by a knob 138 secured to the portion of the pin 135 projecting above the opening 134.

To support the bar 130 to enable movement of the flange 131 over the surface 127, an opening 139 provided in the plate 125 near the lower left-hand corner thereof as the plate is viewed in Fig. 26, this opening being concentric with the arc of the surface 127. The end of this opening 139 opposite the face of the plate 125 over which the bar 130 is movable is countersunk as indicated at 140. Thus when the boss 141 at the lower end of the bar 130 has been disposed in the opening 139 and the bar 130 has been engaged with the adjacent face of the plate 125, the portion of the boss 141 adjacent to the countersunk portion 140 of the opening 139 may be peened over to thereby secure the bar 130 to the plate 125 for swinging movement over the adjacent face of the plate 125 so as to enable the flange 131 to ride over the arcuate surface 127 and thereby permit the plunger 136 to be selectively seated in one of openings 128 so to thereby dispose the bar 130 in selected position on the plate 125. Such selective positioning of the bar 130 is operatively related to stop pins that are operatively related to the pins as 121 and which are aligned with and cooperate with pins that are mounted in the plate 125, as will be explained hereinafter.

Three blocks 142, 143 and 144 are secured to the plate 125 on the side thereof opposite that over which the bar 130 is movable and slightly inwardly of the left-hand edge of the plate as it is viewed in Fig. 26. Ten openings 145—0 to 145—9 are extended through the plate 125 and the blocks 142, 143 and 144, and ten pins 146—0 to 146—9 are respectively mounted in these openings. The openings 145—0 to 145—9 and the pins 146—0 to 146—9 are spaced one from the other in the same amounts as the openings 119—0 to 119—9 and pins 121—0 to 121—9, Fig. 10, are spaced one from the other so as to enable an operative relation to be established among these pins, this being explained hereinafter. A groove as 147, Figs. 30 and 31, is formed in the inner face of each of the blocks 142, 143 and 144 so that a continuous channel is afforded through which the pins 146—0 to 146—9 extend. A spring 148 is disposed in the channel thus afforded, and as best shown in Fig. 26, is arranged to pass adjacent pins on opposite sides thereof so as to thereby apply spring tension to these pins to retain them in positions into which they may be pushed in a manner to be explained presently.

Three blocks 149, 150 and 151 are secured to the same face of the plate 125 as that to which the blocks 142, 143 and 144 are secured, the blocks 149, 150 and 151 being secured to the plate 125 along the right-hand edge thereof as the plate is viewed in Fig. 26. Ten openings 152—0 to 152—9 are formed in the plate 125 and the blocks 149, 150 and 151 and pins 153—0 to 153—9 are respectively mounted in these openings. The spacing between the openings 152—0 to 152—9 and the pins 153—0 to 153—9 is the same as that between the openings 119—0 to 119—9 and pins 121—0 to 121—9. A channel 154 is formed in the inner faces of the blocks 149, 150 and 151 and a spring 155 is disposed in this channel to pass about the pins 153—0 to 153—9 to apply spring tension thereon.

As will be explained, a plurality of plates as 125 are utilized in my multiplying mechanism and most of such plates are supported for movement in the mechanism, such movement being effected in the summarizing operation of my multiplying mechanism in the course of which the final product is ascertained. Such movement of the plurality of plates as 125, and the devices which cooperate therewith in a summarizing operation, is effected along supporting rails as LR and UR, Figs. 26 and 28, provided for the plates in the mechanism. The space between the lower edge of the block 142 and the upper edge of the block 143 and the space that is aligned with such space that is afforded between the lower edge of the block 149 and the upper edge of the block 150 affords accommodation for an upper rail UR along which a plate as 125 is to be movable. Yet further, studs 157 and 158 are mounted in the plate 125 and rollers 159 and 160 are mounted on these studs. As best shown in Fig. 30, each roller as 159 has a V-shaped groove formed in the periphery thereof that is disposed to travel on the upper V-shaped edge of a rail as UR. Other rollers 161 and 162 are mounted on studs 163 and 164, these rollers having the peripheries thereof in alignment with each other and these rollers travel on a lower rail as LR that is passed through the space as between the lower edge of the block 143 and the upper edge of the block 144 and the lower edge of the block 150 and the upper edge of the block 151.

The pins as 146 and 153 that are mounted in the plate 125, in a manner that will be explained hereinafter, are selectively pushed upon the selective pushing of pins as 121, Figs. 9 and 10, the interrelationship that is established among such pins being explained presently. Thus since the pins as 146 and 153 are operatively related to the different sets of pins as 121, these sets of pins respectively pertain to the digits in orders of the variable factor of the to be performed multiplications, which as has been explained hereinabove, is the factor of a to be performed multiplication that is derived from a field as F on a printing and control device as D. Moreover, the other factor of each to be performed multiplication, herein referred to as the fixed factor, is represented on the plates 125, it being the positions of a bar as 130 on a plate as 125 that represents the digits in an order of the fixed factor of the to be performed multiplications, such positioning of the bars 130 being effected by selectively disposing a plunger as 136 in an opening as 128 on the adjacent plate 125. To this end and as best shown in Fig. 27, the digits "0" to "9" are preferably engraved or otherwise afforded on the surface 127 respectively adjacent the openings 128 to thereby designate the numerical significance of the adjacent opening 128. Thus when a particular digit in an order of the fixed factor is to be represented, the plunger 136 is caused to seat in the opening 128 aligned with the particular digit that is to be represented.

The disposition of a bar 130 in a selected position on the plate 125 to thereby represent a particular digit in an order of the fixed factor also affords representations of each product that may result from multiplication of such digit by each digit that may appear in an order of the variable factor. Such products are represented by the spaces between an edge 165 on the bar 130 from the peripheries of the various pins 146 in such plate. Such spaces between the edge 165 and the pins 146—0 to 146—9 are measured along a path parallel to the path of travel of the rollers 157 and 158 and the rollers 161 and 162 along the rails UR and LR respectively, which is to say, the spaces are measured along a path parallel to the path of travel of the plate 125 and also the path of travel of devices, explained hereinafter, which cooperate with the plates 125 in a summarizing operation.

It is important that the aforesaid spaces between the edge 165 and the various pins 146 be measured along the aforesaid path of travel because, in view of the fact that the bar 130 is moved into various angular positions with respect to the peripheries of the pins 146, the tangential relation between these pins and the edge 165 will vary with variations in the angular position of the bar 130. Thus, when the bar 130 is in a vertical position on the plate 125 shown in broken lines in Fig. 26, at which time the plunger 136 is seated in the opening 128—0, the edge 165 on the bar 130 is tangential to each pin 146 on the horizontal diameter of such pin. However, when the bar 130 is disposed in the full line position thereof shown in Fig. 26, to represent the digit 9, the edge 165 is tangential to pins as 146—2 and 146—6, as these pins are shown in broken lines in Fig. 26, along the diameters of these pins inclined with reference to the horizontal. Furthermore, when the bar 130 is disposed in other positions to represent significant digits, the bar will be tangential to the pins 146 along diameters inclined with reference to the horizontal, such tangential diameters increasing in angularity as the value of the digit represented by the position of the bar 130 increases in value.

In order to compensate for such variation in the tangential relationship between the edge 165 and the peripheries of pins as 146, the aforesaid product representing spaces are, as stated above, measured along a path parallel to the path of travel of the plate 125 and the devices related thereto. This is represented in Fig. 26 by the full and broken line positions of the pin 146—6. The broken line position of the pin 146—6 is spaced 54 unit spaces from the full line position of this pin and such unit spaces are measured between the centers of the two positions of the pin 146—6. This spacing is equal to 54 unit spaces since the pin 146—6 pertains to the digit 6 in an order of the variable factor and the position of the bar 130 to be tangential to the broken line position of the pin 146—6 represents the digit 9 in an order of the fixed factor. Furthermore, the pin 146—2 is shown in full and broken line positions in Fig. 26 and the distance between the centers of these two pins is equal to 18 unit spaces along the path of travel of the plate 125, 18 being the product resulting from the multiplication of the digit 2 represented by the pin 146—2 and the digit 9 represented by the position of the bar 130.

The location of the opening 128—9 to dispose the bar 130 in the full line position thereof shown in Fig. 26 and tangential to the broken line positions of the pins 146—6 and 146—2 is determined by determining the locations of the broken line positions of at least two pins as 146—6 and 146—2 and then causing the edge 165 to be tangential to these broken line positions. Yet further, in order to determine the location of the opening 128—8, the broken line positions of at least two pins as 146—6 and 146—2 are determined so as to represent the products resulting from the values represented by such pins and the digit 8 which the bar 130 will represent when the plunger 136 is seated in the opening 128—8. Here again, when the broken line positions of two pins as 146—6 and 146—2 have been determined to represent these products, the edge 165 is disposed to be tangential to the peripheries of the broken line positions of such pins, and this, in turn, determines the location of the opening 128—8. A similar procedure may be followed for determining the location of each of the other digit-representing openings 128, and in this regard it will be noted that the distance between adjacent openings 128 decreases as the value of the digits represented by such aforesaid openings increases. Thus, the space between the openings 128—0 and 128—1 is greater than the distance between the openings 128—8 and 128—9.

It will be understood that the reference hereinabove to locating the openings 128 by disposing pins as 146—6 in the broken line positions thereof is the theoretical procedure for locating the openings 128, since in the manufacture of plates as 125 the location of the respective openings 128 would be determined and a suitable fixture would be provided to enable these openings to be drilled or otherwise provided in the surface 127 in accurate locations.

Thus, each respective position into which the bar 130 may be moved affords representations of all of the products that may result from multiplication of the particular digit the bar 130 is set to represent by the digits to which pins 146 respectively pertain.

For example, if the plunger 136 is seated in the opening 128—1, then the edge 165 is spaced from the periphery of the pin 146—1 in an amount that is referred to hereinafter as one unit space, such unit space representing the product 1 that results when the digit 1 represented by the bar 130 is multiplied by the digit 1 represented by the pin 146—1. Moreover, when, as above, the plunger 136 is seated in the opening 128—1, the edge 165 is spaced from the pin 146—9 in an amount equal to 9 unit spaces, 9 being the product resulting from the multiplication of the 1 represented by the position of the bar 130 by 9 as represented by the pin 146—9.

When the bar 130 is disposed in the full line position thereof shown in Fig. 26 at which time the plunger 136 is seated in the opening 128—9, the bar 130 is disposed in a position to represent a digit 9 in the fixed factor of the to be performed multiplications. Such disposition of the bar 130 spaces the edge 165 thereof in an amount equal to 9 unit spaces away from the pin 146—1 so that such position of the edge 165 represents the product of the 9, represented by the position of the bar 130, multiplied by the 1 represented by the pin 146—1. At this same time the edge 165 is spaced from the pin 146—9 in an amount equal to 81 unit spaces so as to thereby represent the product of the 9 represented by the position of the bar 130 and the 9 represented by the pin 146—9.

It will, of course, be understood that when the bar 130 is in the full line position thereof shown in Fig. 26 to thereby be prepresentative of the digit 9 in the fixed factor, the edge 165 is spaced from the various pins 146—2 to 146—8 a number of unit spaces equal to the value of the product resulting from the multiplication of the digit 9 by the digital value to which the particular pin 146 pertains, as for example, the edge 165 is spaced from the pin 146—5 in an amount equal to 45 unit spaces, 45 being the product of the digit 9 in the fixed factor, represented by the position of the bar 130, multiplied by 5, the digital value in the variable factor represented by the pin 146—5.

Further in this regard, when the bar 130 is disposed in the broken line position thereof shown in Fig. 26 at which time the plunger 136 is disposed in the opening 128—0, the edge 165 on this bar lies tangential to each of the pins 146—0 to 146—9 so as not to be spaced from these pins since to do so represents the product of zero which should be represented with respect to the digits to which the pins 146—0 to 146—0 pertain when multiplied by zero which is the digit that is represented by the bar 130 when the plunger 136 is disposed in the opening 128—0. Still further the edge 165, in each of the positions into which the bar 130 may be moved, remains tangential to the pin 146—0 to here again represent the product zero since the pin 146—0 pertains to the digit zero in the variable factor of to be performed multiplications and products resulting from multiplication by the digit zero are zero.

As will be explained hereinafter, when a plate as 125 is disposed in the at rest or zero position thereof in my multiplying mechanism, the pins 146 therein are respectively aligned with pins that are selectively pushed upon the pushing of the pins 121 in one of the respective sets thereof. The pins that are thus selectively pushed and which are respectively aligned with the pins 146 in a particular plate 125 are referred to hereinafter as stop pins since such pins are effective to arrest relative movement between devices carrying such pins and the related plate 125, such relative movement being effected in a summarizing operation explained hereinafter. The pushing of one of the pins that is to serve as a stop pin as aforesaid results in pushing the aligned pin 146 in the related plate 125 out of alignment with the edge 165 on the bar 130 on the particular plate and disposes this particular stop pin in position to cooperate with said edge 165. Therefore, this stop pin is substituted for the aligned pin 146 and the hereinabove referred to represented products are therefore selected to be effective in a particular multiplying operation by the pushing of a particular stop pin and selected the position of the bar 130 on the related plate 125. As explained hereinafter, in a summarizing operation the particular stop pin which is pushed as aforesaid is moved toward the edge 165 on the related plate 125 and when the pushed stop pin engages this edge 165 relative movement between this pin and the related plate 125 will be arrested but at this time the stop pin and elements associated therewith will have moved through a distance equal to the number of unit spaces in the represented product.

For example, if the pushed stop pin is aligned with the pin 146—6 in a particular plate 125 and if the bar 130 is set in the full line position thereof in Fig. 26 to pertain to the digit 9 in an order of the fixed factor, then in a summarized operation, the stop pin will move a distance equal to 54 of the aforesaid unit spaces, this being the product resulting from multiplication of the digit 9 represented by the position of the bar 130 by the digit 6 represented by the particular pushed stop pin. Yet further, if the stop pin which is pushed as aforesaid is aligned with the pin 146—0 then irrespective of the position of the bar 130, the stop pin will at once be tangential to the edge 165 so that no relative movement between the stop pin and the related plate 125 will occur so that the effect is the representation of zero as a product which, of course, is the product that results from multiplication of any digit by zero which is to result when the stop pin aligned with the pin 146—0 is pushed.

Thus the determined and varied spacing of the edge 165 on a bar 130 from the peripheries of the pins 146—0 to 146—9 (and also therefore from the peripheries of the stop pins respectively aligned with the pins 146—0 to 146—9) affords representation of all of the products that may result from the multiplication of the digit in an order of the fixed factor, which the bar 130 is set to represent, by all of the digits that may appear in an order of the variable factor, such products being referred to herein as the represented products. Moreover, since the bar 130 on each plate 125 may be disposed in a plurality of digit-representing positions to selectively represent each of the various digits that may appear in an order of the fixed factor, a particular plate 125 may be arranged to afford representations of all of the products that may result from the multiplication of the various digits that may appear in an order of the fixed factor by the various digits that may appear in an order of the variable factor.

Therefore, by utilizing a plurality of plates as 125 in my multiplying mechanism and respectively allocating such plates to multiplications entailing the digits that may appear in a particular order of the fixed factor and the digits that may appear in a particular order of the variable factor, representations may be afforded of all represented products that may result in the multiplications that may be effected within the capacity of my mechanism.

Thus, one plate as 125 will be allocated to multiplications entailing the digits that may appear in the units order of the fixed factor and the digits that may appear in the units order of the variable factor. Yet further, another plate as 125 will be allocated to multiplications entailing the digits that may appear in the tens order of the fixed factor and digits that may appear in the units order of the variable factor. Another such plate will relate to multiplications entailing the digits that may appear in the hundreds order of the fixed factor and the digits that may appear in the units order of the variable factor. Moreover, if provision is to be made for a plurality of orders in the variable factor, other plates will be respectively allocated to multiplications entailing the digits that may appear in the tens order of the variable factor and respectively the digits that may appear in the units, tens and hundreds order of the fixed factor. Hence, there will be a plate 125 to represent the represented products resulting from the multiplications of the digits that may appear in any order of the fixed factor within the capacity of the machine by the digits that may appear in any order of the variable factor.

In order to facilitate identification of the particular multiplications to which a particular plate as 125 is allocated, such plates are referred to hereinafter and are designated in the accompanying drawings by reference characters including the letter "F" to relate to the fixed factor and this is immediately followed by a reference character either "U," "T," or "H" to respectively designate the units, tens and hundreds orders of the fixed factor. Hence the reference character "FU" designates that the particular plate is allocated to multiplications entailing digits that appear in the units order of the fixed factor. Further, insofar as the variable factor is concerned, this is designated in the reference characters by the letter "V" respectively followed by the letters "U," "T" or "H" to respectively designate the units, tens and hundreds orders of the variable factor. Thus, a designation including the reference characters VU designates that the plate pertains to multiplications entailing the digits that may appear in the units order of the variable factor. Therefore, the reference character 125—FU×VU indicates that the particular plate 125 so designated pertains to multiplications entailing the digits appearing in the units order of the fixed factor and the digits appearing in the units order of the variable factor.

The represented products as these are represented on the various plates as 125 are represented in their full value. Thus, for example, where the multiplications entail the digit 9 in the fixed factor, which will be represented by disposing the bar as 130 on the particular plate in the full line position thereof in Fig. 26, and the digit 6 in the variable factor, which will be represented by activating the stop pin aligned with the pin 146—6 in the particular plate 125, the resulting product 54 is represented by the edge 165 on the bar 130 being spaced from the periphery of the pin 146—6 in the amount of 54 unit spaces. Thus, both the right and left hand components of a particular represented product are represented on a particular plate as 125.

As is well understood, however, only the right hand component of such a product pertains to the order of the final product to which a particular plate as 125 is related, such relation being explained presently, while the left-hand component of such a product pertains to the order of the final product immediately above that to which the right-hand component pertains. Thus, where the product 54 results from multiplication of the digit 9 appearing in the units order of the fixed factor by the digit 6 appearing in the units order of the variable factor, the right-hand component 4 of the resulting product pertains to the units order of the final product while the left-hand component 5 pertains to the tens order of the final product. Moreover, in accordance with the hereinabove described arrangement, the product 54 resulting from a multiplication as aforesaid would appear on a plate as 125—FU×VU since the product results from the multiplication of digits appearing respectively in the units orders of the fixed and variable factors. Hence, in order that the right-hand component 4 of this product may be related to the units order of the final product, the plate as 125—FU×VU is operatively associated with a summation member 166—U, to be described presently, which pertains to the units order of the final product and in such circumstances suitable means are afforded for transferring or carrying over into a summation member 116—T described presently, pertaining to the tens order of the final product, the digit 5, the left-hand component of the product 54.

Still further, if the represented product is 30 and this results from multiplication of the digit 5 appearing in the tens order of the fixed factor by the digit 6 appearing in the units order of the variable factor, this product will be represented on a plate 125—FT×VU and the right-hand component of this product will pertain to the tens order of the final product while the left-hand component 3 will pertain to the hundreds order of the final product. In this circumstance and in accordance with the foregoing the plate 125—FT×VU will be operatively associated with a summation member 166—T relating to the tens order of the final product and means will be provided for effecting carry over of the left-hand component of a particular product into a summation member 166—H pertaining to the hundreds order of the final product.

Hence, a summation member 166 will need be provided for each order of the final product in which digits may appear and such summation members will be referred to hereinafter and are designated on the accompanying drawings by the reference character 166 followed by a designation of the order of the final product to which the particular summation member relates. Thus, there will be a summation member 166—U which will relate to the units order of the final product, a summation member 166—T that will relate to the tens order of the final product, a summation member 166—H which will relate to the hundreds order of the final product, a summation member 166—TH which will relate to the thousands order of the final product, a summation member 166—TT which will relate to the ten-thousands order of the final product, and a summation member 166—HT which will relate to the hundred-thousands order of the final product.

In this regard, in the illustrated form of my multiplying mechanism I have afforded accommodation for three orders in the fixed factor and three orders in the variable factor so that the illustrated form of my mechanism is capable of performing any multiplication from 1 times 2 to and including 999 times 999. This latter multiplication results in a product of 998,001, so that therefore, within the capacity of the illustrated form of my mechanism, digits may appear in six orders of the final product wherefor summation members as 166 are provided for six orders in the final product. However, it is not necessary to provide one or more plates as 125 in association with the summation member allocated to the highest order of the final product (the summation member 166—HT in the illustrated form of my multiplying mechanism) since the only entries into this summation member will be carry-overs from the next lower order of the final product. Plates as 125, however, are associated with each other summation member 166 and the number of plates associated with a particular summation member depends upon the order of the final product to which the member pertains and, in a measure, to the capacity of the mechanism.

Insofar as a summation member pertaining to the units order of the final product may be concerned ("units order" being used herein to refer to the most right-hand order of the final product and without reference to the position of a decimal point in the final product and reference herein to the tens and hundreds orders and so forth is made with reference to such designation of the units order) in any circumstance it will be necessary to provide but a single plate as 125 in association therewith and such a plate will be the plate 125—FU×VU. Still further, insofar as the tens order of the final product may be concerned, it will be necessary to provide but two plates 125 in association therewith since but two represented products will, in any circumstance, relate to the tens order of the final product and with reference to the summation member 166T pertaining to the tens order of the final product, the plates that will be associated therewith will be the plates 125—FT×VU and 125—FU×VT.

In further illustration of this the plates that will be associated with the various summation members will be as follows:

| | | | 125—FH×VU | 125—FT×VU | 125—FU×VU |
|---|---|---|---|---|---|
| | | 125—FH×VT | 125—FT×VT | 125—FU×VT | |
| | 125—FH×VH | 125—FT×VH | 125—FU×VH | | |
| 166—HT | 166—TT | 166—TH | 166—H | 166—T | 166—U |

Further in this regard, not only are the various plates as 125 related to the summation members as 166 pertaining to the various orders of the final product, but the summation members are also related one to the other with respect to the orders of the variable factor. Thus it will be seen that each of the plates 125 pertaining to the units order of the variable factor, which is to say, plates designated by a reference character including "VU" are aligned with each other and this likewise applies with respect to plates that pertain to multiplications entailing factors respectively derived from the tens and hundreds orders of the variable factor. In my multiplying mechanism the various plates 125 are physically related one to the other and to the summation members in the manner set forth hereinabove showing the relation of the various plates 125 to the various summation members 166.

The manner in which the various plates as 125 included in my multiplying mechanism are physically related one to the other and to the summation members as 166 to which they respectively pertain is best shown in Figs. 15 to 23, inclusive, of the accompanying drawings, and by referring thereto, it will be seen that six summation members 166, respectively allocated to the orders of the final products, are provided.

The six summation members 166—U, 166—T, 166—H, 166—TH, 166—TT and 166—HT are supported for longitudinal movement toward the various plates as 125 that are respectively associated therewith. To this end each of such summation members has a slot as 167, Figs. 17 to 22 inclusive, formed therein and a roller as 168 is mounted in each of these slots. The rollers 168 are mounted on a pin 169 that extends therethrough and each of the rollers is mounted in a recess 170 that extends downwardly from the upper edge of the plate 171 which is supported on and extends upwardly from the bottom wall 172 of the casing of my multiplying mechanism. These slots 170 are formed in the plate 171 at spaced intervals so as to support the various summation members as 166 in the spaced apart relation thereof shown in Fig. 15.

Each summation member has what will be referred to hereinafter as a sensing head provided at the inner end thereof, these summation heads being designated by the reference character 173 to which there is added a letter designating the order of the final product to which the particular sensing head relates, these suffix letters added to the reference character 173 being the same as the suffix letters respectively applied to the summation members 166. Hence, the summation head on the summation member 166—U is designated 173—U and that associated with the summation member 166—T is designated 173—T and so on.

As best shown in Figs. 15, 17 and 23 each summation head as 173—U has rollers 174 and 175 provided thereon which, like the rollers 159 and 160 and the rollers 161 and 162 provided on a plate as 125, Fig. 26, are respectively adapted to travel along upper and lower rails UR and LR. Thus, the roller 174 on the summation head 173—U is adapted to travel along the upper edge of an upper rail UR—S—U and the roller 175 on this particular summation head is adapted to travel along the lower edge of the lower rail LR—S—U. The various rails UR and LR, as the particular rails UR—S—U and LR—S—U, are extended between the upstanding intermediate wall 176 in the casing of my multiplying mechanism and the rear wall 177 of this mechanism. Thus a support bar 178 extends along the inwardly disposed face of the wall 176 and the adjacent ends of the various rails UR are rested upon and secured to this supporting bar 178. The opposite ends of these upper rails rest upon and are secured to a supporting bar 179 disposed on the inner face of the rear wall 177. Likewise a supporting bar 180 is secured to the inner face of the wall 176 and the adjacent ends of the lower rails are secured to this bar 180, the opposite ends of these rails being secured to and supported by a supporting bar 181 that is secured to the inner face of the rear wall 177. By supporting the various upper and lower rails from the aforesaid supporting bars I am enabled to support all of the upper rails in transverse alignment one with another and I am also able to support all of the lower rails in transverse alignment with each other. Thus the rollers as 174 and 175 on the sensing head as 173—U of each summation member and the disposition of a roller 168 in the slot 167 in the particular summation member affords a three point support for each summation member so as to enable longitudinal movement to be imparted to the summation member. Furthermore, as best shown in Figs. 15 to 27, inclusive, each summation member extends through a slot as 182 in the wall 176, these slots 182 being aligned with the slots 170.

The plate 125—FU×VU is supported on an upper rail UR—P—U and a lower rail LR—P—U. The upper rail UR—P—U is mounted in juxtaposition to the upper rail UR—S—U and the lower rail LR—P—U is mounted in juxtaposition to the lower rail LR—S—U as best shown in Fig. 23. Therefore, the plate 125—FU×VU is supported in juxtaposition to the sensing head 173—U of the summation member 166—U so that therefore the plate 125—FU×VU is arranged for cooperation with the summation member 166—U. This relationship is established since as explained hereinabove the plate 125—FU×VU pertains to the units order of the final product as does the summation member 166—U, the right-hand components of the represented products on this particular plate being adapted to be entered into the summation member 166—U in a summarizing operation, to be explained presently, while as explained hereinabove, the left-hand components of these particular represented products are to be entered into the summation member 166—T pertaining to the tens order of the final product.

The plate 125—FU×VU not only relates to the units order of the final product, but also relates to the units order of the variable factor since the pins 146 therein, and the stop pins aligned with these pins, are to be actuated in accordance with the digital value that is to appear in the units order of the variable factor. Therefore, an operative relation is established between the various pins 146 in the plate 125—FU×VU and the various pins 121—U pertaining to the units order of the variable factor. Thus, as best shown in Fig. 15, the pin 146—3 in the plate 125—FU×VU is aligned with the pin 121—U—3.

The stop pins that are to cooperate with the respective pins 146 in the plate 125—FU×VU are, in the instance of this particular plate and the summation member 166—U, mounted in the sensing head 173—U of this particular summation member. To this end a block 183, Figs. 15 and 17, is provided on the sensing head 173—U, and a plurality of openings are provided in this block and sensing head in which pins 184—0 to 184—9 are respectively mounted, the pins 184—0 to 184—9 being respectively aligned with and extending between the pins 121—U—0 to 121—U—9 and the pins 146—0 to 146—9 in the plate 125—FU×VU. Moreover, as best shown in Fig. 28 the block 183, is discontinuous to include spaced apart portions, these portions corresponding to the blocks 142, 143 and 144 and the blocks 149, 150 and 151, Fig. 26. These spaced apart portions serve to afford clearance for the upper and lower rails UR—S—U and LR—S—U on which the rollers on the sensing head 173—U travel. Moreover, the exposed face of the block 183 is arranged to lie in juxtaposition to the adjacent face of the plate 125—FU×VU and over which the bar 130 on this plate is movable, the inwardly disposed face of the block 183 being disposed to clear the adjacent face of the bar 130.

Therefore, when a particular one of the pins 121—U is pushed under the influence of a sensing pin 87, in the manner explained hereinabove, the aligned pin 184 in the sensing head 173—U is also pushed and this pin 184 is disposed to lie in position to engage the bar 130 on the plate 125—FU×VU upon movement of the summation member 166—U in a summarizing operation.

The plate 125—FU×VU is unlike the other plates 125 included in my multiplying mechanism in that this plate is retained in a fixed position in the mechanism. To this end a bar 185, Figs. 15 and 17, is secured to and extends between the rails LR—P—U and UR—P—U, and this bar has a boss 186 thereon in which an adjustment screw 187 is screw-threadedly mounted, this adjustment screw being threaded into a tapped opening in the bar 150 on the plate 125—FU×VU. Lock nuts 188 cooperate with the adjustment screw 187 to secure this screw in adjusted positions, and by manipulating the screw 187, the position of the plate 125—FU×VU on the rails LR—P—U and UR—P—U may be adjusted so as to thereby enable the pins 146 in this plate to be aligned with the stop pins 184 in the sensing head 173—U.

As best shown in Figs. 15 and 17, springs 189 and 190 extend between spring anchors on the wall 177 and spring anchors on the sensing head 173—0 so as to thereby urge the sensing head 173—U and, therefore, the summation member 166—U toward the plate 125—FU×VU and the bar 130 thereon. The effect of the springs 188 and 189 is resisted by engagement of the toe portion 191—U, Fig. 17, on the summation member 166—U with a bail 192 to be described in detail hereinafter. When, however, the bail 192 is caused to move toward the right as viewed in Fig.

17, the summation member 166—U and the sensing head 173—U are freed to the effect of the springs 189 and 190 and thereupon the sensing head 173—U may move toward the edge 165 on the bar 130 on the plate 125—FU×VU, this being the summation movement of the summation member 166—U. The amount the sensing head 173—U and summation member 166—U may move under such circumstances will be determined by the value of the particular represented product. Thus, if the pin 121—U—6 and, therefore, the pin 184—6 in the sensing head 173—U have been pushed, this pin 184—6 will be disposed to engage the edge 165 on the bar 130 of the plate 125—FU×VU, upon summation movement of the head 173—U and if, at this time, the bar 130 on this plate is disposed in a position to be representative of 9 (in which position the bar 130 is shown in Fig. 17), the sensing head 173—U and the summation member 166—U will move through 54 of the aforesaid unit spaces since under these circumstances the represented product will be 54.

When the bail 192 is in the at rest position thereof shown in Fig. 17, the summation member 166—U is disposed in the zero representing position thereof and at this time the pins 184 in the sensing head 173—U are aligned with the respectively related pins 121—U and also the respectively related pins 146 in the plate 125—FU×VU, the adjustment screw 187 being adjusted to insure the alignment of these pins 146 with the pins 184 in the sensing head 173—U at this time. Yet further, distance between the toe portion 191—U and the pins 184 in the sensing head 173—U is accurately determined so that when the bail 192 is in the at rest or zero position thereof, these pins 184 will be accurately positioned relative to the pins 121—U pertaining to units order of the variable factor. Hence, the zero position of the bail 192 is accurately determined relative to the position of the pins 121—U. Moreover, the pins 121—T are accurately spaced from the pins 121—U and the pins 121—H are accurately spaced from the pins 121—T. In this regard, the pins 121—T are spaced from the pins 121—U in the same amount the pins 146 on a plate 125 are spaced from the pins 153 on such a plate, this likewise applying with respect to the spacing of the pins 121—H from the pins 121—T.

By referring to Fig. 17, it will be seen that a plurality of successive steps 193—U are formed in the lower edge of the summation member 166—U on the portion thereof extended to the left of the wall 176 when this summation member is in the at rest or zero position thereof shown in Fig. 17. Each of these steps 193—U is of a length equal to ten of the aforesaid unit spaces referred to hereinabove with reference to the pins 146 and the bar 130 on a plate as 125. Moreover, each step 193 toward the left as viewed in Fig. 17 is spaced inwardly from the preceding step in an amount equal to one of the aforesaid unit spaces. Thus, the length of each step 193—U is equal to that required to represent ten units or digits in a represented product, and the depth of each step is equal to the representation of a single unit or digit. These steps 193—U are utilized in effecting whatever carries may be necessary into the tens order of the final product from the units order of the final product to which the summation member 166—U pertains.

Included in the mechanism which cooperates with the steps 193—U in order to effect carry-overs from the units order to the tens order of the final product is an upright block 194—U. Figs. 17 and 25, which is mounted on the bottom wall 172 of my multiplying mechanism adjacent the wall 176. This block has a vertically extending substantially U-shaped groove formed therein in which a sensing finger 195—U is slidably mounted. Slots as 196—U are formed in the arms at opposite sides of the U-shaped groove in the block 194—U and a pin 197—U is extended through these slots and through the sensing finger 195—U to thereby retain the sensing finger for vertical movement in the U-shaped groove in the block. The block 194—U and the sensing finger 195—U therein are disposed in such position that the nose portion at the upper end of this sensing finger cooperates with the inner end of the lowermost and first step 193 in the summation member 196—U when this summation member is disposed in the zero or at rest position thereof shown in Fig. 17.

A shaft 198, Figs. 17 and 25, extends between and is supported by the side walls 110 and 111, and a bell crank generally indicated by 199—U is rockably mounted on this shaft adjacent the block 194—U. The bell crank 199—U includes a pair of arms 200—U that embrace the sides of the block 194—U. These arms have slots formed in the free ends thereof in which the ends of the pin 197—U are disposed. A spring 201—U is mounted between the arms 200—U and has one end thereof anchored about a pin extended between the arms 200—U and the other end of this spring bears on the face of the sensing finger 195—U exposed through the open side of the groove in the block 194—U, the purpose of this arrangement being described hereinafter. The bell crank 199—U also includes an arm 202—U that has a slot at the free end thereof which embraces a pin 203—U fast in a slide 204—U. As best shown in Fig. 25, the slide 204—U has one end portion thereof passed through slots respectively provided in the plate 171 and the wall 176. The opposite end of the slide 204—U is disposed between spaced blocks 205—U and 206—U mounted on the bottom wall 172. A plate 207—U is secured to the portion of the slide 204—U disposed between the blocks 205—U and 206—U and this plate extends inwardly with respect to the side wall 110 and terminates in an upstanding portion 208—U which, as best shown in Fig. 24, extends upwardly between certain of the lower rails UR which support the sensing head 173—T of the summation member 166—T and plates as 125 which are to cooperate with this summation member, as will be explained. In a manner and for a purpose to be explained hereinafter, devices carried by the upstanding portion 208—U are connected to one of the plates 125 that pertains to the tens order of the final product.

When the summation member 166—U is in the zero at rest position thereof shown in Fig. 17, the nose of the sensing finger 195—U is, as stated hereinabove, disposed at the inner end of the first step 193—U on the summation member 166—U. When, however, the summation member 166—U moves toward the right, as viewed in Fig. 17, in the course of a summarizing operation, this first step 193—U is moved past the sensing finger 195—U. It has been explained that the length of each step 193—U is equal to ten of the aforesaid unit spaces so that as soon as the sensing member 166—U has moved in an amount equivalent to ten of the aforesaid unit spaces, the start of the succeeding step 193—U on the summation member 166—U will move into alignment with the sensing finger 195—U. Thereupon, under the influence of forces applied through devices associated with the slide 204—U, as will be explained hereinafter, the sensing finger 195—U moves onto the succeeding step 193—U which, as explained hereinabove, is spaced inwardly from the first step 193—U in an amount equivalent to one of the aforesaid unit spaces. Such movement of the sensing finger 195—U is effective through the pin 197—U, and the arms 200—U and 202—U of the bell crank 199—U, and the pin 203—U to impart movement to the slide 204—U and, therefore, to the plate 207—U and the upstanding portion 208—U in an amount equal to one of the aforesaid unit spaces, the interrelation among the just enumerated elements being in a one to one ratio. The movement that is imparted to the upstanding portion 208—U is, therefore, equal to one unit space, and since the upstanding portion 208—U cooperates with parts related to the summation member 166—T pertaining to the tens order of the final product, the effect of such movement of the upstanding portion 208—U is the entry of the digit "1" in the tens order of the final product.

Therefore, when, as explained hereinabove, the bar 130 on the plate 125—FU×VU is disposed in a position to represent 9 (as illustrated in Fig. 17), and a pin 121—U—6 and the aligned pin 184—6 in the sensing head 173—U are pushed so that the represented product that is to be effective is 54, and the summation member 166—U is freed to the effect of the springs 189 and 190, the summation member 166—U moves through a distance equivalent to 54 unit spaces. In the course of such movement, five steps 193—U move past the sensing finger 195—U, and as each succeeding step 193—U moves past this sensing finger, this sensing finger moves inwardly toward the summation member 166—U in the amount of one unit space so that when five steps 193—U move past a sensing finger 195—U, the sensing finger 195—U moves inwardly five times. Each such inward movement of the sensing finger 195—U in the manner explained hereinabove is effective to move the slide 204—U in an amount equivalent to one unit space so that when the summation member 166—U moves in an amount equal to 54 unit spaces, the summation member comes to rest in a position representative of 54, so that the right-hand component thus represented is 4, and the left-hand component 5 is carried over and entered into the summation member 166—T pertaining to the tens order of the final product. Thus it will be seen that the cooperation of the sensing finger 195—U with steps 193—U and the elements associated with this sensing finger are effective to effect carry-overs from the units order of the final product to the tens order of the final product, as will be evident in Figs. 34 and 35. Hence, if only a fixed factor of 9 is to be multiplied by only a variable factor of 6, the summation members 166—T and 166—U would, at the end of the summarizing operation, be disposed in positions to respectively represent 5 and 4 or the product 54.

Reference has been made hereinabove to the upstanding portion 208—U being related to plates as 125 and to the summation member 166—T pertaining to the tens order of the final product. In this regard those represented products on plates as 125 which pertain to the tens order of the final product are those which result from multiplications entailing digits appearing in the tens order of the fixed factor and digits appearing in the units order of the variable factor and also those products which result from multiplications entailing digits appearing in the units order of the fixed factor and digits appearing in the tens order of the variable factor. Such products are represented on the plates 125—FT×VU and 125—FU×VT wherefore these plates pertain to the summation member 166—T which relates to the tens order of the final product.

Thus, to refer to Figs. 15 and 18, it will be seen that the plates 125—FT×VU and 125—FU×VT are mounted for movement on upper and lower rails UR and LR that are arranged in juxtaposition to rails on which the sensing head 173—T of the summation member 166—T is adapted to travel. By referring to Figs. 15, 23 and 24, it will be seen that upper rails UR—S—T, UR—P1—T and UR—P2—T are mounted in juxtaposition to each other and respectively in vertical alignment with lower rails LR—S—T, LR—P1—T and LR—P2—T. The plate 125—FT×VU is mounted to travel on the rails UR—P2—T and LR—P2—T. The other plate 125—FU×VT pertaining to the tens order of the final product is mounted to travel on the rails UR—P1—T and LR—P2—T. The sensing head 173—T of the summation member 166—T is mounted to travel on the rails UR—S—T and LR—S—T. Thus, with reference to the side plate 110 and the elements pertaining to the units order of the final product, as best shown in Fig. 15, the plate 125—FU×VT is mounted inwardly of the sensing head 173—T while the plate 125—FT×VU is mounted inwardly of the plate 125—FU×VT.

The initial or at rest, which is to say, zero positions of these elements is best shown in Figs. 15 and 18, and by referring thereto it will be seen that the plate 125—FT×VU is disposed to have the pins as 146—3 therein mounted in alignment with the pins as 146—3 in the plate 125—FU×VU for so to do relates the plate 125—FT×VU to the units order of the variable factor to which this pertains. Yet further, it will be noted that the pins as 153—3 in the plate 125—FU×VT are respectively disposed to extend between pins as 146—3 in the plate 125—FU×VU and pins as 146—3 in the plate 125—FT×VU. Therefore, when a particular pin 121—U is pushed, this is not only effective to dispose the related stop pin 184 in the sensing head 173—U in position to cooperate with the bar 130 on the plate 125—FU×VU, but this is also effective to dispose the related pin 153 in the plate 125—FU×VT in position to serve as a stop pin with reference to the bar 130 on the plate 125—FT×VU. Such operative relationship is established because, when a particular digit appears in the units order of the variable factor, this digit will enter into multiplications entailing digits appearing in both the units and tens orders of the fixed factor to which the plates 125—FU×VU and 125—FT×VU respectively pertain. Hence, those plates 125 which pertain to digits of the fixed factor that are to be multiplied by digits appearing in the units order of the variable factor are mounted in the mechanism in such relation that the setting up of a representation of a particular digit appearing in the units order of the variable factor will be effective to represent this particular digit with reference to the orders of the fixed factor in which digits may appear and which are to be multiplied by digits appearing in the units order of the variable factor.

Further, with reference to Fig. 15, it will be noted that the plate 125—FU×VT is not only, in the initial at rest position thereof, disposed to align the pins 153 therein with the pins 146 respectively provided in the plates 125—FT×VU and 125—FU×VU, but also so as to align the pins 146 in this plate 125—FU×VT with pins 184 in the sensing head 173—T, which in turn are aligned with the pins 121—T pertaining to the tens order of the variable factor. Hence, the pins 184 in the sensing head 173—T are arranged to serve as stop pins with respect to the bar 130 on the plate 125—FU×VT, which plate as indicated, bears represented products resulting from multiplications entailing digits appearing in the tens order of the variable factor. Therefore, when a particular pin 121—T is pushed, the related pin 184 in the sensing head 173—T is pushed to serve as a stop pin with reference to the bar 130 on the plate 125—FU×VT so that when the summation member 166—T is to move in a summarizing operation, the movement thereof with reference to the plate 125—FU×VT will be related to the number of unit spaces the activated pin 184 in the sensing head 173—T is spaced from the bar 130 on the plate 125—FU×VT.

In this instance, however, not only is a product represented on the plate 125—FU×VT to be entered into the summation member 166—T, but also the product represented on the plate 125—FT×VU is to be entered into this summation member. It is for this reason that the pins 153 in the plate 125—FU×VT are selectively activated to serve as stop members with reference to the bar 130 on the plate 125—FT×VU.

Summarizing movement is imparted to the summation member 166—T under the influence of springs as 209 and 210, Figs. 15 and 18, which extend between spring anchors respectively provided on the rear wall 177 and the sensing head 173—T. Moreover, the sensing member 166—T is provided with a toe-portion 191—T which bears on the bail 192. Hence, it is movement of the bail 192, to the right as viewed in Fig. 18, that enables the summation member 166—T to move to the right, as viewed in Fig. 18, in a summarizing operation under the influence of the springs 209 and 210. In the course of such a summarizing operation, the particular pushed pin 184 in the sensing head 173—T is urged toward the bar 130 on the plate 125—VU×VT, and as soon as this pin engages the edge 165 on the bar, the plate 125—FU×VT may start to move with the sensing head 173—T and the summation member 166—T. Such movement of the plate 125—VU×VT may continue until the pushed pin 153 in this plate engages the edge 165 on the bar 130 on the plate 125—VU×VT, whereupon movement of the sensing head 173—T and the summation member 166—T is arrested. By the time movement of the summation member 166—T is so arrested, this member will have moved through a distance at least equal to the number of unit spaces the pushed pin 184 in the sensing head 173—T is spaced from the edge 165 on the bar 130 on the plate 125—FU×VT at the start of the movement of the summation member and also through the number of unit spaces the pushed pin 153 in the plate 125—VU×VT is spaced from the edge 165 on the bar 130 on the plate 125—FT×VU at the start of movement of the summation member. Hence, at least the particular products which were respectively represented on the plates 125—FU×VT and 125—FT×VU will have been entered into the summation member 166—T at the end of summarizing movement of this summation member.

However, not only will these represented products be entered into the summation member 166—T, but also the carry-overs from the units order of the final product will be entered into the summation member 166—T in the course of summarizing movement thereof. Thus, it has been explained that the upstanding portion 208—U is moved upon each movement of the sensing finger 195—U from one step 193—U on the summation member 166—U to the succeeding step 193—U on this member. Such movement of the upstanding portion 208—U is effected toward the right as viewed in Figs. 15, 17 and 18, which is to say, in the direction of summarizing movement of the summation member 166—T. Moreover, it has been explained that the portion 208—U is disposed to cooperate with elements pertaining to the tens order of the final product. Thus, a boss 211, Fig. 18, is provided at the upper end of the upstanding portion 208—U, and an adjusting screw 212 is screw-threadedly mounted in this boss and is fitted into a tapped opening in the block 150 on the plate 125—FT×VU. Lock nuts 213 cooperate with the adjusting screw 212 to hold the same in adjusted positions thereof, the utility of this adjustment being explained presently. Therefore, the upstanding portion 208—U is directly connected to the plate 125—FT×VU wherefore the movement that is imparted to the upstanding portion 208—U is transmitted to the plate 125—FT×VU. The movement that is so imparted to the plate 125—FT×VU is imparted thereto in a step by step manner in distances equal to the extent of one of the aforesaid unit spaces, this resulting, as explained hereinabove, from the movement of the sensing finger 195—U from one step 193—U to the succeeding step 193—U in the course of summarizing movement of the summation member 166—U. The effect of the movement that is therefore imparted to the plate 125—FT×VU in a step by step manner is to retract this plate away from the effective pin 153 that is to cooperate with the edge 165 on the bar 130 on this plate 125—FT×VU so as to in effect increase the distance between such effective pin 153 and said edge 165 and this, as it occurs in the course of a summarizing operation of the summation member 166—T effects entry of carry-overs from the units order of the final product into the summation member 166—T in a unit by unit, which is to say, digit by digit manner. Therefore, at the end of a summarizing movement of the summation member 166—T, this member is disposed in a position representing the sum of the products represented on the plate 125—FU×VT and 125—FT×VU and the carry-overs from the units order of the final product.

Inasmuch as the toe-portions 191—U and 191—T both bear on the bail 192, it is manifest that when the bail 192 is moved toward the right as viewed in Figs. 17 and 18 in a manner explained hereinafter, the summation members 166—U and 166—T may move simultaneously to effect summarizing operations thereof. Hence, the finger 195—U may be moving from one step 193—U to the succeeding step simultaneously with the summation movement of the summation member 166—T. Moreover it has been explained hereinabove that the finger 195—U is urged toward the steps 193—U under the influence of elements pertaining to the tens order of the final product. Further, the finger 195—U may move, for example, from the first step 193—U to the second step 193—U prior to the time the summation member 166—T has moved sufficiently to cause the pushed pin 153 in the plate 125—FU×VT to engage the edge 165 on the bar 130 on the plate 125—FT×VU to which plate, as explained hereinabove, the upstanding portion 208—U is connected. It is, therefore, important that force be continuously applied to the plate 125—FT×VU so that in the event that this plate is not under the influence of the springs 209 and 210 by reason of the engagement of the aforesaid pin 153 with the edge 165 on the bar 130 on this plate, force will nevertheless be applied to the elements associated with the sensing finger 195—U. Therefore, springs 214 and 215, Fig. 18, are extended between spring anchors respectively provided on the rear wall 177 and on the plate 125—FT×VU. The springs 214 and 215 are continuously effective on the plate 125—FT×VU and, therefore, through the adjusting screw 212, on the upstanding portion 208—U, the plate 207—U, the slide 204—U, the pin 203—U, the arm 202—U of the bell crank 199—U the arms 200—U of this bell crank and the pin 197—U to effectively force the sensing finger 195—U toward the steps 193—U. Consequently the parts associated with the sensing finger 195—U and portion 208—U are at all times conditioned to cause retraction of the portion 208—U, and therefore the plate 125—FT×VU, in the direction of summarizing movement of the summation member 166—T so that the carry-overs from the units order of the final product are entered into the tens order of this product as these carry-overs occur during summarizing movement of the summation member 166—U.

It is essential that the pins as 184—3, Fig. 15, in the sensing head 173—T be aligned with the pins as 146—3 in the plate 125—FU×VT when this plate is in the at rest or zero position thereof, and this likewise applies with respect to the pins as 153—3 in the plate 125—FU×VT which are to be aligned with the pins as 146—3 in the plate 125—FT×VU. Hence, an arrangement is afforded to enable adjustment in the initial or zero position of these plates so as to insure alignment among the various pins as aforesaid.

Therefore, the summation member 166—T is arranged to be of such length that when the bail 192 is in the at rest or zero position thereof, the pins as 184—3 in the sensing head 173—T will be aligned with the pins as 121—T.

Moreover, each plate as 125 has an adjustment screw as 216, Fig. 26, fitted into a tapped opening in the block 150 on the plate. Also each plate as 125 is also provided with a lug as 217 which extends outwardly from the face of the plate on which the bar 130 is disposed, this lug being located along the edge of the plate opposite that along which the block 150 is secured. The adjustment screw 216 and the lug 217 on each plate 125 are aligned one with the other. Still further, an adjustment screw as 218—T is provided in the block as 183 on each sensing head as 173—T. The arrangement is such that the adjusting screw as 216 in one plate 125 is aligned with and cooperates with the lug 217 on the adjacent plate 125 and the adjustment screw as 218—T cooperates with a lug as 217 on the adjacent plate 125.

Therefore, when the pins as 184—3, Fig. 15, in the sensing head 173—T are aligned with the pins as 121—T—3 by the disposition of the summation member 166—T in the zero position thereof, the adjustment screw 218—T in the sensing head 173—T is manipulated relative to the lug 217 on the plate 125—FU×VT, this lug and adjustment screw being disposed in cooperating relation with each other as shown in Figs. 15 and 18. The screw 218—T is secured in such position that the pins as 146—3, Fig. 15, in the plate 125—FU×VT will be aligned with the pins as 184—3 in the sensing head 173—T. Therefore, since the pins as 121—T—3 are spaced from the pins as 121—U—3 in the same amount as that in which the pins as 146—3 in the plate 125—FU×VT are spaced from the pins as 153—3 in this plate, the adjustment of the screw as 218—T in the head 173—T disposes the pins as 153—3 in alignment with the pins as 146—3 in the plate 125—FU×VU which, as explained hereinabove, are in turn aligned with the pins as 121—U—3. Yet further, the adjustment screw 216 in the plate 125—FU×VT is disposed to cooperate with the lug 217 on the plate 125—FT×VU wherefore this adjustment screw may be manipulated so as to dispose the pins as 146—3 in the plate 125—FT×VU in alignment with the pins as 153—3 in the plate 125—FU×VT. In this regard it will be understood that the springs 214 and 215 which are effective on the plate 125—FT×VU are effective to urge the lug 217 on this plate toward the adjustment screw 216 on the plate 125—FU×VT so that this lug and screw are kept in engagement one with the other. Hence, the effect of the springs 214 and 213 is transferred to the plate 125—FU×VT so that the lug 217 on this plate is held in engagement with the adjustment screw 218 in the sensing head 173—T.

Still further, the adjustment screw 212 is manipulated when the above referred to elements are in the aforesaid zero positions thereof so as to dispose the upstanding portion 208—U and, therefore, the parts connected to this upstanding portion including the sensing finger 195—U in a zero position, and in this regard when this adjustment is effected, the summation member 166—U will be disposed in the zero position thereof so that the first step 193—U will be cooperating with the sensing finger 195—U. Force applied by the springs 214 and 215 will maintain the upstanding portion 208—U and the sensing finger 195—U and their inter-connecting parts under tension and since likewise the effect of these springs are similarly effective on the plates 125—FT×VU and 125—FU×VT, the elements pertaining to the tens order of the final product are maintained in engagement one with the other.

By referring to Fig. 15, it may be seen that the pins as 121—T—3 extend through the side wall 110 into position to cooperate with the pins as 184—3 in the sensing head 173—T, and in such extent of the pins as 121—T—3, selected of these pins must pass the summation member 166—U which is disposed between the side wall 110 and the sensing head 173—T. In this regard it is advantageous to make the summation members as 166—U as narrow as possible. Hence, most of the pins 121—T pass opposite edges of the summation member 166. However, as best shown in Fig. 17, in the illustrated form of my apparatus the pins 121—T—3, 121—T—4 and 121—T—5 must pass through the summation member 166—U. In order to enable passage of the pin 121—T—5 through the summation member 166—U, the slot 167 in this summation member is made of sufficient length to extend beyond the pin 121—T—5 when the summation member 166—U is in the zero position thereof. Other slots as 219 and 220 are formed in the summation member 166—U to respectively accommodate the pins 124—T—4 and 121—T—3.

Yet further, as shown in Figs. 15 and 17, the pins as 121—H—3, 121—H—4 and 121—H—5 are respectively extended through the slots 220, 219 and 167 in the summation member 166—U, these last named pins pertaining to the hundreds order of the variable factor and being referred to hereinafter with reference to summation operations pertaining to the summation member 166—H. The other pins 121—H extend past opposite edges of the summation member 166—U and all of the pins 121—H also extend through the summation member 166—T as will be explained hereinafter.

At the end of a summarizing operation of the summation member 166—T this member will be disposed in a position to represent the right-hand component of the sum of the products represented on the plates 125—FU×VT and 125—FT×VU and the carry-overs from the units order of the final product. In the course of moving into such a position, the left-hand component of such a sum is entered into elements pertaining to the hundreds order of the final product through the intermediary of a carry-over mechanism like that described hereinabove with reference to carry-overs from the units order of the final product to the tens order of the final product. Thus, a series of steps 193—T, Fig. 18, is provided on the lower edge of the summation member 166—T; and a sensing finger 195—T cooperates with these steps 193—T in the same manner as that in which the sensing finger 195—U cooperates with the steps 193—U on the summation member 166—U. In this regard, the sensing finger 195—T is mounted in the same manner as that in which the finger 195—U is mounted and has elements associated therewith corresponding to the elements associated with and operated by the sensing finger 195—U. Hence, those elements which are associated with the sensing finger 195—T, which respectively correspond to elements associated with the sensing finger 195—U, have the same reference character applied thereto that is applied to the corresponding element associated with the sensing finger 195—U except that insofar as the elements pertaining to the sensing finger 195—T are concerned, these have the suffix "T" associated therewith rather than the suffix "U" that was used in the reference characters as these were applied to the elements associated with the sensing finger 195—U. Hence, a bell crank 199—T is effected to actuate a slide 204—T, Figs. 24 and 25, which has a plate 207—T associated therewith that includes an upstanding portion 208—T. This upstanding portion 208—T is disposed to cooperate with elements pertaining to the hundreds order of the final product, one of such elements being the summation member 166—H, Figs. 15 and 19.

Inasmuch as as many as three represented products may pertain to the hundreds order of the final product, as explained hereinabove, three plates as 125 are associated with the summation member 166—H and these are the plates 125—FH×VU, 125—FT×VT and 125—FU×VH. Moreover, the summation member 166—H includes a sensing head 173—H, Fig. 19, and this sensing head and the last enumerated plates are related one to the other and to the upstanding portion 208—T in such a manner that in the course of a summarizing movement of the summation member 166—H the various products represented on the respective plates and carry-overs from the tens order of the final product will be totaled.

To this end the sensing head 173—H is mounted to travel on an upper rail UR—S—H and a lower rail LR—S—H and, as best shown in Fig. 24, three upper rails are mounted in juxtaposition to the upper rail UR—S—H and three lower rails are mounted in juxtaposition to the lower rail LR—S—H. The plate 125—FU×VH is mounted to travel on the upper and lower rails UR—P1—H and LR—P1—H, Fig. 24, immediately adjacent the upper and lower rails UR—S—H and LR—S—H. The plate 125—FT×VT is mounted to travel on the set of rails UR—P2—H and LR—P2—H. The plate 125—FH×VU is mounted to travel on the rails UR—P3—H and LR—P3—H which are respectively disposed most remote from the rails UR—S—H and LR—S—H in the set of rails pertaining to the hundreds order.

Consequently and as best shown in Figs. 15 and 19, the pins as 184—3 in the sensing head 173—H are disposed in alignment with pins as 146—3 in the plate 125—FU×VH so that, therefore, the adjustment screw 218—H in the sensing head 173—H cooperates with the lug 217 on the plate 125—FU×VH. Moreover, pins as 153—3 in the plate 125—FU×VH are aligned with the pins as 146—3 in the plate 125—FT×VT and the adjustment screw 216 in the plate 125—FU×VH is disposed to cooperate with the lug 217 on the plate 125—FT×VT. Still further, the pins as 153—3 in the plate 125—FT×VT are disposed to cooperate with the pins as 146—3 in the plate 125—FH×VU. Furthermore, and as best shown in Figs. 15 and 19, an adjustment screw as 212 interconnects the upstanding portion 208—T and the plate 125—FH×VU in the same manner as that in which an adjustment screw 212 interconnects the upstanding portion 208—U and the plate 125—FT×VU. Such interconnection between the upstanding portion 208—T and the plate 125—FH×VU connects the carry-over mechanism from the tens order of the final product to the elements pertaining to the hundreds order of the final product.

Summation movement of the summation member 166—H is effected under the influence of springs 221 and 222, Fig. 19, which extend between spring anchors respectively provided on the rear wall 177 and the sensing head 173—H. Moreover, springs as 214—H and 215—H respectively extend between spring anchors on the rear wall 177 and spring anchors on the plate 125—FH×VU and these springs 214—H and 215—H function with respect to the various plates 125 pertaining to the hundreds order of the final product and to the carry-over mechanism from the tens order to the hundreds order of the final product in the same manner as that in which the springs 214 and 215 function with respect to the elements pertaining to the tens order of the final product, as this has been explained hereinabove with reference to springs 214 and 215.

The summation member 166—H includes a toe-portion 191—H, Fig. 19, that is urged into engagement with the bail 192 by the springs 221 and 222. Moreover, the summation member 166—H is of such length that when the toe-portion 191—H is engaged with the bail 192, when this bail is disposed in the zero position thereof, the pins 184 in the sensing head 173—H are aligned with pins that are in turn aligned with pins 121—H that extend from the side wall 110 into position to cooperate with the pins 184 in the sensing head 173—H. These pins 121 extend past the summation member 166—U or, as explained hereinabove, through slots as 167, 219 and 220 provided in this summation member. Likewise, as shown in Fig. 18, most of these pins 121—H extend past the summation member 166—T or through slots in this member. Thus, the pin 121—H—5 extends through the slot 167 in the summation member 166—T and the pin 121—H—4 extends through a slot 219—H in this summation member which corresponds to the slot 219 in the summation member 166—U.

However, in accordance with the desideratum of having the summation members 166 as narrow as possible, it is not possible to provide a slot as 220 in the summation member 166—T to enable passage of the pin 121—H—3 through the summation member 166—T because such a slot would intersect the edge of the summation member 166—T in which the steps 193—T are formed. It would, of course, be possible to make the summation member 166—T of sufficient width to accommodate such a slot but so to do would require alteration of the arrangement including the sensing finger 195—T, and since it is desirable that elements of the carry-over mechanism, which is to say, the sensing fingers as 195—T and the parts associated therewith, be identical for the various orders, I have provided a special arrangement to enable the pushing of the pin 121—H—3 to be effective on the pin 146—3 in the sensing head 173—H.

In this regard, it will be understood that the pins as 121—U—3, Fig. 15, cannot be continuously extended across my mechanism from the side wall 110 to the side wall 111 since, as in the instance of the pin 121—U—3, the pin 184—U—3 will move from alignment with the pin 121—U—3 in the course of sensing movement of the sensing head 173—U. This likewise applies with respect to other pins pertaining to the orders of the variable factor and which serve as stop pins as pins effective to push stop pins. As shown in Fig. 15, therefore, the extent of the pins pertaining to the respective orders of the variable factor is interrupted across my multiplying mechanism at each point where relative movement may occur between adjacent elements. Thus, as a further example of this, the pin 153—3 in the plate 125—FT×VT will move out of alignment with the pin 146—3 in the plate 125—FH×VU in the course of a summarizing operation of the summation member 166 in which the edge 165 on the bar 130 on the plate 125—FH×VU is disposed in a position to represent a product comprising significant digits.

Therefore, since the configuration of the summation member 166—T is such that the pin 121—H—3 cannot be passed through a slot in this summation member so as to enable this summation member to move relative to the pin 121—H—3, I provide an arrangement which will permit relative movement between the summation member 166—T and the pin 121—H—3.

Such an arrangement is best illustrated in Figs. 15, 18 and 23, and by referring thereto, it will be seen that the pin 121—H extends inwardly of the side wall 110 to a position adjacent the summation member 166—T on the face of such summation member disposed toward the side wall 110. A block 223, Figs. 15, 18 and 23, is secured to the face of the summation member 166—T disposed away from the side wall 110, and a pin 224 is mounted in an opening provided in this block and the summation member 166—T. As best shown in Fig. 23, a recess 225 is formed in the face of the block 223 adjacent the summation member 166—T and a spring 226, Fig. 18, is mounted in this recess and is passed about screws which are effective to secure the block 223 to the summation member 166—T and, as also shown in Fig. 18, this spring bears upon the pin 224 to apply tension thereon effective to retain the pin in positions in which it may be disposed.

A bar 225, Figs. 15, 18 and 23, is secured to the rails UR—P2—T and LR—P2—T and has a plurality of openings therein through which the various pins 121—H (except the pin 121—H—3) are extended, this bar affording an inner support for the relatively long pins 121—H near the inner ends thereof, as best shown in Fig. 23. However, instead of passing the pin 121—H—3 through this bar 225, a pin 226 is extended through the opening in this bar through which the pin 121—H—3 would normally extend, this pin also extending through an opening in a block 227 secured to the bar 225. This block 227, like the block 223, is recessed in the inwardly disposed face thereof to afford accommodation for a spring 228 that is effective to apply tension on the pin 226 to retain this pin in positions into which it may be moved. As best shown in Fig. 23, the pin 226 extends between the pin 146—3 in the sensing head 173—H and the pin 224, the pin 224 in turn extending to the inner end of the pin 121—H—3.

Therefore, whenever the digit 3 appears in the hundreds order of the variable factor so as to result in pushing of the pin 121—H—3, this is effective to push the pin 224 and in turn the pin 226, and, therefore, the pin 184—3 in the sensing head 173—H to thereby dispose this pin 184—3 in position to serve as a stop pin with respect to the edge 165 on the bar 130 on the plate 125—FU×VH.

Moreover, as can be seen by reference to Fig. 15, the arrangement including the pins 224 and 226 is such that upon movement of the summation member 166—T in a summarizing operation, the pin 224 carried by this summation member will move out of alignment with pins 226 and 121—H—3, but this will not occur until after the pushing of the proper pins 121, these pins being pushed prior to the time the summation members as 166—T start to move in a summarizing operation as will be explained in detail hereinafter.

The plates 125—VU×VH, 125—FT×VT and 125—FH×VU are so related to each other and to the sensing head 173—H that when the summation member 166—H is freed to the effect of the springs 221 and 222 upon movement of the bail 192 to the right as viewed in Fig. 19, the sensing head 173—H will first be free to move toward the bar 130 on the plate 125—FU×VH, such movement being arrested when the pin as 184—3 in this sensing head engages the edge 165 on said bar 130. When this engagement occurs, the plate 125—FU×VH is conditioned to move with the summation member 166—H, and such movement will be arrested when the push pin as 153—3 in the plate 125—FU×VH engages the edge 165 on the bar 130 of the plate 125—FT×VT, and as soon as this engagement occurs, this plate is conditioned to move with the summation member 166—H. Such movement is arrested when the pin as 153—3 in the plate 125—FT×VT engages the bar 130 on the plate 125—FH×VU, such plate being retracted in a direction away from the summation member 166—H and the pins as 153—3 in the plate 125—FT×VT each time movement is imparted to the upstanding portion 208—T by reason of a carry-over from the tens order of the final product. At the end of summation movement of the summation member 166—H, this member stands in position to represent the right-hand component of the sum of the various products represented on the plates 125 associated with this summation member and the carry-overs from the tens order of the final product, the left-hand component of such sum having been entered into the summation member 166—TH pertaining to the thousands order of the final product in the course of movement of the summation member 166—H in a summarizing operation.

It will be noted that the pin as 153—3 in the plate 125—FT×VT extends from the pin 146—3 in the plate 125—FT×VU to the pin 146—3 in the plate 125—FH×VU when the various elements are disposed in the zero positions thereof. Hence, pushing of a pin 121—U is effective to not only set up a representation of the particular digit in the units order of the variable factor with respect to the plates 125—FU×VU and 125—FT×VU, but also with respect to the plate 125—FH×VU. Thus, pushing of a pin 121—U sets up a representation of the digit appearing in the units order of the final product with respect to the digits appearing in the units, tens and hundreds orders of the fixed factor.

Yet further, the pin as 153—3 in the plate 125—FU×VH extends between the pins as 146—3 respectively provided in the plates 125—FU×VT and 125—FT×VT so that, therefore, the pushing of a particular pin 121—T is not only effective to set up a representation of a particular digit in the tens order of the variable factor with respect to the digit appearing in the units order of the fixed factor (represented by the position of the bar 130 on the plate 125—FU×VT), but this is also effective to set up a representation of the particular digit in the tens order of the variable factor with respect to the digit appearing in the tens order of the fixed factor which is represented by the position of the bar 130 on the plate 125—FT×VT.

Still further, the pushing of a particular pin 121—H is effective either through such pin (or insofar as the pin 121—H—3 may be concerned through the pins 224 and 226) to set up a representation of a digit in the hundreds order of the variable factor with respect to a digit appearing in the units order of the fixed factor which is represented by the position of the bar 130 on the plate 125—FU×VH.

Thus, the selective pushing of pins 121 in the sets thereof respectively pertaining to the units, tens and hundreds orders of the variable factor is effective to simultaneously set up representations of such digits with respect to representations of digits appearing in the respective orders of the fixed factor, such digits being represented by the positions of the bars as 130 on the various plates as 125 that respectively pertain to the units, tens and hundreds orders of the final product. Moreover, as will be explained presently, such selective pushing of the pins 121 is also effective with respect to plates as 125 which, in the illustrated form of my mechanism, pertain to the thousands and ten-thousands orders of the final product.

Insofar as the thousands order of the final product may be concerned in the illustrated form of my mechanism, the summation member 166—TH pertaining to this order has plates 125—FT×VH and 125—FH×VT associated therewith as best shown in Figs. 15 and 20. The summation member 166—TH which pertains to the thousands order of the final product includes a toe-portion 191—TH that cooperates with the bail 192 and when the bail 192 is disposed in the zero position thereof, the pins 184 in the sensing head 173—TH of the summation member 166—TH will be selectively pushed to serve as stop members with respect to the edge 165 on the bar 130 on the plate 125—FT×VH. Also, the adjustment screw 218—TH in the sensing head 173—TH is disposed to cooperate with the lug 217 on the plate 125—FT×VH. The pins 153 in this plate 125—FT×VH are disposed to serve as stop members with respect to the bar 130 on the plate 125—FH×VT, and in this instance the adjustment screw 216 in the plate 125—FT×VH is arranged to cooperate with the lug 217 upon the plate 125—FH×VT.

As shown in Fig. 19, steps 193—H are provided on the summation member 166—H and a sensing finger 195—H corresponding to the sensing fingers 195—T and 195—U cooperates with these steps. The elements associated with the sensing finger 195—H correspond to those associated with the sensing fingers 195—T and 195—U and have the same reference characters applied thereto that are applied to corresponding elements respectively associated with the sensing fingers 195—T and 195—U except that with respect to the elements associated with the sensing finger 195—H the suffix "H" is applied to these reference characters rather than the suffix "T" or "U" respectively applied with respect to elements related to the sensing fingers 195—T and 195—U. Hence, as best shown in Figs. 24 and 25, the slide 204—H actuated from the sensing finger 195—H includes a plate 207—H which has an upstanding portion 208—H thereon, and this upstanding portion 208—H has an adjustment screw 212 therein which is mounted in tapped openings in the upstanding portion 208—H and the plate 125—FH×VT wherefore the upstanding portion 208—H is connected to elements pertaining to the thousands order of the final product. Hence, upon movement of the sensing finger 195—H from one step 193—H to a succeeding step 193—H, the upstanding portion 208—H and, therefore, the plate 125—FH×VT are moved so as to thereby enter a carry-over from the hundreds order into the thousands order of the final product in a manner explained in detail hereinabove with reference to carry-overs from the units order of the final product into the tens order of the final product.

Springs 228 and 229, Fig. 20, extend between spring anchors respectively provided on the rear wall 177 and the sensing head 173—H. These springs are effective to move the summation member 166—TH through a summarizing operation. Moreover, springs 214—TH and 215—TH extend between spring anchors respectively provided on the rear wall 177 and the plate 125—FH×VT, these springs being effective on the elements pertaining to the thousands order of the final product in the same manner as springs 214 and 215 are effective on elements pertaining to the tens order of the final product.

The sensing head 173—TH and the plates 125—FT×VH and 125—FH×VT are mounted to travel on a set of upper and lower rails including the upper rail UR—S—TH and the lower rail LR—S—TH, the sensing head 173—TH being mounted on these rails UR—S—TH and LR—S—TH. The plate 125—FT×VH is mounted on the rails UR—P1—TH and LR—P1—TH immediately adjacent the rails UR—S—TH and LR—S—TH while the plate 125—FH×VT is mounted on the rails UR—P2—TH and LR—P2—TH in the set thereof pertaining to the thousands order of the final product that are disposed most remote from the rails UR—S—TH and LR—S—TH. Hence, upon movement of the summation member 166—TH under the influence of the springs 228 and 229, the sensing head 173—TH may first move relative to the plate 125—FT×VH, and when the pushed pin 184 in this sensing head engages the bar 130 on this particular plate, then this plate is conditioned to move the pins 153 therein toward the bar 130 on the plate 125—FH×VT.

At the end of a summarizing operation of the summation member 166—TH, this summation member comes to rest in a position to represent the right-hand component of the sum of the products represented on the plates 125—FT×VH and 125—FH×VT and carry-overs from the hundreds order of the final product, the left-hand component of such sum being represented in the ten-thousands order of the final product by reason of the association of an upstanding portion 208—TH with elements pertaining to the ten-thousands order of the final product. This upstanding portion 208—TH is operated from the sensing finger 195—TH that cooperates with steps 193—TH on the summation member 166—TH, this sensing finger 195—TH and this upstanding portion 208—TH and the parts associated therewith corresponding to elements described hereinabove with particular reference to carry-over devices having to do with the tens and hundreds orders of the final product.

Springs as 214—TH and 215—TH are effective on the elements pertaining to the thousands order of my mechanism in the same manner as that in which the springs 214 and 215 are effective on elements pertaining to the tens order of my mechanism, this having been described in detail hereinabove.

In the zero or at rest positions of the sensing head 173—TH and the plates 125—FT×VH and 125—FH×VT, these elements are related to pins respectively activated upon pushing of pins 121 in the sets thereof respectively pertaining to the hundreds and tens orders of the variable factor. In this regard it will be noted that the pins as 153—3 in the plate 125—FH×VT extend to the pins as 146—3 in the plate 125—FH×VU, but these particular pins as 153—3 do not in this instance serve as stop pins, since, insofar as the thousands order of the final product may be concerned, in the illustrated form of my mechanism it is not necessary to associate with the summation member pertaining to this order any plate as 125 pertaining to the thousands order of the fixed factor, since in the illustrated form of my mechanism provision is not made for representation of digits appearing in the thousands order of the fixed factor, this being beyond the capacity of the illustrated form of my mechanism.

In this regard, it will be noted that the plates 125—FU×VU, 125—FT×VU and 125—FH×VU, while being like the other plates 125, do not have pins as 153 mounted therein for the reason that these three plates are the endmost plates in the series of plates respectively cooperating with the summation members, for the units, tens and hundreds order of the final product. Hence, the edges of these plates whereat pins as 153 would be mounted are disposed in a position beyond that at which the set of pins 121 pertaining to the units order of the variable factor are disposed wherefore no pins as 153 are required in the plates 125—FU×VU, 125—FT×VU and 125—FH×VU since no movement with respect to an order of the variable factor need be transmitted insofar as these ends of these plates are concerned.

In the illustrated form of my mechanism, it is necessary to provide but one plate 125 with respect to the ten-thousands order of the final product since the only represented products which will pertain to this order of the final product are those which will be represented on the plate 125—FH×VH. Hence, insofar as devices pertaining to the ten-thousands order of the illustrated form of my mechanism may be concerned, I provide upper and lower rails UR—S—TT and LR—S—TT on which the sensing head 173—TT is adapted to travel. Other rails UR—P—TT and LR—P—TT are mounted in juxtaposition to these rails and the plate 125—FH×VH is arranged to travel thereon.

An upstanding portion 208—TH, Fig. 21, corresponds to the other upstanding portions 208 described hereinabove and is actuated by the sensing finger 195—TH, Fig. 20, that cooperates with steps 193—TH provided on the summation member 166—TH. This upstanding portion 208—TH is connected to the plate 125—FH×VH through the intermediary of an adjustment screw 212. This arrangement is effective to enter carry-overs from the thousands order of the final product into the ten-thousands order of the final product. The lug 217 on the plate 125—FH×VH cooperates with the adjustment screw 218—TH in the sensing head 173—TH to enable the pins as 146—3, Fig. 15, in this plate to be aligned with the pins 184—3 in the sensing head 173—TT.

In this regard and as can be seen by reference to Figs. 15, 19, 20, 21 and 22, the summation members 166 respectively pertaining to the hundreds, thousands, ten-thousands and hundred-thousands orders of the final product are all of the same length since the pins 184 in these sensing heads 173 of the various summation members are all to be respectively disposed in alignment with the pins 121—H when these summation members are in the zero or at rest positions thereof, at which time the respective toe-portions 191 on these summation members will be engaging the bail 192 which will be disposed in zero position when the summation members are disposed in zero position. Hence, structurally and in order to provide for uniformity in manufacture, these summation members 166—H, 166—TH, 166—TT and 166—HT correspond so that, therefore, when these summation members are disposed in the zero position thereof the pins 184 in the sensing heads 173 on these members are aligned with each other, in accordance with the numerical significance of such pins. Moreover, these pins 184 are aligned with the pins 121—H when the summation members are in zero position. Likewise, by adjustment of the screws 218 in these sensing heads, the pins 146 on the respectively related plates 125 adjacent these sensing heads are brought into alignment with the pins 121—H and the pins 184 in the aforesaid sensing heads.

As shown best in Fig. 21, the summation member 166—TT has a plurality of steps 193—TT formed in the lower edge thereof in the same manner as that in which steps 193—H and 193—TH are respectively provided on the summation members 166—H and 166—TH. Yet further, as shown in Fig. 20, a sensing finger 195—TH cooperates with the steps 193—TH and this sensing member is effective to bring about retraction of an upstanding portion 208—TH, which, in the manner explained hereinabove, through a screw 212, is connected to the plate 125—FH×VH relating to the ten-thousands order of the final product. Therefore, the upstanding portion 208—TH and the plate 125—FH×VH will be operated in the instance of each carry from the thousands order of the final product to the ten-thousands order of the final product.

For a purpose explained hereinafter, pins as 230—3, Fig. 15, extend from the pins as 153—3 in the plate 125—FH×VT through side wall 111 of my mechanism. The inner ends of these pins as 230—3 are passed through openings provided in a plate 231, Figs. 15 and 21, that is secured to the rails UR—S—TT and LR—S—TT in position to align the inner ends of the pins as 230—3 with the pins as 153—3 in the plate 125—FH×VT. The plate 231, therefore, is stationarily supported in the machine and I, therefore, extend springs as 232 and 233 between spring anchors provided on the plate 231 and the sensing head 173—TH, the summation member 166—TT being moved under the effect of these springs in the course of a summarizing operation. Moreover, springs as 214—TT and 215—TT extend between spring anchors on the plate 231 and the plate 125—FH×VH to be effective to maintain the lug 217 on this plate 125—FH×VH in engagement with the adjustment screw 218—TT on the sensing head 173—TT, these springs, like the springs 214 and 215 described hereinabove, also being effective to place the carry-over mechanism including the upstanding portion 208—TH under tension.

In the course of a summarizing operation of the summation member 166—TT carry-overs from the thousands order of the final product are added to the product represented on the plate 125—FH×VH, and in the course of such movement of the member 166—TT, the steps 193—TT move past the sensing finger 195—TT which corresponds to and operates in a manner like that described hereinabove with reference to the sensing fingers 195 pertaining to other orders of the final product.

It is not necessary to provide any plates as 125 in association with the summation member 166—HT, since, within the capacity of the mechanism illustrated in the accompanying drawings, the only entries that will be made into the hundred-thousands order will be carry-overs from the thousands order. Therefore, the upstanding portion 208—TT that is operated from the sensing finger 195—TT is connected through the intermediary of a screw 212 to the sensing head 173—HT of the summation member 166—HT. Hence, as the sensing finger 195—TT moves from one step 193—TT to a succeeding step 193—TT to thereby move the upstanding portion 208—TT, this movement is directly imparted to the summation member 166—TT under the influence of springs 233 and 234, Fig. 22, these springs extending between spring anchors provided on the plate 235 that is secured to the rails UR—S—HT and LR—S—HT on which the sensing head 173—HT travels.

The plate 235 supports the inner end of pins 236, Figs. 15 and 22, that extend through the side wall 111 of my multiplying mechanism from the pins as 153—3, Fig. 15, in the plate 125—FH×VH for purpose explained hereinafter.

As can best be seen by referring to Fig. 15, each of the plates 125, including in the reference character designating the same the designation "VU" (to indicate that the particular plate pertains to the units order of the variable factor) is arranged in such a way that the stop pins that are to cooperate with the bar 130 on each of these plates is actuated upon pushing of one of the pins 121—U. Likewise, those plates which include in the reference character applied thereto the designation "VT" (to indicate that these plates pertain to the tens order of the variable factor) are located in such positions that the stop pins adapted to cooperate with the bars 130 thereon are actuated upon pushing of one of the pins 121—T. Likewise, the plates 125 which include in the reference character applied thereto the designation "VH" (to indicate that these plates pertain to the hundreds order of the variable factor), are arranged in such position that the stop pins adapted to cooperate with the bars 130 thereon are actuated upon pushing of one of the pins 121—H.

Moreover and as has been explained hereinabove, a plate as 125 is provided for each order of the fixed factor in which digits may appear that are to be multiplied by digits appearing in a particular order of the variable factor. Thus, the plates 125 that pertain to the units order of the variable factor, which are, therefore, operatively related to the pins 121—U as explained hereinabove, each respectively pertain to an order of the fixed factor. In order to designate that a particular plate 125 relates to a particular order of a fixed factor, a disc as 240, Figs. 27 and 28, is secured in a recess provided in the upper surface of the knob 138 provided on the bar 130 of the particular plate. Such disc bears the designation such as "U," "H" or "T" to designate whether the particular plate pertains to the units, tens or hundreds orders of the fixed factor.

Therefore, when my multiplying mechanism is to be arranged for operation, the digital values that are to respectively appear in the units, tens and hundreds orders are respectively represented on the proper plates by disposing the bars 130 on the proper plates in position to designate the particular value. Hence, each plate 125 including the designation "FU" will have a disc 240 thereon bearing the designation "U." When, for example, the fixed factor is to be 159, the bars as 130 so designated will be disposed in a position representative of "9" by disposing the plunger 136 associated with the particular bar in the opening 128—9 on the associated plate 125. Furthermore, when the fixed factor is to be 159, those knobs 138 bearing a disc 240 including the designation "T" will each be disposed in a position representative of "5" and those knobs 138 including a disc 240 bearing a designation "H" will be disposed in position to represent "1."

Once the bars 130 have been disposed in the proper positions in the manner just described my multiplying mechanism may be set in operation, and in the course of such operation the proper pin 121—U, 121—T and 121—H will be pushed so as to thereby dispose a stop pin in position to cooperate with each of the bars 130 that have been disposed in digit representing positions as aforesaid.

In this regard and as can be seen by referring to Fig. 5, if a significant digit is not to be represented in a particular order of the fixed factor, then a perforation P is formed in the field F in a position indicative of zero. Hence, if a significant digit appears only in the units order of the variable factor, the pins 121—T—0 and 121—H—0 will be pushed, whereby the stop pins for the plates 125 operatively related to these particular pins will be held against movement in the summarizing movement of the related summation member since these stop pins will move into tangential relation with the edges 165 on the bars 130 on these plates 125. Such disposition of the stop pins will occur whenever the digit zero appears in any order of the variable factor.

It has been explained hereinabove that springs as 214 and 215 (or 214—T, 215—T and so on) are effective to place the elements associated with the summation member that is aligned with such springs under tension and also to place under tension the elements which are effective to effect carry-overs from the next lower order. Therefore, when all of the summation members 166 are in zero positions thereof, at which time the various plates 125 respectively associated with such summation members will also be disposed in their zero position, all of the various elements related to each summation member are under tension. Moreover, it is advantageous to insure that all of the summation members are disposed in the zero position thereof prior to the initiation of a summarizing operation of such summation members. To this end means are provided for latching the summation members in the zero positions thereof and such means are also arranged to afford a visible indication as to whether or not all of these summation members are in the zero positions thereof.

Therefore, as best illustrated in Fig. 16, each summation member as 166—HT, 166—TT and 166—TH (as well as the other summation members) has a notch as 241 formed in the upper edge thereof in the portion thereof that will be disposed immediately to the left of the wall 176 when the summation member is in the zero position thereof. A slide 242 has slots as 243 formed therein through which screws as 244 are extended and about which springs are disposed to bear on washers engaging the slide so as to thereby slidably support the slide 242 on the wall 176 in such position that when the summation members 166 are in the zero positions thereof, the lower edge of the slide 242 will be disposed in the notch as 241 in the summation members 166. However, immediately adjacent each summation member 166 the slide 242 has a notch 245 formed therein and as soon as one of the pins 121 is pushed to thereby set up representations of a digit in an order of the variable factor whereupon a multiplication may proceed, the slide 242 is moved toward the left as viewed in Fig. 16 to thereby dispose the notches as 245 in alignment with the adjacent summation member 166 whereupon the summation members are freed from latching effect of the slide 242, such latching being effected by the disposition of the slide 242 in the notches 241.

In order that the slide 242 will be moved to dispose the notches 245 therein in alignment with the summation members 166 upon the pushing of a pin 121, plates 246, 247 and 248, Figs. 14 and 15, are pivotally mounted on the outer face of the side wall 111. The plate 246, as best shown in Fig. 14, is disposed to lie over the ends of the pins 230 extended through the side wall 111 and the plate 247 is disposed to lie over the ends of the pins 236 that extend beyond the side wall 111. In this regard, as best shown in Fig. 15, pins as 249—3 extend from the pins as 184—3 in the sensing head 173—HT through the side wall 111, and the plate 248 is disposed to overlie the ends of the pins 249 that extend beyond the side wall 111. Therefore, when a pin as 121—U—3 is pushed, this is effective through the pin 184—3 in the sensing head 173—U, the pin 146—3 in the plate 125—FU×VU, the pin 153—3 in the plate 125—FU×VT, the pin 146—3 in the plate 125—FT×VU, the pin 153—3 in the plate 125—FT×VT, the pin 146—3 in the plate 125—FH×VH, the pin 153—3 in the plate 125—FH×VT and the pin as 230—3 to pivot the plate 245 away from the side wall 111. In a similar manner, if one of the pins 121—T is pushed, the plate 247 will be pivoted away from the side wall 111 and the plate 248 will be so pivoted if one of the pins 121—H is pushed. Therefore, whenever any pin 121 is pushed, the plates 246, 247 or 248 are pivoted away from the adjacent face of the side wall 111 since these plates are interconnected.

Thus, by referring to Figs. 14 and 15, it will be seen that arms 250, 251 and 252 extend outwardly with respect to the side wall 111 from the plates 246, 247, and 248 respectively. A link 253 is pivotally connected to the arms 250, 251 and 252 and, therefore, when any one of the plates 246, 247 or 248 is pushed, the connected arm 250, 251 or 252 is rocked clockwise as viewed in Fig. 15 whereupon the link 253 is moved toward the right as viewed in Fig. 15.

A bracket 254 is mounted on the side wall 111 and a bell crank 255 is pivotally mounted on this bracket. The arm 256 of the bell crank 255 is pivotally connected to the link 253 while the arm 257 of this bell crank is pivotally connected to the adjacent end of the slide 242. Therefore, when the link 253 is moved toward the right as viewed in Fig. 15, the bell crank 255 is pivoted clockwise as viewed in Fig. 15, whereupon the slide 242 is moved to the left as viewed in Fig. 16 to thereby dispose the notches 245 in alignment with the summation members 166.

By referring to Fig. 15, it will be seen that the end of the slide 242 opposite that connected to the arm 257 of the bell crank 255 is extended through the side wall 110, this end of the slide 242 extending well beyond the outer face of the side wall 110 when the notches 245 in this slide are disposed out of alignment with the summation members 166 as shown in Fig. 16. Such extent of this end of the slide 242 beyond the outer face of the side wall 110 affords a visible indication of the proper latching of the summation members 166 in the zero positions thereof.

The hereinabove described arrangement including the link 253 is utilized to not only operate the slide 242 in the manner described hereinabove, but this arrangement is also utilized to restore pushed pins 121 and, therefore, Bowden cables 96 and push pins 92 into the at rest positions thereof shown, for example, in Fig. 10. This restoring operation is effected by a cam 260, Fig. 14, mounted on the main drive shaft 70 in a position to cooperate with a roller 261 provided at the lower end of a rocker 262 pivotally mounted as indicated at 263 on the side wall 111 of my multiplying mechanism. The rocker 262 has a roller 264, Figs. 14 and 15, at the upper end thereof that is disposed in the yoke 265 provided on the adjacent end of the slide 253. The cam 260 is shown in the at rest position thereof in Fig. 14 and this cam rotates clockwise as viewed in Fig. 14 upon operation of the main drive shaft 70. Therefore, the lobe 265 on this cam will move away from the position in which it is shown in Fig. 14 shortly after the initiation of a cycle of operation, and after this lobe has moved, for example, through an arc of 20 degrees or more it is spaced well away from the rocker 262. It is after the lobe 265 has so moved away from the rocker 262 that the sensing pins 87 become effective on the push pins 92 to thereby actuate the pins 121 and, therefore, the plates 246, 247, and 248. When, however, the plates 246, 247 and 248 are moved away from the adjacent face of the side wall 111 to thereby move the link 253 toward the left as viewed in Fig. 14, the rocker 262 is moved to dispose the roller 261 thereon in the path of travel of the lobe 265 on the cam 260. Consequently, near the end of a rotation of the cam 260 (which is near the end of a cycle of operation of my multiplying mechanism) the lobe 265 engages the roller 261 and moves the rocker 262 into the position in which it is shown in Fig. 14, and thereupon the plates 246, 247 and 248 are moved into the position in which they are shown in Figs. 14 and 15 and this is effected to restore all of the various pins included in my multiplying mechanism and the push pins 92 to the zero positions thereof. Just prior to movement of the lobe 265 back into the at rest position thereof shown in Fig. 14, the lobe 265 disengages the roller 261 so that at the end of a cycle of operation, the cam 260 and the rocker 262 and the parts operated therefrom are disposed in the positions thereof illustrated in, for example, Figs. 10, 14 and 15.

It has been explained hereinabove that the various toe-portions 191 on the summation members 166 engage a bail 192 to be disposed in the zero position thereof so as to therefore, as explained hereinabove, dispose the various sensing heads 173 and plates 125 in the zero positions thereof. It has also been explained that upon movement of the bail 192 away from the zero position the summation members are freed to the effect of springs which urge the summation members toward the right as viewed in Fig. 15. The bail 192 is moved away from the zero position thereof at a time in the operation of my mechanism subsequent to the time when the pins 121 and the pins associated therewith have been pushed so as to thereby dispose the proper pins in position to act as stop pins with respect to edges 165 on bars 130 on the plates 125.

As best shown in Figs. 11 and 14, brackets 270 depend from the supporting rails 271 and 272 on which my multiplying mechanism is mounted in the machine, those brackets being substantially in alignment with the side walls 110 and 111. A shaft 273 is journaled in bearings provided in the brackets 270 and arms 274 and 275 are mounted on this shaft at the ends thereof, the arm 274 being disposed outwardly of the side wall 110 and the arm 275 being disposed outwardly of the side wall 111. As best shown in Figs. 11, 14 and 15, the bail 192 extends through slots 276 and 277 respectively provided in the side walls 110 and 111. A collar 277 is provided on the bail 192 outwardly of the side wall 110 and a collar 278 is provided on the bail 192 outwardly of the side wall 111. A roller 279 is rotatably mounted on a reduced portion of the bail 192 outwardly of the collar 277, and one end of the link 283 is connected to the bail outwardly of this roller, these parts being held against displacement from this end of the bail by a nut 283. Another roller 281 is mounted on a reduced portion of the bail 192 outwardly of the collar 278 and one end of a link 284 is connected to the bail outwardly of this roller, these parts being held against displacement from this end of the bail by a nut 282.

A shaft 285, Figs. 11 and 14, extends between the arms 274 and 275 and one end of a drive arm 286 is rockably mounted on this shaft. A yoke 287 is provided on the drive arm 286 at the opposite end thereof and the main drive shaft 70 is passed through this yoke to thereby support the drive arm 286. A roller 288 is mounted on the drive arm 286 adjacent the yoke 287, and this roller is disposed to travel in a cam groove 289 provided on one face of the cam plate 290 that is fast on the drive shaft 70.

In the course of a cycle of operation and after the proper pins 121 have been pushed, relative movement of the roller 288 and the cam groove 289 moves the drive arm 286 toward the right as viewed in Fig. 11, the cam disc 290 rotating counterclockwise as viewed in Fig. 11 upon rotation of the drive shaft 70. Upon movement of the drive arm 286 to the right as viewed in Fig. 11, the rocker 274 is pivoted clockwise as viewed in Fig. 11, and the rocker 275 is pivoted counterclockwise as viewed in Fig. 14, and such movement, through the links 284 and 283, is effective to move the bail 192 through the slots 276 and 277 away from the zero position thereof. In the course of such movement, the rocker 274 moves from the full line position thereof shown in Fig. 11 toward the broken line position thereof shown in Fig. 11. Movement of the bail 192 into the broken line position thereof shown in Fig. 11 enables the summation members 166 to move through a distance great enough to totalize the largest sum of represented products and carry-overs that will need be entered into any one of the summation members 166 so that when the bail 192 attains the broken line position thereof shown in Fig. 11, the summation members 166 will be disposed in positions to represent the digit that is to appear in the order of the final product to which the summation members respectively relate.

After the bail 192 attains the broken line position thereof shown in Fig. 11, the digits in orders of the final product represented on the summation members 166 are read out therefrom. In the present instance these digits are read out in such a manner as to be effective to set up the type segments TS in such positions that the digits appearing in the respective orders of the final product may be printed therefrom, as will be explained presently. Subsequent to the time the type segments TS have been set up and an impression has been made therefrom, the cam groove 289 is effective to cause the drive arm 286 to move to the left as viewed in Fig. 11, and thereupon the bail 192 is returned to the full line or zero position of the bail thereof shown in Figs. 11, 14 and 15. In the course of such movement of the bail 192, the bail moves into engagement with the toe-portions 191 on the summation members 166 and when the bail attains the zero position thereof, the summation members 166 and the plates 125 and the carry-over mechanisms are restored to the zero positions thereof. In this regard the various plates 125 and summation members 166 are restored to the zero positions thereof prior to the time the lobe 265, Fig. 14, engages the roller 261 so that restoration of the various pins operatively related to the pins 121 and the pins 121 are not effected until after the various plates 125 and summation members 166 have been restored to the zero positions thereof.

Moreover, during the time the bail 192 is being returned to the zero position thereof the steps as 193—U on the summation member 166—U and the other steps 193 on the other summation members move past the sensing fingers cooperating therewith. As the various steps 193—U move past the sensing finger 195—U, in the course of restoring movement of the summation member 166—U, which is to the left as viewed in Fig. 17, the shoulders between the successive steps 193—U engage the finger 195—U with the effect of pivoting the finger 195—U counterclockwise as viewed in Fig. 17 against the effect of the spring 201—U bearing thereon, the finger 195—U at this time pivoting through the open side of the U-shaped groove in the block 194—U. The other sensing fingers 195 may similarly pivot against the springs 201 bearing thereon. Moreover, even though the springs as 214 and 215 are applying tension on the sensing finger 195—U during restoring movement of the summation member 166—U, this finger is moved downwardly as the succeeding steps 193—U move thereby so that when the summation member 166—U attains the zero position thereof shown in Fig. 17, the sensing finger 195—U will be in the zero or at rest position thereof.

When the bail 192 attains the broken line position thereof shown in Fig. 11 during a cycle of operation of my multiplying mechanism, as stated hereinabove, the necessary summation movements of the summation members are completed and these members are set to represent the digits that are to appear in the orders of the final product to which the summation members respectively pertain. Moreover, and during the time the bail moves from the broken line position thereof shown in Fig. 11 to the position thereof shown in Fig. 13, the digits the summation members 166 are set to represent are read out therefrom.

The devices which are effective to read out the product from the set-up summation members include rockers now to be described which are mounted on studs 290 and 291, Figs. 11, 14 and 15, which are respectively mounted on and extend outwardly from the side walls 110 and 111. Thus, a rocker generally indicated by 292 is mounted on the stud 290 and this rocker includes a finger 293 that lies in the path of travel of the roller 279 mounted on the bail 192. A rocker generally indicated by 294 is mounted on the stud 291 and includes a finger 295 that lies in the path of travel of the roller 281 on the bail 192. The rocker 292 also includes a finger 296 and the rocker 294 includes a finger 297 and these fingers and, therefore, the rockers 292 and 294 are interconnected by a bail 298 that extends through arcuate slots 299 and 300 respectively provided in the side walls 110 and 111, the ends of this bail being connected to the fingers 296 and 297.

As best shown in Figs. 11, 15 and 17 to 22, inclusive, a shaft 301 extends between and is journaled in the side walls 110 and 111. Rockers 302 are pivotally mounted on this shaft adjacent each summation member 166, the rocker 302—U being mounted on the shaft 301 adjacent the summation member 166—U, and the suffix letter or letters included in the reference character applied to each other rocker 302 indicates the summation member adjacent to and to which the particular rocker 302 is related, the letter added to the reference characters 302 corresponding to those added to the reference characters 166 to indicate the respective orders of the final product. Each rocker as 302—U has a sensing finger as 303—U mounted at the lower end thereof, and, as best shown in Figs. 17 to 22 inclusive, the tail portions of the sensing fingers 303 are respectively disposed to lie beneath the bail 298. Moreover, a rod 304 extends between the side walls 110 and 111 and springs as 305—U extend between this rod and the various sensing fingers as 303—U to be effective to urge the nose-portion of each sensing finger as 303—U toward steps as 306—U formed in the upper surface of the related summation members as 166—U. The sensing fingers as 303—U are mounted immediately above the summation member to which the particular sensing finger is related. The steps 306—U, like the steps 193—U, are each of a length equal to ten of the unit spaces referred to hereinabove with reference to the spacing of an edge 165 on a bar 130 on a plate 125 from pins 146 in such plate. Therefore, each step as 306—U is representative of the digits of a notation.

When the rockers 292 and 294 and the bail 298 carried thereby are in the at rest positions thereof shown in Figs. 11, 14 and 17 to 22 inclusive, the bail 298 bears on the tail-portions of the sensing fingers as 303—U to dispose the nose-portions of these sensing fingers in spaced relation with the steps as 306—U on the related summation member. However, immediately as the bail 192 attains the broken line position thereof shown in Fig. 11, at which time the rollers 279 and 281 respectively engage the fingers 293 and 295, the bail 192 continues to move toward the right as viewed in Figs. 11 and 12, and when the bail 192 has moved from the broken line position thereof shown in Fig. 11 to the position thereof shown in Fig. 12, the bail 298 will have been retracted from engagement with the tail-portions of the sensing fingers as 303—U. Thereupon, the fingers as 303—U are freed to the effect of springs as 305—U so as to dispose the nose-portion of the sensing finger as 303—U in engagement with the particular step 306—U on a summation member as 166—U that is disposed beneath the sensing finger 303—U by reason of movement of the summation member as 166—U into a position to represent the digit that is to appear in the particular order of the final product to which the particular summation member relates. Furthermore, when the rollers 279 and 281 respectively engage the fingers 293 and 295 and thereafter rock the rockers 292 and 294 by reason of movement of the bail 192 from the broken line position thereof shown in Fig. 11 to the full line position thereof shown in Fig. 12, the fingers 293 and 295 respectively move into alignment with fingers as 308 and 309 on rockers generally indicated by 310 and 311, Figs. 11 and 14, that are respectively mounted on studs 291 and 292 adjacent the rockers 292 and 294. Hence, the rollers 279 and 281 thereafter bear not only on the fingers 293 and 295 respectively, but also respectively on the fingers 308 and 309 so that continued movement of the bail 192 toward the right as viewed in Figs. 12 and 13 will be effective to pivot not only the rockers 292 and 294, but also the rockers 310 and 311.

As best shown in Figs. 11 and 14, the rockers 310 and 311 include arms 312 and 313 and a rod 314 is connected to the upper ends at these arms, this rod 314 extending through arcuate slots 315 and 316 respectively provided in the side walls 110 and 111. Furthermore, slots as 317 and 318, Figs. 11 and 14, are respectively provided in the side walls 110 and 111 and a bail 319 has opposite ends thereof passed through these slots. A link 320 interconnects the rod 314 and the bail 319 outwardly of the side wall 110 and a link 321 interconnects the rod 314 and the bail 319 outwardly of the side wall 111. A spring 322 extends between a spring anchor on the side wall 110 and the adjacent end of the link 320 and a spring 323 extends between a spring anchor and the side wall 111 and the adjacent end of the link 321. These springs, therefore, urge the bail 319 and the rod 314 toward the right as viewed in Fig. 11 (and toward the left as viewed in Fig. 14), and when the rod 314 is disposed in the ends of the slots 315 and 316 in which it is shown in Figs. 11 and 14, the fingers 308 and 309 of the rockers 310 and 311 are disposed in the at rest positions thereof shown in Figs. 11 and 14, in which position these fingers are disposed at the time when the rollers 279 and 281 have pivoted the fingers 293 and 295 respectively into alignment with the fingers 308 and 309.

The springs 322 and 323 are effective on the bail 319 to urge this bail into engagement with the rockers as 302 to, therefore, normally dispose these rockers in the at rest positions thereof shown in Figs. 17 to 22, inclusive. The rockers as 302—U are under the effect of springs as 325—U that respectively extend between the upper ends of these rockers and the rod 314 that extends between and is carried by the arms 312 and 313 that are respectively disposed outwardly of the side walls 110 and 111.

Figure 12:
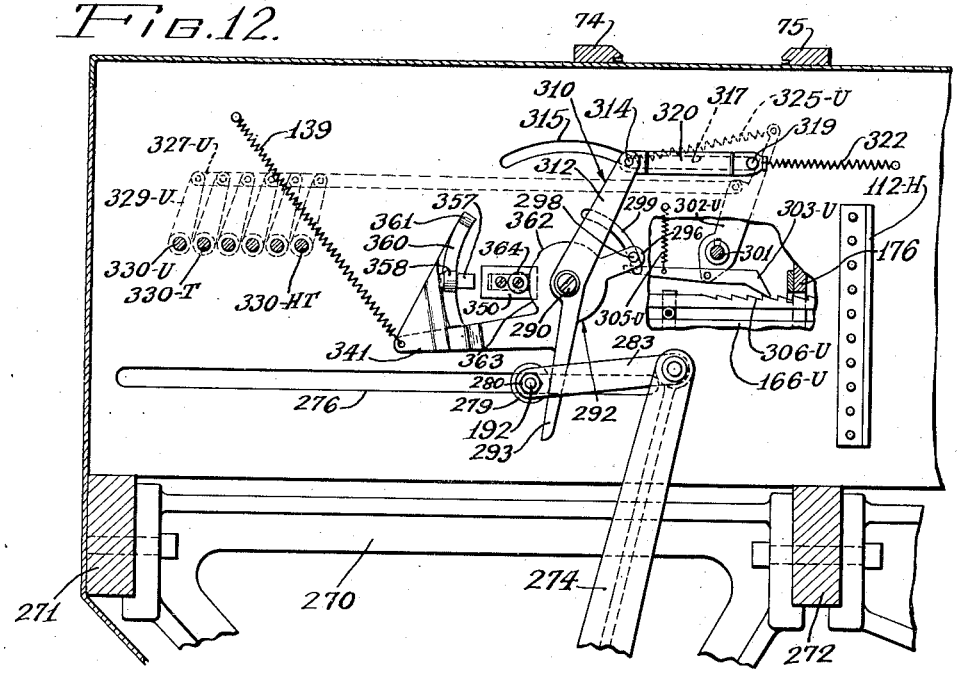
Figs. 12 and 13 are fragmentary detail views similar to Fig. 11, respectively showing certain of the mechanism in different operative positions thereof.
Figure 13:
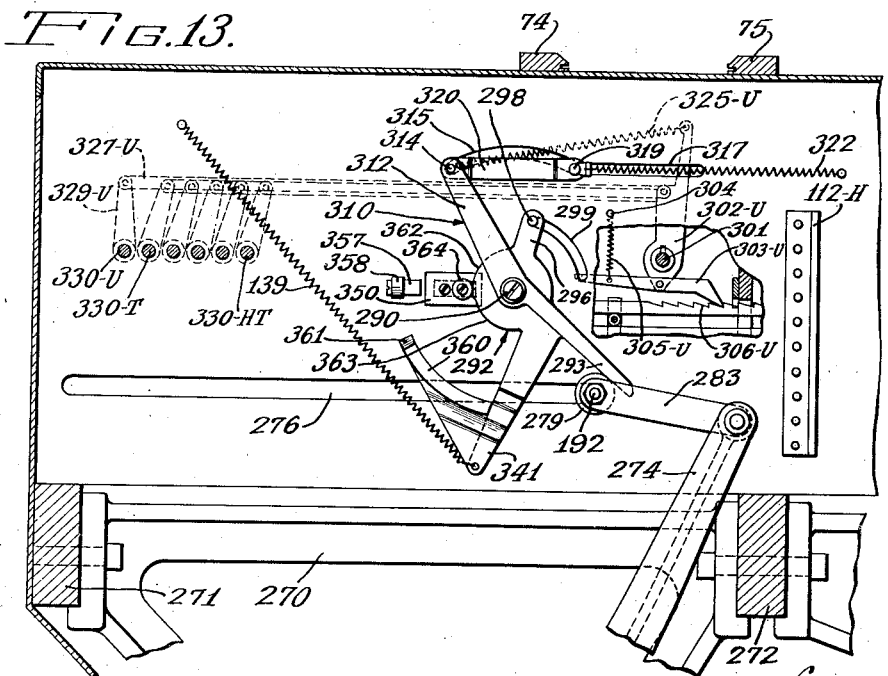

Consequently, when movement of the bail 192 toward the right is continued from the position in which the bail 192 is shown in Fig. 12 (at which time the rollers 279 and 281 are respectively engaging the fingers 293 and 308 and the fingers 295 and 309), and continues to move toward the position in which this bail is shown in Figs. 13, the rollers 279 and 281 are respectively effective to pivot the rockers 292 and 310 and the rockers 294 and 311 from the positions thereof, such as are shown in Fig. 12 with respect to the rockers 292 and 310, to the positions thereof shown in Fig. 13. Upon movement of the bail 319 with the rockers 310 and 311 from the position thereof shown in Fig. 12 to the position thereof shown in Fig. 13, this bail is retracted from cooperation with the rockers as 302—U which are thereupon freed to the effect of the elongated springs as 325—U. The rockers as 302—U will be freed to the effect of the springs as 325—U after the nose portions of the sensing fingers as 303—U will have been seated in the underlying steps as 306—U. Hence, the result of freeing the rockers as 302—U to the effect of springs as 325—U is to permit the nose-portions of the sensing fingers 303—U to move toward the right as viewed in Fig. 17 to thereby urge such nose-portion across the underlying step as 306—U.

In Figs. 32 and 33 I have diagrammatically illustrated the effect of such movement of a sensing finger 303 across a step 306. Thus, as shown in Fig. 33, the summation member 166 has advanced from the zero position thereof shown in Fig. 32 to a position to be representative of the product 34. In the course of such movement of the summation member 166 from the zero position thereof shown in Fig. 32 to the product-representing position thereof shown in Fig. 33, the sensing finger 195 moved from the lowermost step 193 on the summation member 166 into engagement with the step 193 spaced inwardly from the zero-representing step in an amount equal to three of the aforesaid unit spaces, the sensing finger 195 being shown in engagement with such step in Fig. 33. In the manner explained hereinabove, such movement of the sensing finger 195 is effective to transfer the representation of three digits from the order of the final product to which the summation member 166 pertains to the summation member pertaining to the next higher order of the final product. Hence, the left-hand component of the product 34, represented by the position of the summation member 166 in Fig. 33, will have been transferred to the summation member pertaining to the next higher order of the final product.

Upon retraction of the bail 298 from the tail-portion of the sensing finger 303, this sensing finger moved into the broken line position thereof shown in Fig. 33. Moreover, upon retraction of the bail 319 from engagement with the rocker 302 carrying the particular sensing finger 303, the sensing finger advanced from the broken line position thereof shown in Fig. 33 to the full line position thereof shown in this view and in such position thereof shown in this view and in such movement the sensing finger 303 moved through a distance equivalent to four of the aforesaid unit spaces so that, therefore, this sensing finger 303 and, therefore, the rocker 302 on which it is mounted moved through a distance equal to four of the aforesaid unit spaces. Thus, considering the at rest positions of the various sensing fingers 302 shown in Figs. 17 to 22, inclusive, the zero positions thereof, such movement of the sensing finger and rocker is effective to dispose the rocker 302 in a position representative of the digit 4.

Further, in this regard, it will be understood that if the summation member 166 shown in Fig. 33 had moved into a position to represent some significant digit other than 4, then the portion of the step 306 underlying the sensing finger 303 at the time the sensing finger initially engages the particular step 303 would have been disposed in such position that the shoulder at the end of the particular step 306 would have been spaced from the initial position of the sensing finger 303 (shown in broken lines in Fig. 33), a distance equal to the number of unit spaces corresponding to the value of the particular significant digit. Hence, movement of a sensing finger as 303 from an initial position thereof shown in broken lines in Fig. 33 to the full line position thereof shown in this view, which is to say, into engagement with the shoulder at the end of step 306 engageable by the sensing finger 303, is effective to move the sensing finger 303 and the rocker 302 associated therewith through a distance equal to the number of unit spaces corresponding to the value of the significant digit represented by the position of the summation member 166.

If the summation member 166 had remained in the zero or at rest position thereof shown in Fig. 32 or if this summation member had moved into a position representative of, for example, 10, 20 or 30 so that the digit zero appeared as the right-hand component of the product the summation member 166 was set to represent, then the sensing finger 303 would have moved into engagement with the underlying step 306 at a position spaced from the shoulder at the end of such step 306 only sufficiently to afford operative clearance between the sensing finger 303 and such shoulder so that, therefore, the sensing finger 303 would be disposed to immediately engage the shoulders at the end of the step 306 when the rocker 302 was free to the effect of the spring 325 connected thereto. In such circumstances the sensing finger 303 would only move sufficiently to take up the operative clearance between this finger and the shoulder at the end of the step 306 and such movement would be without numerical significance so that, therefore, the sensing finger 303 would be disposed in a position representative of the digit "0."

Consequently, when rockers as 302 are free to the effect of the springs 325 respectively connected thereto, these rockers are moved into a position to represent the numerical significance of the right-hand component of the product represented by the position of the summation member 166 operatively related to the particular rocker 302. Such position of the rocker 302, in the illustrated form of my mechanism, is utilized to set up type segments TS operatively connected to the particular rockers 302 in positions such that the digits appearing as the right-hand components of the various products represented by the positions of the respectively related summation members 166 may be printed therefrom.

To this end links as 327—U, Fig. 17, are respectively pivotally connected to the rockers 302—U as indicated at 328—U, Fig. 17, and these links extend from the rockers as 302—U to arms at 329—U which are connected to and extend upwardly from shafts as 330—U. As best shown in Figs. 15 and 17 to 22, inclusive, the shafts including the shaft 330—U are journaled in side by side relation in the side walls 110 and 111 and, as best shown in Fig. 15, these shafts extend outwardly beyond the side wall 110. These shafts, like the summation members 166, are respectively allocated to the orders of the final product in which digits may appear and like the reference characters 166 applied to the summation members, the reference characters 330 applied to these shafts have a suffix as "U," "T," "H," "TH," "TT," and "HT" added thereto to thereby designate the order of the final product to which each of these shafts 330 pertain.

The at rest positions of rockers as 302 and the arms as 329—U are respectively illustrated in Figs. 17 to 22 inclusive. When, however, the rockers as 302—U move counterclockwise as viewed in Figs. 17 to 22 inclusive, this movement is transmitted through the links as 327—U and rockers as 329—U to the shafts as 330—U. These shafts as 330—U are respectively connected to the type segments TS so as to be effective to set up these type segments upon such movement of the shafts as 330—U.

As best shown in Figs. 4 and 15, the type segments as TS are rockably mounted on a shaft 332 which is mounted in the frame of the machine adjacent the anvil A. Thus, the shaft 332 is mounted in bearings 333 and 334, a plurality of shoulder collars 335 being disposed on the shaft 332 between the adjacent faces of the bearings 333 and 334. The respective type segments TS are mounted on the reduced and shoulder portions 336 of the respective collars 335 to thereby be supported for swinging movement about the axis of the shaft 332 and also so as to support the type segments TS in side by side relation. The reference characters TS applied to the type segments, like the reference characters 166 applied to the summation members and the reference characters 333 applied to the shafts, have the letters "U," "T," "H," "TH," "TT," and "HT" added thereto as a suffix to thereby indicate the order of the final product to which the particular type segment pertains.

Links as 337—U respectively extend between arms as 338—U mounted on the shafts as 330—U outwardly of the side wall 110 and the type segments TS. The reference characters 337 and 338 also have letters added thereto to indicate the order of the final product to which the links and arms respectively pertain. Thus, the link 337—U, Figs. 4 and 15, is pivotally connected to the type segment TS—U and the arm 338—U that is fast on the shaft 330—U. Consequently, when the rocker 302—U is disposed in a digit-representing position in the manner explained hereinabove, this is effective through the link 327—U, arm 329—U, shaft 330—U, arm 338—U and link 337—U to dispose the type segment TS—U in such position that the type face F thereon from which the digit the rocker 302—U is set to represent is disposed in printing position PP, Fig. 3.

Thus, by referring to Fig. 3, it will be seen that the type faces F on the various type segments TS, when the type segments TS are in the at rest position thereof, are so arranged that the type faces F from which the digit "0" is printed are disposed in printing position PP. However, upon rotation of a shaft as 330—U counterclockwise as viewed in Figs. 17 to 22 inclusive, the link as 337—U connected thereto, in the manner explained above, is moved toward the left as viewed in Fig. 15, and this is effective to pivot the type segment as TS—U counterclockwise as viewed in Fig. 1 to thereby advance the particular type face into printing position PP. In this regard it will be understood that when the nose of a sensing finger as 303—U is disposed in a position to be representative of the digit "0," no movement of numerical significance will be imparted to the shaft as 330—U and consequently the type segment as TS—U will remain in such position that the type face F thereon from which the digit "0" may be printed will remain in printing position PP.

It will be understood that movement of links as 327—U, the shafts as 330—U and the type segments as TS—U is effected under the influence of springs as 325—U upon retraction of the bail 319 upon the rocking of rockers as 310 and 311, Figs. 11 and 14, when these are respectively engaged by the rollers 279 and 281 on the bail 219 and such movement under the influence of the springs as 325 is effected during the time the bail 192 advances from the position thereof shown in Fig. 12 to the position thereof shown in Fig. 13.

The broken line position of the bail 192 in Fig. 11 is the positioned attained by this bail at the end of the movement thereof in the direction to enable summarizing movement of the summation members 166 to occur. Hence, between the time the bail 192 moves from this position to the position thereof shown in Fig. 13, the various devices operatively related to type segments TS will have been operated under control of the position attained by the related summation member 166. Therefore, by the time the bail 192 attains the position thereof shown in Fig. 13, the end of summarizing movement thereof, the type segments TS are disposed in position to have the final product printed therefrom. During the time when the type segments TS are so set up, the platen PL is operated to make an impression on the sheet S from the type faces F disposed in printing position PP. Subsequent to the time an impression has been so made the cam groove 289, Fig. 11 is effective on the roller 288 and the drive arm 286 to move this drive arm toward the left as viewed in Fig. 11 and thereupon the bail 192 is moved from the position thereof shown in Fig. 13 back into the zero or at rest position thereof shown in, for example, Fig. 15.

During movement of the bail 192 toward the zero position thereof and particularly during the time the bail moves from the position thereof shown in Fig. 13 to the position thereof shown in Fig. 12, the springs 322 and 323, Figs. 11 and 14, are effective on the links 321 and 322 to move the bail 319 toward the at rest position thereof shown, for example, in Fig. 11. During the time the bail 319 moves from the position thereof shown in Fig. 13 to the at rest position thereof shown in Fig. 12, this bail, under the influence of the springs 322 and 323, engages the various rockers 302 and, therefore, the rockers 302 and the parts associated therewith are restored to the at rest position thereof shown, for example, in Figs. 11 and 12. When the bail 192 attains the position thereof shown in Fig. 12, the nose-portions of the various sensing fingers as 303—U are still in engagement with the steps as 306—U that have been engaged by these nose-portions. However, the bail 192 continues in its movement toward the zero position thereof and, therefore, the bail moves from the position thereof shown in Fig. 12 to the position thereof shown in Fig. 11, and in the course of such movement the springs 339 and 340, Figs. 11 and 14, which extend between spring anchors respectively provided on the side walls 110 and 111 and the arms 341 and 342 of the rockers 292 and 294, are effective to move these rockers into the zero or at rest positions thereof shown in Figs. 11 and 14. As the rockers 292 and 294 return to these at rest positions thereof, the bail 298 moves into engagement with the tail-portions of the sensing fingers 303 and thereupon these sensing fingers are retracted from engagement with the steps 306 that have been engaged thereby to be disposed in the at rest positions thereof shown, for example, in Fig. 11.

Such restoration of the devices which are effective to set up the type segments TS to the at rest positions thereof is, therefore, effected by the time the bail 192 attains the broken line position thereof shown in Fig. 11, and this, therefore, occurs prior to the time the bail 192 engages any of the toe-portions 191 on the summation members 166 in the course of restoring movement thereof. However, during movement of the bail 192 from the broken line position thereof shown in Fig. 11, to the full line or zero position thereof shown in this view, the bail 192 engages the toe-portions 191 to restore the summation members 166 and the parts operatively associated therewith to the zero positions thereof.

It is desirable that the type faces F on the type segments TS be accurately aligned one with the other when these segments are operated to dispose in printing position the particular type faces from which the digits in the various orders in the final product are to be printed, such aligning being known as justifying the position of the type segments TS. In order that this may be effected, each type segment as TS has an opening 400, Fig. 1, formed therein and teeth 401 are formed in the upper edge of this opening. The teeth 401 in each type segment are preferably substantially V-shaped as shown in Fig. 1 and the apices of these various teeth are respectively aligned with the type faces F provided on the particular type segment.

The bar 402 is moved from the at rest position thereof, at a time when the type segments TS will have been set up to dispose in the printing position PP those type faces F thereon that pertain to the digits in the final product that are to be printed on the sheet S. Therefore, the teeth 401 that are respectively aligned with these type faces will be disposed in position to cooperate with the V-shaped upper edge 403 on the bar 402. In this regard, the open ends of the V-shaped teeth 401 are of sufficient width to insure that the V-shaped edge 403 will move into the proper teeth 401 and since the edge 403 and the teeth 401 are V-shaped and complementary, such movement of the edge 403 into the teeth 401 enables the apex of the V-shaped edge of the bar 403 to seat on the apices of the teeth aligned therewith. When the edge 403 seats in the apices of the teeth 401, the various type segments will be aligned one with the other along the edge 403 whereupon the type faces on the respective type segments aligned with the engaged teeth 401 will be accurately aligned one with the other at printing position PP, Fig. 3.

When, as shown in Fig. 3, the type segments as TS from which the digits in the various orders of the final product may be printed are arranged to print these products in terms of dollars and cents, the type segments TS—U and TS—T respectively pertain to the units and tens orders of cents, and in such circumstances the type segments TS—H, TS—TH, TS—TT and TS—HT respectively pertain to the units, tens, hundreds, and thousands orders of dollars. Moreover, when these type segments are so arranged that the product may be printed in terms of dollars and cents, it is advantageous to print blanking characters above the highest significant digit in the dollars amount, as is well understood in the art. This entails the utilization of what are known as zero suppressing devices and such devices are provided in the illustrated form of my mechanism so that blanking characters as B in the form of stars may be moved into printing position PP on those type segments TS pertaining to dollars in the order above the highest order in which a significant digit is to be printed from the type segments TS pertaining to dollars.

To this end, and as best shown in Fig. 15. plates as 345—H, 345—TH, 345—TT and 345—HT are respectively fast to the summation members as 166—H, 166—TH, 166—TT and 166—HT on the faces of these summation members disposed toward the side wall 111. Also as best shown in Fig. 15, these plates as 345—H have the inner ends thereof disposed in position to be engaged by a latch as 346—H when the related summation member as 166—H is disposed in the zero position thereof. The latches as 346—H are pivotally mounted on a bar 347 that is extended through slots 348 and 349 respectively provided in the side walls 110 and 111. The bar 347 is held against endwise displacement from these slots by having plates 350 and 351 secured to the ends thereof respectively outwardly of the side walls 110 and 111, such plates engaging these side walls to support the bar 347 for sliding movement in the slots 348 and 349 in a manner and for a purpose explained presently. Springs 352 and 353 extend between the bar 347 and spring anchors mounted respectively on the side walls 110 and 111 and these springs are effective to urge the bar 347 toward the right as viewed in Fig. 15 to thereby dispose the nose-portions of the latches as 346—H in position to engage the inner ends of plates as 345—H when the related summation member as 166—H is in the zero position thereof.

The latches as 346—H each includes an arm as 354—H to which a spring as 355—H is connected, such springs being respectively connected to spring anchors provided on the bar 347. The springs as 355—H are effective to urge the nose-portion of the associated latch as 346—H toward the associated plate as 345—H. However, pins as 356—H provided in a bar 357 normally engage the arms as 354—H to retract the nose-portion of the related latch as 346—H out of cooperation with the related plate as 345—H. The bar 347 is mounted for sliding movement in openings provided in the side walls 110 and 111, and as best shown in Figs. 11 and 15, a roller 358 is provided on the end of the bar 357 extended beyond the side wall 110. A spring 359, Fig. 15, extends between spring anchors respectively provided on the side wall 111 and the bar 357 and is effective to urge the roller 358, Fig. 11, toward a cam surface 360 provided on the arm 341 of the rocker 292. The cam surface 360 is flat throughout the major portion of the extent thereof and resists the effect of the spring 359 so as to dispose the bar 357 in such position that the pins as 356—H therein normally retain the nose-portions of the latches as 346—H in the at rest positions thereof shown in Fig. 15 and out of cooperation with the associated plate 345—H. However, when the drop 361 at the end of the cam surface 360 moves into association with the roller 358, the bar 357 is freed to the effect of the spring 359 whereupon the bar 357 is so moved that the pins as 356—H therein are retracted from cooperation with the arms as 354—H and thereupon the latches as 346—H are free to the effect of the springs as 355—H and the nose-portion of the related latch as 346—H moves into cooperation with the associated plate 345—H.

It has been explained hereinabove that by the time the bail 192 attains the broken line position thereof shown in Fig. 11, the various summation members will have completed the summarizing operation thereof, and by referring to Fig. 11 it will be seen that the roller 358 is at this time engaged with the cam surface 360 so as to retain the bar 357 in the position thereof in which it is shown in Fig. 15. Thereafter, however, the cam surface 360 moves relative to the roller 358 so that during the time the bail 192 is moved from the position thereof shown in Fig. 12 to the position thereof shown in Fig. 13, the drop 361 on the cam surface 360 will move into association with the roller 358 with the effect hereinabove described. The drop 361 will move into cooperation with the roller 358 subsequent to the time the sensing finger as 303 will move from the broken line position thereof shown in Fig. 33 to the full line position thereof shown in this view, which is to say, the drop 361 will move into cooperation with the roller 358 subsequent to the time the type faces F on the type segments TS that are to be effective in a particular printing operation will have been disposed in printing position PP, Fig. 3.

If, at the time the bar 357 is freed to the effect of the spring 359 by reason of movement of the drop 361 into association with the roller 358, the summation member 166—H has remained in the zero position thereof shown in Fig. 15 to thereby be in a position to represent the digit "0" in the hundreds order of the final product, the end of the plate 345—H will be disposed in position to be engaged by the nose-portion of the latch 346—H. If, however, the summation member 166—H is at this time disposed in position to represent the digit "1," or any value higher then "1," then when the bar 357 is freed to the effect of the spring 359 the face of the plate 345—H will be disposed in such position that the latch 346—H will merely rest on this face and will, therefore, be prevented from engaging the inner end of the plate 345—H. In such circumstances, movement of the latch 346—H imparted thereto in a manner now to be described will be ineffective to move the summation member 166—H.

When, however, the summation member 166 is in the zero position thereof so that the nose of the latch 346—H engages the inner end of the plate 345—H, then upon movement of the bar 347 the summation member 166 will be moved toward the left as viewed in Fig. 15 with an effect to be described presently. Such movement of the bar 347 is effected by a rise 362, Figs. 11, 12 and 13, on a cam surface 363 on the rocker 292. A roller 364 mounted on the plate 350 is normally urged into engagement with the dwell of the cam surface 363 by the springs 352 and 353, Fig. 15, effective on the bar 347. As best shown in Fig. 13, the rise 362 on the cam surface 363 does not move into engagement with the roller 364 until well after the drop 361 on the cam surface 360 has moved into association with the roller 358. Hence, by the time the rise 362 engages the roller 364 a latch as 346—H will have been freed to the effect of the spring as 355—H so that if, as explained hereinabove, the summation member 166—H is in the zero position thereof, the nose-portion of the latch as 346—H will be engaging the end of the plate 345—H at the time the rise 362 moves into engagement with the roller 364. The slots 348 and 349, Fig. 15, in the side walls 110 and 111 are wider than the bar 347 mounted therein in an amount equal to one of the aforesaid unit spaces referred to hereinabove with reference to the spacing of an edge 165 on a bar 130 on a plate 125 from pins 146 in such plate. Therefore, when the rise 362 engages the roller 364 so as to move the bar 347 against the effect of the springs 352 and 353, the bar 347 may move through the slots 348 and 349 in an amount equal to one of the aforesaid unit spaces. If the summation member 166—H is in the zero position thereof prior the time the bar 347 is moved against the effect of the springs 352 and 353, the type face F thereon from which the digit "0" may be printed will be disposed in printing position PP.

As will be evident in Fig. 3, a blanking character B is provided on the type segments TS—H and on each type segment pertaining to a higher order, and such blanking characters are in each instance disposed so as to lie on the side of the zero character that is opposite from the "1" character, thus to enable such blanking characters to be brought into printing position by what may be termed a one space reverse setting movement. Moreover, as can be seen by reference to Fig. 15, the bar 347 is moved by the rise 362 in a direction opposite to the direction of summation movement of the summation members 166, in which direction the sensing fingers 303 move to so operate the type segments TS that a type face F from which a significant digit may be printed is disposed in printing position PP. Therefore, if the nose-portion of the latch 346—H engages the end of the plate 345—H, the summation member 166—H, upon movement of the bar 347 will be moved in a direction opposite to the summation movement thereof in an amount equal to one of the aforesaid unit spaces. At the time this occurs the nose-portion of the sensing finger 303—H will be engaged with the first step 346—H on the summation member 166—H and will be spaced from the shoulder at the end of this step, if at all, only in the amount of the operative clearance referred to hereinabove with reference to the seating of a nose-portion on a sensing finger as 303 on a step 306. Therefore, when the summation member 166—H is moved in the direction opposite to the summation movement thereof in an amount equivalent to one of the aforesaid unit spaces, the shoulder at the end of the first step 308—H on the summation member 166—U will be engaged with the nose portion of the sensing finger 303—H and this will have the effect of moving the rocker 302—H in a direction opposite to that in which such rocker would have moved were this rocker to move into position to represent a significant digit. Such movement of the rocker 302—H is transmitted through the link 327—H, Fig. 19, the arm 329—H the shaft 330—H, the arm 336—H, Fig. 15, and link 337—H to so move the type segment TS—H that the blanking character B thereon is moved into printing position PP, Fig. 3.

The blanking character B on the type segment TS—H will only be moved into printing position in the manner just described in an instance where no significant digit is to be printed from any type segment TS that pertains to dollars and in such an event blanking characters as B on all of the type segments pertaining to dollars should be moved into printing position PP. To this end a link as 366 is pivotally connected to the sensing finger 346—TH and has a slot 367 in the other end thereof through which a pin 368 on the latch 346 is extended so as to afford a lost motion connection between the link 366 and the latch 346—H for a purpose to be described presently. A link 369 similarly extends between the latches 346—TT and 346—TH and this link is connected to the sensing finger 346—TH through a lost motion connection such as that described hereinabove. Yet further, a link 370 extends between the latches 346—HT and 346—TT, and this link is connected to the latch 346—TT through a lost motion connection as described hereinabove. Therefore, if the summation members 166—TH, 166—TT and 166—HT are disposed in zero position when the summation member 166—H is disposed in zero position, movement of the latch 346—H into position to engage the adjacent end of the plate 345—H will be effective through the links 366, 369 and 370 to also dispose the latches 346—TH, 346—TT and 346—HT in position to engage the end portions of the plates 345 on the associated summation member. Hence, upon movement of the bar 347 as aforesaid, blanking characters on the type segments TS—TH, TS—TT and TS—HT will also be moved into printing position PP when the blanking character B on the type segments TS—H is disposed in printing position PP.

In the event the summation members 166—H and 166—TH should move into a position to represent the digit "1" or a higher value while the summation members 166—TT and 166—HT remain in the zero positions thereof, the nose-portions of the latches 346—TT and 346—HT will move into position to engage the ends of the associated plates 345—TT and 345—HT respectively but at this time and under such circumstances, the latches 346—TH and 346—H will respectively engage the faces of the plates 345—TH and 345—H rather than the end portions of these plates. Hence, when the bar 357 is freed to the effect of the spring 359 to thereby free the various latches 346 to the effect of the springs 355 connected thereto, the latches 346—TH and 346—H will not be free to move in an amount as great as will the latches 346—TT and 346—HT. It is for this reason that the aforesaid pin and slot or lost motion connections are afforded in the links 366, 369 and 370, for if under the last described circumstances, the latch 346—TT moves into position to engage the end of the plate 345—TT at a time when the nose-portion of the latch 346—TH moves into position to engage the face of the plate 345—HT, the link 369 will move relative to the latch 346—TH by reason of the lost motion connection between this link and this latch. If the latch 346—TH is also under such circumstances engaging the face of the plate 345—TH, the link 366 will not move sufficiently to disturb the position of the latch 346—TH on the face of the plate 345—TH but even if it did, the link 366 would be free to move relative to the latch 346—H by reason of the pin and slot connection 368 and 367. Therefore, the above described arrangement is such that the only blanking characters B which are moved into printing position PP are those on type segments TS that relate to orders of dollars higher than the order in which a type segment TS which is set in position to have a significant digit printed therefrom relates. Hence, the type face from which "0" may be printed remains in printing position PP on those type segments which pertain to orders of dollars lower than the highest of such orders in which a significant digit appears.

In the course of restoring movement of the bail 192 from the position thereof shown in Fig. 13 to the zero or at rest position thereof shown in Fig. 15, the rise 362, Figs. 11 and 12, moves out of association with the roller 364 and thereupon the springs 352 and 353, Fig. 15, are effective to restore the bar 347 to the at rest position thereof shown in Fig. 15. Subsequent to such restoration of the bar 347, the cam surface 360, Figs. 11 and 12, moves into association with the roller 358, and thereupon the bar 357 is moved against the effect of the spring 359 to thereupon engage the pins as 356—H thereon with the arms as 354—H so as to thereby restore the various latches as 346—H to the at rest positions thereof, shown in Fig. 15 out of engagement with the plate as 345—H.

Moreover, since disposition of a blanking character B in printing position PP is effected against the effect of springs as 325—H, the restoration of the latches as 346—H to the at rest position thereof enables the springs as 325—H to become effective to insure engagement of the rockers as 302—H with the bail 319 so that those type segments TS which have been moved to have the blanking character B thereon disposed in printing position PP will be moved back into position to have the type face F thereon from which the digit "0" may be printed back disposed in printing position PP.

A typical operation of my multiplying mechanism is schematically illustrated in Figs. 34 and 35 where the elements are shown as arranged to effect multiplication of a fixed factor of 159 by a variable factor of 246. In Fig. 34 the elements are shown in the positions thereof subsequent to the setting-up of representations of the digits of the fixed factor, while in Fig. 35 the elements are shown in the positions attained thereby upon completion of a summarizing operation, the illustration of the positions of the elements in Fig. 35 representing the positions attained by these elements when the bail 192 has attained the position thereof shown in Fig. 13.

Inasmuch as the typical operation depicted in Figs. 34 and 35 entails the multiplication of a fixed factor having the digit "9" in the units order thereof, the bars 130 on those plates 125 which pertain to the units order of the fixed factor are set in a position to represent the digit "9." In the illustrated form of my invention such plates are the plate 125—FU×VU related to the units order of the final product, the plate 125—FU×VT related to the tens order of the final product, and the plate 125—FU×VH related to hundreds order of the final product. By referring to Fig. 34 it will be seen that the bar 130 on each of these plates is disposed in a position to represent the digit "9."

Likewise, since the operation of my mechanism illustrated in Figs. 34 and 35 entails multiplication of the digit "5" in the tens order of the fixed factor, the bars 130 on those plates which pertain to the tens order of the fixed factor are disposed in a position to be representative of the digit "5." Hence the bar 130 on the plate 125—FT×VU related to tens order of the final product, the bar 130 on the plate 125—FT×VT related to the hundreds order of the final product, and the bar 130 on the plate 125—FT×VH pertaining to the thousands order of the final product are set in position to represent the digit "5."

Yet further, since the operation illustrated in Figs. 34 and 35 entails a multiplication of the digit "1" in the hundreds order of the fixed factor, the bars 130 on the various plates 125 pertaining to the hundreds order of the fixed factor are set into position to represent the digit "1." Therefore, the bar 130 on the plate 125—FH×VU related to the hundreds order of the final product, the bar 130 on the plate 125—FH×VT related to the thousands order of the final product, and the bar 130 on the plate 125—FH×VH related to the ten-thousands order of the final product are set in position to represent the digit "1."

Once the bars 130 on the various plates have been set as above described to represent the various digits that appear in the various orders of the fixed factor, my multiplying mechanism may be set in operation so as to effect multiplication of the various digits in the various orders of the fixed factor by the various digits that appear in the various orders of the variable factor. It will be understood that the above described disposition of the various bars 130 affords a representation of all of the products that may result from multiplication of the digit the bar 130 is set to represent by all of the digits that may appear in the order of the variable factor to which the particular plate on which a particular bar 130 is provided is also related.

The variable factor 296 entailed in the multiplication illustrated in Figs. 34 and 35 will be represented on a printing and control device D disposed in sensing position SP to cooperate with the sensing pins 87. The bell crank 66 which imparts sensing movement to the pins 87 is disposed in the full line position thereof shown in Fig. 2 at the start of an operation of my multiplying mechanism. Hence, very shortly after the start of a cycle of operation, the roller 109, Fig. 2, starts to travel up the inclined plate 108 and in the course of movement of this roller over this plate the arm 103 is moved clockwise as viewed in Figs. 2 and 6 whereupon sensing pins 87 in the sensing head advance toward perforations P in the field F on the printing and control device D disposed in sensing position SP. In the present instance where the field F on the printing and control device D in the sensing position SP has a perforation P at the "2" position in the hundreds order, a perforation P at the "9" position in the tens order, and a perforation P at the position "6" in the units order, the sensing pin 87 in the set thereof pertaining to the units order will pass through the underlying perforation P and will, therefore, be effective to push the underlying push pin 93 and the Bowden cable 96 connected thereto so as to thereby push the pin 121—U—6 inwardly of the side wall 111. Moreover, the sensing pin 87 pertaining to "9" in the set of pins pertaining to the tens order will pass through the underlying perforation P to engage the push pin 93 aligned therewith so as to thereby push this pin and the Bowden cable 96 connected thereto so as to thereupon push the pin 121—T—9 inwardly of the side wall 110. Yet further, the sensing pin 87 in the set thereof pertaining to the hundreds order will pass through an underlying perforation P in the field F on the printing and control device D at sensing position SP so as to thereupon push the underlying push pin 93 and the Bowden cable 96 connected thereto so as to thereby push the pin 121—H—2 inwardly of the side wall 110. Such pushing of these pins 121 is effective to push the pins aligned therewith so as to thereby dispose selected of such aligned pins in position to serve as stop pins with respect to the bars 130 on the plates 125 related to the particular pins.

Therefore, pushing of the pin 121—U—6 will be effective to push the pin 184—6 in the sensing head 173—U into position to serve as a stop pin with respect to the bar 130 on the plate 125—FU×VU. Since this bar 130 on this plate will already be set in position to represent the digit "9" in the units order of the fixed factor and since pushing of the pin 184—6 affords a representation with respect to this plate of the digit "6" in the units order of the variable factor, the product 54 pertaining to the units order of the final product will be the effective product represented on the plate 125—FU×VU.

Moreover, pushing of the pin 183—6 in the sensing head 173—U is also effective to push the pin 153—6 in the plate 125—FU×VT into position to serve as a stop pin with respect to the bar 130 on the plate 125—FT×VU to thereby afford a representation of the digit "6" in the units order of the variable factor with respect to the plate 125—FT×VU. The bar 130 on this is disposed in a position to represent the digit "5" in the tens order of the fixed factor so that pushing of the aforesaid pin 153—6 in cooperation with the disposition of the bar 130 on this plate affords a representation of the product 30 pertaining to the tens order of the final product.

Yet further, the pushing of the pin 153—6 in the plate 125—FU×VT also pushes the pin 146—6 on the plate 125—FT×VU and this is effective to push the pin 153—6 in the plate 125—FT×VT into position to serve as a stop member with respect to the bar 130 on the plate 125—FH×VU. Hence, since this bar 130 is disposed in a position to represent the digit "1" in the hundreds order of the fixed factor, the product "6" pertaining to the hundreds order of the final product will be represented on the plate 125—FH×VU.

Furthermore, the pushing of the pin 121—T—9 will be effective to dispose the pin 184—9 in the sensing head 173—T in position to represent the digit "9" in the tens order of the variable factor with respect to the plate 125—FU×VT on which the bar 130 is set to represent the digit "9" in the units order of the fixed factor wherefore the product of 81 pertaining to the tends order of the final product is the effective product represented on the plate 125—FU×VT. Still further, the pushing of the pin 121—T—9 is effective to dispose the pin 153—9 in the plate 125—FU×VH in position to serve as a stop pin with respect to the bar 130 on the plate 125—FT×VT which bar is disposed in the position to represent the digit "5" in the tens order of the fixed factor wherefore the product 45 pertaining to the hundreds order of the final product is the effective product represented on the plate 125—FT×VT. Still further, pushing of the pin 121—T—9 is effective to dispose the pin 153—9 on the plate 125—FT×VH in position to serve as a stop pin with respect to the bar 130 on the plate 125—FH×VT and since the bar 130 on this plate is set to represent the digit "1" in the hundreds order of the fixed factor, such positioning of the aforesaid pin 153—9 affords a representation of the product "9" pertaining to the thousands order of the final product.

The pushing of the pin 121—H—2 is effective to dispose the pin 184—2 in the sensing head 173—H in position to serve as a stop pin with respect to the bar 130 on the plate 125—FU×VH, such bar being disposed in position to represent the digit "9" on this plate wherefore the product 18 pertaining to the hundreds order of the final product is the effective product represented on the plate 125—FU×VH. Such pushing of the pin 121—H—2 also disposes the pin 184—2 in the sensing head 173—TH in position to serve as a stop pin with respect to the bar 130 on the plate 125—FT×VH, and since this bar is disposed in a position to represent the digit "5" in the tens order of the fixed factor, such pushing of this pin affords a representation of the product "10" pertaining to the thousands order of the final product on the plate 125—FT×VH. The pushing of the pin 121—H—2 also disposes the pin 184—2 in the sensing head 173—TT in position to serve as a stop pin with respect to the bar 130 on the plate 125—FH×VH, which bar is disposed to represent the digit "1" in the hundreds order of the fixed factor wherefore the product "2" pertaining to the ten-thousands order of the final product is the effective product represented on the plate 125—FH×VH.

Subsequent to the time the pins 121 and the aforesaid pins aligned therewith have been disposed in the aforesaid positions to serve as stop pins, the bail 192 is permitted to move from the zero position thereof shown in Fig. 15 to the position thereof shown in Fig. 13, in the course of which movement the various summation members 166 move through a summarizing operation and come to rest in positions representative of the final product, which is to say, the sums of products represented in the aforesaid manner on the plates 125 respectively related to the orders of the final product to which the various summation members 166 relate plus carry-overs from the next lower order of the final product.

Therefore, upon movement of the bail 192 from the zero position thereof shown in Fig. 17, the summation member 166 under the influence of the springs 189 and 199 moves through a distance equal to 54 of the aforesaid unit spaces, this being the product represented on the plate 125—FU×VU operatively associated with the summation member 166—U pertaining to the units order of the final product. The summation member 166—U is shown in this position thereof in Fig. 35. In the course of movement of the summation member 166—U into the aforesaid position, five of the steps 193—U move past the sensing finger 195—U, which through the bell crank 199—U and the slide 204—U causes the portion 208—U to move through a distance equal to five of the aforesaid unit spaces, and this through the screw 212 is effective to retract the plate 125—FT×VU in an amount equal to five unit spaces away from the effective pin 153—6 in the plate 125—FU×VT so as to thereby in effect add the digit "5" to the product "30" represented on the plate 125—FT×VU wherefore "5" is entered in the tens order of the final product. Moreover, when the summation member 166—U comes to rest in a position representative of the product "54," the sixth step 306—U thereon will be aligned with the nose-portion of the sensing finger 303—U. Therefore, upon retraction of the bails 298 and 319 in the manner described hereinabove, the sensing finger 303—U, through the intermediary of the rocker 302—U and the other elements described hereinabove, is effective to dispose the type segment TS—U in such position that the type face F—0 on the type segment TS—U is moved from printing position PP, and the type face F—4 from which the digit "4" may be printed is disposed in printing position PP in the manner described hereinabove. Therefore, the right-hand component of the product the summation member 166—U is set to represent is set up on the type segment TS—U.

Concurrently with the above referred to summation movement of the summation member 166—U, the summation member 166—T moves from the at rest position thereof shown in Figs. 34 and 18 through a distance equal to 116 of the aforesaid unit spaces, this being the sum of the products 81 and 30 respectively represented on the plates 125—FU×VT and 125—FT×VU and the carry-over of 5 from the elements pertaining to the units order of the final product. During such movement of the summation member 166—T, eleven of the steps 193—T move past the sensing finger 195—T, and this, through the bell crank 199—T and the slide 204—T, is effective to move the portion 208—T through a distance equal to eleven of the aforesaid unit spaces whereupon the plate 125—FH×VU is moved away from the effective pin 153—6 in the plate 125—FT×VT so as to in effect add "11" to the product "6" represented on the plate 125—FH×VU so as to thereby enter a carry-over "11" from elements pertaining to the tens order of the final product into elements pertaining to the hundreds order of the final product. Yet further, the twelfth step 306—T on the summation member 166—T is disposed in such position that when the sensing finger 303—T moves into engagement with this step and thereafter moves into engagement with the shoulder at the end of this step, upon retraction of the bails 298 and 319, the sensing finger 303—T and, therefore, type segment TS—T will be so moved that the type face F—0 on the type segment TS—T will be moved from printing position PP, and the type face F—6 on the type segment TS—T from which the digit "6" may be printed will be disposed in printing position PP.

Yet further, when the bail 192 moves from the at rest position thereof shown, for example, in Fig. 19, the summation member 166—H moves through a distance equal to 80 of the aforesaid unit spaces, this being the sum of the products "18," "45" and "6" respectively represented on the plates 125—FU×VH, 125—FT×VT and 125—FH×VU and the carry-over of "11" from elements pertaining to the tens order of the final product. During such movement of the summation member 166—H—8 the steps 193—H advanced past the sensing finger 195—H, and this, through the bell crank 199—H and the slide 204—H, is effective to move the portion 208—H in an amount equal to eight of the aforesaid unit spaces. Such movement of the portion 208—H is effective through the screw 212 to move the plate 125—FH×VT away from the pin 153—9 in the plate 125—FT×VH in an amount equal to eight of the aforesaid units spaces so as to add this amount to the product "9" represented on the plate 125—FH×VT whereupon a carry-over of "8" from elements pertaining to the hundreds order of the final product is transferred to elements pertaining to the thousands order of the final product. When movement of the summation member 166—T is arrested at the end of the summarizing movement thereof as aforesaid, the shoulder at the end of the ninth step 306—H is disposed in such position that the nose-portion of the sensing finger 303—H will move into position immediately adjacent thereto, the spacing between these two elements being only sufficient to afford operative clearance therefor upon retraction of the bails 298 and 319. The sensing finger 303—H will move only sufficiently to take up this operative clearance and, therefore, the type segment TS—H will be moved insufficiently to move the type face F—9 thereon from printing position PP wherefore this type face from which the digit "0" may be printed remains in printing position.

Also concurrently with movement of the bail 192 from zero position thereof as shown, for example, in Fig. 20, the summation member 166—TH moves from the at rest or zero position thereof shown in Figs. 20 and 34 through an amount equal to 27 unit spaces, this being the sum of the products "10" and "9" respectively represented on the plates 125—FT×VH and 125—FH×VT and the carry-over of "8" from the elements pertaining to the hundreds order of the final product. In the course of such movement of the summation member 166—TH, two steps 193—TH move past the sensing finger 195—TH and this, through the bell crank 199—TH and the slide 204—TH, is effective to move the portion 208—TH so as to in effect add two digits the product "2" represented on the plate 125—FH×VH wherefore the carry-over "2" from elements pertaining to the thousands order of the final product is entered in elements pertaining to the ten-thousands order of the final product. The sensing finger 303—TH will be spaced away from the shoulder at the end of the third step 306—TH in an amount corresponding to seven unit spaces so that upon retraction of the bails 298 and 319 the sensing finger 303—TH is effective to move the type segment TS—TH from the position thereof in which the type face F—9 from which the digit "0" may be printed from printing position PP in an amount sufficient to dispose the type face F—7 on this type segment in printing position.

The summation member 166—TT also moves away from the zero or at rest position thereof shown in Figs. 21 and 34 upon movement of the bail 192 from the zero position thereof. In so doing the summation member 166—TT moves through the distance equal to four of the aforesaid unit spaces, the sum of the product "2" represented on the plate 125—FH×VH and the "2" carried over from the thousands order of the final product. In such movement of the summation member 166—TT the sensing finger 195—TT will remain in engagement with the first step 193—TT on this summation member and therefore the portion 208—TT remains in the zero or at rest position thereof wherefore the sensing head 173—HT remains in the zero or at rest position thereof, and consequently the type segment TS—HT is not moved as a result of movement of the summation member 166—HT in a summarizing direction since the summation member 166—HT remains in zero position unless and until a carry-over from the ten-thousands order of the final product occurs.

Furthermore, when the summation member 195—TT comes to rest at the end of its summarizing movement, and thereafter the bails 298 and 319 are retracted, the sensing finger 303—TT remains in engagement with the first step 306—T on this summation member and when freed to movement moves into engagement with the shoulder at the end of this first step so as to thereupon move the type segment TS—TT in such a way that the type face F—0 thereon is moved from printing position PP and the type segment F—4 thereon is moved into printing position.

As has been stated, the summation member 166—HT remains in the zero position thereof in the multiplying operation schematically illustrated in Figs. 34 and 35, as a result of which the end of the plate 345—HT on this summation member is in position to be engaged by the latch 346—HT cooperating therewith. Therefore, upon movement of the bar 357, the nose-portion of the latch 346—HT under the influence of the spring 355—HT engages the end of the plate 345—HT so that upon movement of the bar 347, as effected by the rise 362 and against the effect of the springs 352 and 353, the summation member 166—HT is moved in an amount of one unit space in a direction opposite to the direction of the summarizing movement thereof. Such movement of the summation member 166—HT will occur after the sensing finger 303—HT has moved into cooperating relation with the shoulders at the end of the first step 306—HT on the summation member 166—HT. Wherefore upon movement of the summation member 166—HT in the amount of one unit space in a direction opposite to the summarizing movement thereof, the type face F—0 is moved from printing position PP and the blanking character F—B from which a blanking character may be printed is moved into printing position PP.

As soon as the type face F—B on the type segment TS—HT, the type face F—4 on the type segment TS—TT, the type face F—7 on the type segment TS—TH, the type face F—6 on the type segment TS—T, and the type face F—4 on the type segment TS—U have been moved into printing position PP (the type face F—0 on the type segment TS—H remaining in zero position) the product *470.64 may be printed upon operation of the platen face 73 cooperating with the type faces F on the type segments TS disposed at printing position PP, this being the final product resulting from the multiplication of the fixed factor 159 by the variable factor 296.

By the time the platen PL is operated to print the final product as aforesaid on the sheet S, the printing and control device D that has been disposed in sensing position SP will have been moved from sensing position to printing position above the anvil A. Thus, once the sensing pins 87 have been effective to push the pins 121 in the manner described hereinabove, the roller 109 moves off the inclined plate 108 whereupon the springs 82' and 83' return the sensing head 84 to the upper at rest position thereof shown, for example, in Fig. 7. This retracts the sensing pins 87 from the perforations P through which these pins passed in the sensing operations so that, therefore, the printing and control device D which is disposed in sensing position SP is free to be moved from this position.

The roller 109 disengages the plate 108 at the time when the arm 65 is about midway between the full and broken line positions thereof shown in Fig. 2, and prior to the time this arm attains this broken line position. However, after the arm 65 reaches the broken line position thereof shown in Fig. 2, it starts to return to the full line position thereof in this view, and in the course of such movement the pawls 58 move into engagement with the various printing and control devices D and advance these devices from the position in which they have been disposed to the succeeding position. Thus, in the course of such movement of the pawls 58, the printing and control device D at the bottom of the stack thereof in the magazine H is moved into sensing position SP so as to be disposed in this position to be effective in the next cycle of operation to control operation of my multiplying mechanism. Moreover, the printing and control device which has been disposed in the anvil A, in the course of the last referred to movement of the pawls 58, will be moved through the discharge chute to pass into the collector for the printing and control devices at the discharge end of this discharge chute. Therefore, the printing and control device which has been disposed in sensing position SP may move into printing position above the anvil A and this printing and control device attains this position prior to the time platen PL is operated to print the final product as aforesaid from the type faces F on the type segments TS.

Hence, an impression is made on the sheet S from the printing and control device bearing the field F in which the perforations P controlled the ensuing operation of my multiplying mechanism. Consequently, the impression made from the embossed type T on the printing and control device D is printed on the same sheet as that on which the final product is set up under control of the perforations P on the field of this printing and control device. At this time, of course, impressions are also made on the sheet S from type faces in the numbering device N, the dating device DD and the signature plate SP. Therefore, the operation of the platen PL is effective to print related data on each sheet S in each operation thereof.

In the form of my multiplying mechanism as thus far described the sensing pins as 87 in Fig. 6 are directly effective to push the pins 121, Figs. 9 and 10, operatively associated therewith as well as the pins and other devices aligned with and operative from the pins 121. In some instances, however, it may be desirable to effect pushing of the pins 121 and the pins operatively associated therewith by force applied other than from the sensing pins as 87, and to this end resort may be had, for example, to the arrangement shown in Figs. 36, 37 and 38. Inasmuch as many of the elements illustrated in these views correspond to elements that have been described hereinabove, those elements which appear in Figs. 36, 37 and 38 that correspond to elements described hereinabove have the same reference character applied thereto in Figs. 36, 37 and 38 as was respectively applied to such elements hereinabove except that where these reference characters appear in Figs. 36, 37 and 38 the letter "M" is added to such reference characters. Thus, it will be seen that a bracket M112—U is provided on the side wall M110 and that the ends of the pins M121—U—0 to M121—U—9 are mounted in this bracket in the same manner as that in which the various pins 121—U pertaining to the units order of the variable factor were mounted in the bracket 112—U.

Each pin as M121—U—0 has an arm as 415—0 engaged therewith, the various arms 415—0 to 415—9 being pivotally mounted on a bracket 416 fast to the side wall M110 adjacent to the bracket M112. Each arm as 415—0 is connected through a pin and slot connection as 417—0 to the armature as 418—0 of a solenoid as 419—0. The solenoids as 419—0 are selectively energized under control of the sensing pins M87. Thus, when a particular sensing pin M87 moves through an underlying perforation MP in a printing and control device MD disposed at sensing position MSP, the underlying push pin M93 is pushed downwardly as viewed in Fig. 38. However, instead of Bowden cables as 96 being connected to the push pins M93, each such push pin extends to the upper blade as 420 of a switch device as 421—U, the upper spring blade 420 of such a switch device being normally spaced from the lower switch blade 422 of such a device. The switch devices 421 respectively pertain to the units, tens and hundreds orders of the variable factor as indicated by the reference characters "U," "T" and "H" added thereto, and it will be understood that there is one such switch device as 421—U for each pin as M93, the arrangement of the pins as M93 and the sensing pins M87 being like that described hereinabove with respect to the push pins 93 and sensing pins 87.

Therefore, when a sensing pin M87 passes through a perforation MP in a printing and control device MD disposed at sensing position MSP that pertains to the units order of the variable factor so that the underlying pin M93 is pushed, the blade 420 of the aligned switch device 421—U will be engaged with the blade 422 so as to thereupon engage the contacts carried by these blades and this is effective to close the circuit to the related solenoid M19. Thus, if the pin M93 at zero position in the units order is pushed, circuit will be closed to the solenoid 419—0 connected to the arm 415—0 that engages the pin M121—U—0. Thereupon the armature 418—0 of this solenoid will be retracted from the full line position thereof shown in Fig. 37 to the broken line position shown in this view so that the arm 415—0 is moved into the broken line position shown in Fig. 37, whereupon the aligned pin M121—U—0 is pushed inwardly with the effect described hereinabove with reference to the pins 121—U. Moreover, upon operation of the plate 246, Fig. 15, in the course of a restoring operation and in the manner explained hereinabove with reference to pins 121—U and the pins operatively associated therewith, a push pin as M121—U—0 will be restored to the position of this pin shown in Fig. 37 to thereby restore the arm 415—0 and the armature 418—0 to the full line positions thereof shown in Fig. 37.

It will be understood that solenoids as 419 are also associated with pins like the pins M121—U—0 to M121—U—9 but which respectively pertain to the tens and hundreds orders of the variable factor where accommodation is afforded for three orders in the variable factor. Hence, pushing of the pins M93 related to the tens and hundreds orders of the variable factor is selectively effective to energize the solenoids as 419 associated with the pins 121 that pertain to the tens and hundreds orders of the variable factor with the effect described hereinabove.

The bars 130 on the devices 125 have been described as being moved into a position to represent a particular digit in the order of the fixed factor to which the plate 125 on which the particular bar 130 is mounted relates, the bar 130 having been fixed in such digit-representing position by seating the plunger 136, Fig. 28, in the proper opening 128. In some instances, however, it may be desirable to afford representations of the digits that appear in the various orders of the fixed factor under control of keys arranged in a convenient position on the mechanism. To this end resort may be had to an arrangement and as that shown in Figs. 39 to 42 inclusive. As in the instance of elements appearing in Figs. 36, 37 and 38, those elements appearing in Figs. 39 to 42 inclusive which have been described hereinabove have the reference character that has been used hereinabove with respect to each such elements applied thereto in Figs. 39 to 42, but here again the letter "M" is added to such reference characters.

In Figs. 39 and 40 I have illustrated the plate M125—FH×VH and the devices associated therewith but it will be understood that the arrangement of this particular plate and of the devices now to be described that are associated therewith is identical with that provided for other plates associated with summation members pertaining to other orders of the final product, the plate M125—FH×VH as the plate 125—FH×VH relating to the summation member 166—TT pertaining to the ten-thousands order of the final product, this summation member including the sensing head M173—TT shown in Fig. 39.

The bar M130 shown in Figs. 39, 40 and 42 is pivotally mounted on the plate M125—FH×VH in the same manner as that in which the bar 130 is mounted on the plate 125, as has been described hereinabove. Hence, in the zero position of the bar M130 the edge M165 thereon lies tangential to the pins M146—9 to M146—9 provided in the plate M125—FH×VH. However, the bar M130 is urged into such tangential position with respect to the aforesaid pins under the influence of the spring 425 which is fast to the plate M125—FH×VH as indicated at 426, th bar M130 pivoting in the opening M139 against the effect of the spring 425 away from the zero position when a significant digit is to be represented thereby.

In order to represent the digits that may appear in the hundreds order of the fixed factor to which the plate M125—FH×VH relates, pins 427—0 to 427—9 are mounted in the upper edge of the plate M125—FH×VH in spaced apart relation, these pins 427 respectively pertaining to the digit in the hundreds order of the fixed factor associated with the reference characters applied to these pins in Fig. 40. A plate 428 is mounted in an opening in the upper wall of my multiplying mechanism and has a shaft 429 supported on the underside thereof on which bell cranks as 430—0 are pivotally mounted. The arms 431—0 of these bell cranks are respectively aligned with the pins as 427—0 while the arms as 432—0 in the bell cranks as 430—0 have a Bowden cable as 433—H—0 connected thereto. The sheaths for Bowden cables as 433—H—0 are anchored in openings provided in the plate 428 and the other ends of these sheaths are anchored in openings provided in a plate 434 mounted in the housing 435 supported above the plate 428, the Bowden cable 433—H—0 extending from the end of the sheath therefor, anchored in the plate 434 to be connected to a plate 436—H—0 to be described presently. Other Bowden cables 433—T—0 and 433—U—0 are also connected to the plate 436—H—0 and these Bowden cables respectively extend to bell cranks associated with plates pertaining to the tens and units orders of the fixed factor, these cables being respectively connected to bell cranks like the bell crank 430—0 that are associated with pins as 427—0 in the plates pertaining to the tens and units orders of the fixed factor.

Therefore, movement of the plate 436—H—0 downwardly, as viewed in Fig. 39, is effective to push the Bowden cables 433—H—0, 433—T—0 and 433—U—0 so as to thereby set up a representation of "0" in the hundreds order of the fixed factor on the plates as 125 that pertain to the hundreds order of the fixed factor. Such downward movement of the plate as 436—H—0 insofar as the plate M125—FH×VH may be concerned is effective through the Bowden cable 433—H—0 to pivot the bell crank 430—0 counterclockwise as viewed in Fig. 39, and thereupon the arm 431—0 of this bell crank is effective to push the pin 427—0 from the at rest position thereof shown in Fig. 39 into a position to lie in the path of the finger 437 provided at the upper end of the bar M139. As can best be seen by reference to Fig. 40, pushing of the pin 427—0 is effective to dispose the periphery of this pin in tangential relationship with the edge 438 on the finger 437 so that, therefore, the bar M130 is held against pivotal movement against the influence of the spring 425. However, if a bell crank as 430—9 had been operated rather than the bell crank 430—0, then the pin 427—9 would have been pushed so as to be disposed in position to engage the edge 438 on the finger 437, the broken line position of the bar M130 in Fig. 40 illustrating engagement of the edge 438 with the pin 429—7.

Hence, once a pin aligned with and cooperating with one of the pins M146 is pushed to serve as a stop pin with respect to the edge M165 on the bar M130, as has been explained hereinabove with reference to the pins 146 on the bar 130, and once a pin as 429—9 has been pushed, representations of the digit "9," in this instance, in the hundreds order of the fixed factor, will be represented by the pin 427—9 having been pushed and a particular digit as "7" in the hundreds order of the variable factor will be represented by having the pin aligned with the pin M146—7 disposed in position to act as a stop pin with respect to the edge M165 on the bar 130. The particular pin which would be disposed to serve as a stop pin insofar as the bar M130 may be concerned would be the pin M184—7 in the sensing head M173—TT. Therefore, at initiation of movement of the sensing head M173—TT. the pin M184—7 therein would be engaging the edge M165 on the bar M130 so that as movement of the sensing head M173—TT takes place the bar M130 is pivoted from the full line position thereof shown in Fig. 40 over the adjacent face of the plate M125—FH×VH until the edge 438 on the finger 437 engages the pushed pin 427—9. Such movement of the bar M130 would correspond to positioning of the bar 130, Fig. 26, in the full line position thereof shown in this view, and since the pin M184—7 represents the digit "7" in the hundreds order of the variable factor, the movement of the sensing head M173—TT would be through a distance equal to sixty-three of the aforesaid unit spaces, this being the product of "7" represented by the particular pin 184—7 and "9" represented by the pin 427—9. In the course of restoring movement of the sensing head M173—TT, the spring 425 is effective to restore the bar M130 to the zero or at rest position thereof shown in full lines in Fig. 40 and the pushed pins M146—7 and M184—7 are restored in the manner explained hereinabove.

The Bowden cables 433—H—0, 433—T—0 and 433—U—0 are, as stated above, respectively connected to the plate 436—H—0 and this plate 436—H—0 pertains to the digit "0" in the hundreds order of the fixed factor. The plate 436—H—0 is connected to the plunger 440—0 of a key 441—0 which is disposed above the top of the housing 435 and which has a spring 442—0 effective thereon to normally dispose the key 441—0 in the at rest position thereof shown in Fig. 39. As best shown in Fig. 41, the key 441—0 is one of a series of ten such keys that respectively pertain to the digits "0" to "9" in the hundreds order of the fixed factor. Other keys as 445—0 to 445—9 pertaining to the tens order of the fixed factor are arranged in a row and these keys are respectively aligned with the keys 441—0 to 441—9. Yet other keys 446—0 to 446—9 pertaining to the units order of the fixed factor are arranged in a row and are respectively aligned with the keys 445—0 to 445—9. Each key 441, 445 and 446 has a plate corresponding to the plate 436—H—0 connected thereto and each such plate has three Bowden cables connected thereto. The Bowden cables connected to each such plate respectively relate to the plate 125 pertaining to the order of the final product to which the particular key relates, and such Bowden cables are connected to bell cranks like the bell crank 430—0 that are aligned with a pin like the pin 427—0 in the particular plate, the digital value of the particular pin 427 with which the adjacent bell crank 430 cooperates corresponding to the digital value of the particular key. For example, pushing of the pin 445—4 would be effective to render a pin as 427 pertaining to the digit "4" effective on plates pertaining to the tens order of the fixed factor, and pushing of a key as 446—7 would be effective to render a pin as 427 operative on the plates pertaining to the units order of the fixed factor.

As best shown in Fig. 39, a tension spring 448 is effective on the various pins 427 so as to retain these pins in positions into which they are moved. Hence, immediately after a key as 441—0 has been pushed downwardly such key may be released because the related pin as 427—0 will have been disposed in operative position. Therefore, once pins as 427 have been pushed to afford representations of the digits appearing in various orders of the fixed factor and it is thereafter desired to set up other pins to represent other digits in the orders of the fixed factor, the push pins 427 are restored to the at rest positions thereof in which the pin 427—0 is shown in Fig. 39. To this end a plate 450 is provided, this plate extending along the upper edge of each plate as M125—FH×VH on the side thereof opposite that on which the bell cranks as 430 are disposed. The plate 450 is pivotally mounted on the underside of the plate 428 and an arm 452 is connected to and extends outwardly therefrom.

A shaft as 453, Figs. 39 and 42, is supported above the plate 428, there being one such shaft as 453 for each set of plates 125 related to a particular order of the final product. An opening as 454 is provided in alignment with each arm as 452 connected to each plate as 450 and a link as 455 extends through each opening as 454 to interconnect the underlying arm 452 with an arm as 456 on the adjacent shaft as 453. Each shaft as 453 also has an arm as 457 provided thereon and the arms as 457 are pivotally connected to the link 458. The link 458 is pivotally connected to the arm 459 of the bell crank 460 which is pivotally mounted on the adjacent wall of the housing 435. The arm 461 of the bell crank 460 is pivotally connected to the shaft 462 of a key 463 which is normally urged into the upward at rest position thereof shown in Fig. 39 by a spring 464. Therefore, when the key 463 is forced downwardly the bell crank 460 is rocked clockwise as viewed in Fig. 39, and thereupon the arm 459 thereof is effective to move the link 458 to the right as viewed in Fig. 39, and this is effective through the arms as 457 to rotate the shafts 453 clockwise as viewed in Fig. 39. Such movement of the shafts as 453 is effective through the arms as 457, links as 455 and arms as 452 to move the plates as 450 clockwise as viewed in Fig. 39, and thereupon the plates as 450 engage the pushed pins 427 in the associated plate 125 so as to thereby restore these pushed pins to the at rest position thereof in which the pin 427—0 is shown in Fig. 39.

It will, therefore, be seen that the arrangement illustrated in Figs. 38 to 42, inclusive, enables representations of the digits in the various orders of the fixed factor to be set up upon manipulation of keys provided on a keyboard that may be located at a convenient place in the machine by reason of the connection of keys to the parts to be operated thereby through the intermediary of Bowden cables.

While I have shown and described the arrangement illustrated in Figs. 38 to 42, inclusive, as including manually operable keys as shown in Fig. 41, it will be understood that Bowden cables or the like could be extended to these keys from a sensing means like that effective to sense perforations P in the field FL so that what has been referred to herein as being the fixed factor could also be set up under control of perforations provided in the printing and control devices D or similar devices and so to do is to be considered as being within the ambit of the following claims.

Hereinabove I have described my multiplying mechanism as arranged to accommodate three orders in the fixed factor and three orders in the variable factor. It will be understood, however, that merely by eliminating proper plates as 125, the mechanism could be arranged to accommodate a fewer number of orders in either of the fixed or variable factors. Moreover, by providing additional plates as 125 and relating these one to the other in accordance with the relationship described hereinabove with respect to the illustrated plates 125, accommodation could be afforded for a greater number of orders in either the fixed or variable factors.

Yet further, it will be understood from the foregoing description that a mechanism arranged in the manner hereinabove described enables the hereinabove set forth and related objects of my invention to be realized, and while I have illustrated and described preferred embodiments of my invention, it is to be understood that these are capable of variation and modification and I therefore do not wish to be limited to the precise details set forth but desire to avail myself of such changes and alterations as fall within the purview of the following claims.

I claim:

1. A multiplying apparatus including a member positionable to selectively represent one of the digits that may appear in an order of one factor of the to be performed multiplications, representing devices respectively allocated to digits that may appear in an order of the other factor of the to be performed multiplications and arranged to be selectively rendered effective for cooperation with said member to thereby represent a specific digit and, when rendered effective, to be spaced from the positionable member in an amount representative of the product resulting from multiplication of the digit to which the effective device is allocated by the digit the member is positioned to represent, means for effecting relative movement between said devices and the positioned member to thereby interengage an effective device and member and thereupon arrest such relative movement, and means responsive to such relative movement and positionable to represent the product represented by the space between the effective device and positioned member.

2. A multiplying apparatus including a member positionable to selectively represent one of the digits that may appear in an order of one factor of the to be performed multiplications, representing devices respectively allocated to digits that may appear in an order of the other factor of the to be performed multiplications and arranged to be selectively rendered effective for cooperation with said member to thereby represent a specific digit and, when rendered effective, to be spaced from the positionable member in an amount representative of the product resulting from multiplication of the digit to which the effective device is allocated by the digit the member is positioned to represent, means for effecting relative movement between said devices and the positioned member to thereby interengage an effective device and member and thereupon arrest such relative movement, and operatively related to said member and devices and movable upon and proportionate to relative movement said member and an effective device to be disposable in position to represent the product represented by the space between the effective device and positioned member, and means arranged for cooperation with the means operatively related to said member and devices for reading out the product such means are positioned to represent.

3. In a multiplying apparatus, means for representing products resulting from multiplication of various digits that may appear in an order of one factor of the to be performed multiplications by various digits that may appear in an order of the other factor of the to be performed multiplications, the product representing means including positionable means for selectively representing the digits that may appear in an order of said one factor and operable devices effective to selectively represent the digits that may appear in an order of said other factor, means for retaining the positionable means in selected positions and effective to dispose such means in position to represent a selected digit, means for rendering said operable devices effective selectively for cooperation with said positionable means to thereby represent a selected digit, said positionable means and operable devices being related to and cooperating with each other to represent the product resulting from multiplication of the digit represented by the positioned positionable means by the digit the effective operable device represents, final product representing means, and means for effecting relative movement between the positionable means and the effective operable device and operable to transfer the value of the product represented by said positioned positionable means and the effective operable device to the final product representing means and thereby dispose such final product representing means in position to represent the aforesaid represented product.

4. In a multiplying apparatus, means for representing products resulting from multiplication of various digits that may appear in an order of one factor of the to be performed multiplications by various digits that may appear in an order of the other factor of the to be performed multiplications, the product representing means including positionable means for selectively representing the digits that may appear in an order of said one factor and operable devices effective to selectively represent the digits that may appear in an order of said other factor, means for retaining the positionable means in selected positions and effective to dispose such means in position to represent a selected digit, means for rendering said operable devices effective selectively for cooperation with said positionable means and to thereby represent a selected digit, said positionable means and operable devices being related to and cooperating with each other to be spaced one from the other to represent the product resulting from multiplication of the digit represented by the positioned positionable means by the digit the effective operable device represents, final product representing means, and means for effecting relative movement between the positionable means and the effective operable device in an amount proportionate to the spacing therebetween to thereby move the final product representing means and dispose the same in position to represent the product represented by the spaced positionable means and effective operable device.

5. A product representing mechanism for use in a multiplying apparatus and comprising positionable means for selectively representing the digits that may appear in an order of one factor of the to be performed multiplications and operable devices for selectively representing the digits that may appear in an order of the other factor of the to be performed multiplications, means for retaining said positionable means in selected positions and effective to dispose such means in position for cooperation with said operable devices and to represent a selected digit, said operable devices being selectively rendered effective whereby the effective of such devices represents a selected digit, and means supporting said positionable means and operable devices in predetermined relation with each other whereby the positioned positionable means and an effective operable device are spaced one from the other in an amount affording a representation of the product resulting from multiplication of the digit the positioned positionable means represents by the digit the effective operable device represents.

6. A multiplying apparatus including a support having an arm mounted thereon for movement thereover, means for disposing said arm in selected of a plurality of positions on said support to thereby represent a digit in an order of one factor of the to be performed multiplications, a head having a plurality of pins mounted therein in positions to respectively represent the digits in an order of the other factor of the to be performed multiplications, means for disposing one of said pins in position to cooperate with said arm, means for effecting relative movement between said support and said head to effect interengagement of said arm and the pin disposed to cooperate therewith and thereupon arrest relative movement between said support and head, and a positionable member mounted for movement in response to relative movement between said support and head from a predetermined position to a representing position in amount proportionate to the relative movement between said support and head to thereby be disposed in representing position to represent the product resulting from multiplication of the digit the arm is disposed to represent by the digit the pin disposed to cooperate with said arm represents.

7. A multiplying apparatus including a pair of supports each having an arm mounted thereon for movement thereover, means for selectively disposing one such arm in position to represent a digit in an order of one factor of the to be performed multiplications, means for selectively disposing the other such arm in position to represent a digit in another order of said one factor, a head associated with each support, each such head having a plurality of pins mounted therein in positions to respectively represent the digits in an order of the other factor of the to be performed multiplications, the pins in each of said heads pertaining to the same digit being aligned one with the other and being arranged for conjoint movement into position to cooperate with the arm on the support associated with the head in which the pin is included, means supporting each associated support and head for relative movement to effect interengagement of the arm on the support with the pin moved to cooperate therewith to thereupon arrest relative movement between the support and head, and a positionable member associated with each associated support and head and mounted for movement from a predetermined position to a representing position in an amount corresponding to the relative movement between the associated support and head to thereby be disposed to represent the product resulting from multiplication of the digit the arm on the associated support is disposed to represent by the digit the pin moved to cooperate with such arm represents.

8. In a multiplying apparatus, a multiplying instrumentality for forming the product of two digits and comprising a pair of members mounted and guided for movement along parallel paths, an arm pivoted on one of said members on an axis perpendicular to said paths and differentially settable on said one of said members in accordance with a digit of a notation, plural settable devices mounted on the other of said members and each being settable from an ineffective position to an effective position wherein it is effective to engage said arm in the course of relative movement of said members to limit such relative movement, the respective devices being representative of the different digits of a notation, and the limited relative movement between said members being equal to the product of the digit represented by the setting of said arm by the digit represented by the effective one of said devices.

9. In a multiplying apparatus, a multiplying instrumentality for forming the product of two digits and comprising a pair of members mounted and guided for movement along adjacent parallel paths, an arm pivoted on one face of one of said members on an axis perpendicular to said paths, cooperating means on said arm and said one of said members for differentially setting said arm in accordance with a digit of a notation, plural settable devices representative of the different digits of a notation and mounted on the other of said members and each being settable from an ineffective position to an effective position wherein it is effective to engage said arm in the course of relative movement of said members to limit such relative movement, the limited relative movement between said members being equal to the product of the digit represented by the setting of said arm by the digit represented by the effective one of said devices.

10. In a multiplying apparatus, a multiplying instrumentality for forming the product of two digits and comprising a pair of members mounted and guided for movement along parallel paths, an arm pivoted on one of said members on an axis perpendicular to said paths and differentially settable on said one of said members in accordance with a digit of a notation, means mounted on the other of said members and settable from an ineffective relationship to an effective relationship representative of a selected digit of a notation and wherein such means are effective to engage said arm in the course of relative movement of said members to limit such relative movement, the limited relative movement between said members being equal to the product of the digit represented by the setting of said arm by the digit represented by the setting of said means.

11. In a multiplying apparatus, a multiplying instrumentality for forming the product of two digits and comprising a pair of members mounted and guided for movement along adjacent parallel paths, an arm pivoted on one face of one of said members on an axis perpendicular to said paths, cooperating means on said arm and said one of said members for differentially setting said arm in accordance with a digit of a notation, means mounted on the other of said members and settable from an ineffective relationship to an effective relationship representative of a selected digit of a notation and wherein such means are effective to engage said arm in the course of relative movement of said members to limit such relative movement, the limited relative movement between said members being equal to the product of the digit represented by the setting of said arm by the digit represented by the setting of said means.

12. In a machine for performing multiplication of two multidigit factors, a plurality of multiplying instrumentalities for forming individual products of each digit of one factor by each digit of the other factor each comprising a member differentially settable in accordance with a digit of one factor, and plural devices each representing a digit of a notation and one of which is selectively rendered effective in accordance with a digit of the other factor, said members and devices being mounted for relative movement from initial rest positions to cooperating positions, whereby an effective device may abut the settable member in each of said instrumentalities, the relative movement between each effective device and its cooperating member being equal to the product of the digit represented by the setting of a respective settable member and the digit represented by a related set device, said plural instrumentalities being grouped in rows, one row for each digit of the final product to be computed within the capacity of the machine, and the number of instrumentalities per row varying in accordance with the number of digital products entering into the computation of each final product digit, corresponding devices of the instrumentalities related to the same order of said other factor being disposed in alignment when said members and said devices are in said rest positions to thereby enable concurrent setting of the devices related to each of the orders of said other factor, means for effecting relative movement between the members and the devices of the instrumentalities of each row, each of said means including an element for representing the sum of digital products in its row, means controlled by each said element for representing the digit of the final product corresponding to its row of instrumentalities and means controlled by each said element for effecting carry overs of values in excess of the digit of the final product to the row of instrumentailties of the next higher order.

13. In a machine for performing multiplication of two multidigit factors, a plurality of multiplying instrumentalities for forming individual products of each digit of one factor by each digit of the other factor each comprising a member differentially settable in accordance with a digit of one factor, and settable means having initial positions and settable to represent a digit of a notation in accordance with a digit of the other factor, said members and means being mounted for relative movement from initial rest positions to cooperating positions, whereby said settable means may abut the related settable member in each of said instrumentalities, the relative movement between each settable means and its cooperating member being equal to the product of the digit represented by the setting of a respective settable member and the digit represented by the setting of the related settable means, said plural instrumentalities being grouped in rows, one row for each digit of the final product to be computed within the capacity of the machine, and the number of instrumentalities per row varying in accordance with the number of digital products entering into the computation of each final product digit, the settable means of the instrumentalities related to the same order of said other factor, when in their initial positions, being disposed in alignment when said members and said settable means are in said rest positions to thereby enable concurrent setting of the settable means related to each order of said other factor, operating means for effecting relative movement between the members and the settable means of the instrumentalities of each row, each of said operating means including an element for representing the sum of digital products in its row, means controlled by each said element for representing the digit of the final product corresponding to its row of instrumentalities, and means controlled by each said element for effecting carry overs of values in excess of the digit of the final product to the row of instrumentalities of the next higher order.

14. A multiplying apparatus including a pair of supports each having an arm mounted thereon for movement thereover, means for selectively disposing one such arm in position to represent a digit in an order of one factor of the to be performed multiplications, means for selectively disposing the other such arm in position to represent a digit in another order of said one factor, a head associated with each support, means on such head settable to represent the digits selectively in an order of the other factor of the to be performed multiplications, the settable means on certain of said heads being aligned one with the other and being arranged for conjoint movement into set positions to cooperate with the arm on the support associated with the head in which the settable means are included, means supporting each associated support and head for relative movement to effect interengagement of the arm on the support with the settable means that are set to cooperate therewith to thereupon arrest relative movement between the support and head, and a positionable member associated with each associated support and head and mounted for movement from a predetermined position to a representing position in an amount corresponding to the relative movement between the associated support and head to thereby be disposed to represent the product resulting from multiplication of the digit the arm on the associated support is disposed to represent by the digit the cooperating settable means are set to represent.

15. In a machine for performing multiplications of two multidigit factors, a plurality of multiplying instrumentalities for forming individual products of each digit of one factor by each digit of the other factor each comprising a member differentially settable in accordance with a digit of one factor, and plural devices each representing a digit of a notation and one of which is selectively rendered effective in accordance with a digit of the other factor, said members and devices being mounted for relative movement whereby an effective device may abut the settable member in each of said instrumentalities, the relative movement between each effective device and its cooperating member being equal to the product of the digit represented by the setting of a respective settable member and the digit represented by a related set device, said plural instrumentalities being grouped in rows, one row for each digit of the final product to be computed within the capacity of the machine, and the number of instrumentalities per row varying in accordance with the number of digital products entering into the computation of each final product digit, means for effecting relative movement between the members and devices of the instrumentalities of each row, each of said means including an element for representing the sum of digital products in its row, means controlled by each said element for representing the digit of the final product corresponding to its row of instrumentalities and means controlled by each said element for effecting carry overs of values in excess of the digit of the final product to the row of instrumentalities of the next higher order.

16. In a machine for performing multiplication of two multidigit factors, a plurality of multiplying instrumentalities for forming individual products of each digit of one factor by each digit of the other factor each comprising a member differentially settable in accordance with a digit of one factor, and plural devices each representing a digit of a notation and one of which is selectively rendered effective in accordance with a digit of the other factor, said members and devices being mounted for relative movement whereby an effective device may abut the settable member in each of said instrumentalities, the relative movement between each effective device and its cooperating member being equal to the product of the digit represented by the setting of a respective settable member and the digit represented by a related set device, said plural instrumentalities being grouped in rows, one row for each digit of the final product to be computed within the capacity of the machine, and the number of instrumentalities per row varying in accordance with the number of digital products entering into the computation of each final product digit, an element associated with each of said rows for representing the sum of digital products in its row, means for effecting relative movement between said elements and the members and devices of the instrumentalities of each row, means controlled by each said element for representing the digit of the final product corresponding to its row of instrumentalities, and means controlled by each said element for effecting carry overs of values in excess of the digit of the final product to the row of instrumentalities of the next higher order.

17. In a machine for performing multiplication of two multidigit factors, a plurality of multiplying instrumentalities for forming individual digital products of the digit in each order of one factor by the digit in each order of the other factor, said instrumentalities being allocated to the respective orders of the final product in accordance with the orders of the two factors to which the respective instrumentalities are related, each multiplying instrumentality comprising a member differentially settable in accordance with a digit of one factor, and plural devices each representative of a digit of a notation and one of which is selectively rendered effective in accordance with a digit of the other factor, said members and devices being mounted for relative movement whereby an effective device may abut the settable member in each of said instrumentalities, the relative movement between each effective device and its cooperating member being equal to the product of the digit represented by the setting of a respective settable member and the digit represented by a related set device, the instrumentalities being arranged in rows related respectively to the several orders of the final product and each including all of the instrumentalities related to its order of the final product, settable abutments disposed respectively at one end of each row for determining the position of the adjacent instrumentality of its row, representing elements disposed respectively at the other ends of each of said rows for representing the sum of the digital products of their respective rows, means for effecting relative movement between said members and devices of each row, means controlled by each said element for representing the digit of the final product corresponding to its row of instrumentalities, and means controlled by each such element for setting the related settable abutment to effect carryovers of values in excess of the digit of the final product to the row of instrumentalities of the next higher order.

ARNI ARNASON.

REFERENCES CITED

The following references are of record in the file of this patent:

UNITED STATES PATENTS

| Number | Name | Date |
|---|---|---|
| 996,526 | Rachwetter | June 27, 1911 |
| 1,221,027 | Cluley | Apr. 3, 1917 |
| 1,527,407 | Harmsen | Feb. 24, 1925 |
| 1,838,647 | Watters et al. | Dec. 29, 1931 |
| 2,084,831 | Baumann et al. | June 22, 1937 |
| 2,178,913 | McClure | Nov. 7, 1939 |
| 2,296,276 | Golliwitzer | Sept. 22, 1942 |